(12) United States Patent
Troy et al.

(10) Patent No.: US 9,678,505 B2
(45) Date of Patent: Jun. 13, 2017

(54) LINE MANAGEMENT IN MANUFACTURING EXECUTION SYSTEM

(71) Applicant: Invensys Systems, Inc., Foxboro, MA (US)

(72) Inventors: Thomas Andrew Troy, Lansdale, PA (US); Jeffrey Bernard Nuse, Rancho Santa Margarita, CA (US); Keith Richard Frantz, Richland, PA (US); Nicolas Pouyez, Paso Robles, CA (US); Diana Ivanov, Rancho Santa Margarita, CA (US); James Eric O'Hearn, Mission Viejo, CA (US); Adam R. Haskell, Lake Forest, CA (US); Raghavendran Gobalakrishnan, Chester Springs, PA (US); Melvin Philip Norbeck, New Cumberland, PA (US); Richard William Boyle, Mohrsville, PA (US); Daniel van Klaveren, Ladera Ranch, CA (US)

(73) Assignee: Invensys Systems, Inc., Foxboro, MA (US)

(*) Notice: Subject to any disclaimer, the term of this patent is extended or adjusted under 35 U.S.C. 154(b) by 463 days.

(21) Appl. No.: 14/194,151

(22) Filed: Feb. 28, 2014

(65) Prior Publication Data

US 2015/0105887 A1 Apr. 16, 2015

Related U.S. Application Data

(60) Provisional application No. 61/890,760, filed on Oct. 14, 2013.

(51) Int. Cl.
- G06F 19/00 (2011.01)
- G05B 19/418 (2006.01)
- G06Q 50/04 (2012.01)

(52) U.S. Cl.
CPC . G05B 19/41865 (2013.01); G05B 19/41885 (2013.01); G06Q 50/04 (2013.01);
(Continued)

(58) Field of Classification Search
None
See application file for complete search history.

(56) References Cited

U.S. PATENT DOCUMENTS 5,155,679 A * 10/1992 Jain ............... G05B 19/41865 700/101
5,195,041 A * 3/1993 George .......... G05B 19/41885 700/100

(Continued)

Primary Examiner — Jason Mitchell
(74) Attorney, Agent, or Firm — Stephen Manetta; Susmita Bhandari

(57) ABSTRACT

A manufacturing execution system (MES) that provides tools for modeling and determining information about physical production lines made up of arrangements of entities. The MES includes configuration tools for modeling the entities in a physical production line. The MES also includes configuration tools for modeling the physical production line. Entity data models and line data models conform to the data structure of respective model templates. Line data models include line definition models and line layout models. Line layout models include an entity link model for each of the entities in the physical production line. The MES includes tools for dynamically determining the bottleneck for the physical production line. Other production metrics are also calculated using the MES.

32 Claims, 43 Drawing Sheets

(52) U.S. Cl.
CPC .............. *G05B 2219/31372* (2013.01); *G05B 2219/31432* (2013.01); *G05B 2219/32404* (2013.01); *Y02P 90/12* (2015.11); *Y02P 90/20* (2015.11); *Y02P 90/26* (2015.11); *Y02P 90/30* (2015.11)

(56) References Cited

U.S. PATENT DOCUMENTS

| | | | | |
|---|---|---|---|---|
| 5,255,197 | A * | 10/1993 | Iida | G05B 19/41835 700/108 |
| 5,691,895 | A * | 11/1997 | Kurtzberg | G05B 13/042 700/108 |
| 5,946,661 | A * | 8/1999 | Rothschild | G05B 19/41865 377/16 |
| 6,522,939 | B1 * | 2/2003 | Strauch | G05B 19/41875 700/108 |
| 6,920,366 | B1 | 7/2005 | Luh et al. | |
| 7,558,638 | B2 * | 7/2009 | Chang | G05B 19/4184 700/100 |
| 7,844,349 | B2 | 11/2010 | Weatherhead et al. | |
| 8,055,367 | B2 * | 11/2011 | Kneisel | G06Q 10/06 700/96 |
| 8,694,958 | B1 * | 4/2014 | Potter | G06F 8/35 717/104 |
| 8,965,539 | B2 * | 2/2015 | Hayes | G05B 19/41865 700/100 |
| 2001/0042359 | A1 * | 11/2001 | Franzaroli | B65B 25/146 53/435 |
| 2002/0199082 | A1 * | 12/2002 | Shanmugasundram | B24B 37/042 712/208 |
| 2003/0009253 | A1 * | 1/2003 | McIntyre | G05B 23/0216 700/108 |
| 2003/0167238 | A1 * | 9/2003 | Zeif | G05B 23/0267 705/400 |
| 2004/0093101 | A1 * | 5/2004 | Torii | G06Q 10/0875 700/95 |
| 2005/0028133 | A1 * | 2/2005 | Ananth | G06F 8/20 717/105 |
| 2006/0190584 | A1 * | 8/2006 | Skold | G05B 23/0272 709/223 |
| 2006/0206222 | A1 * | 9/2006 | Dyer | G06Q 10/06 700/95 |
| 2008/0133041 | A1 * | 6/2008 | Schmidt | G05B 19/41865 700/101 |
| 2009/0075209 | A1 * | 3/2009 | Yabe | G03F 7/70525 430/311 |
| 2010/0023151 | A1 | 1/2010 | Shieh et al. | |
| 2010/0106655 | A1 * | 4/2010 | Schneider | G06Q 10/06 705/301 |
| 2011/0022212 | A1 * | 1/2011 | Nonaka | G05B 19/4184 700/108 |
| 2011/0047507 | A1 * | 2/2011 | Urbalejo | G06F 17/30554 715/810 |
| 2013/0290925 | A1 * | 10/2013 | Shankar | G06F 8/10 717/105 |

\* cited by examiner

Prior Art

FIG. 36

|  | 122B | 130B |
|---|---|---|
| | Line Layout Template | Line Layout Model |
| | Entity Link Template | Entity Link Model |
| FIELD | DATA TYPE | BAGGER |
| Line_ID | Int | 1 |
| Ent_ID | Int | 9 |
| Child_Order | Int | 5 |
| Line_is_Child | Logical | FALSE |
| Segment_No | Int | Null |
| Can_Be_Bottleneck | Logical | TRUE |
| Last_Edit_Comment | String | Null |
| Last_Edit_By | String | User |
| Last_Edit_At | Date/Time | 41640 |
| Row_ID | ID | 1 |

162

164

3602

3604

LINE MANAGEMENT IN MANUFACTURING EXECUTION SYSTEM

BACKGROUND

The present invention generally relates to the field of networked computerized systems utilized to monitor, log, and display relevant manufacturing/production events and associated data. More particularly, the present invention relates to manufacturing execution systems (MES). Such systems generally execute above/outside of a control layer of a manufacturing/process control system to record production events and related event data.

Industry increasingly depends upon highly automated supervisory control and data acquisition (SCADA) systems to ensure that industrial processes are run efficiently, safely and reliably while lowering their overall production costs. Data acquisition begins when a number of sensors measure aspects of an industrial process and periodically report their measurements back to a data collection and control system. Such measurements come in a wide variety of forms. By way of example the measurements produced by a sensor/recorder include: a temperature, a pressure, a pH, a mass/volume flow of material, a tallied inventory of packages waiting in a shipping line, or a photograph of a room in a factory. Often sophisticated process management and control software examines the incoming data, produces status reports, and, in many cases, responds by sending commands to actuators/controllers that adjust the operation of at least a portion of the industrial process. The data produced by the sensors also allow an operator to perform a number of supervisory tasks including: tailor the process (e.g., specify new set points) in response to varying external conditions (including costs of raw materials), detect an inefficient/non-optimal operating condition and/or impending equipment failure, and take remedial actions such as move equipment into and out of service as required.

Typical industrial processes are extremely complex and receive substantially greater volumes of information than any human could possibly digest in its raw form. By way of example, it is not unheard of to have thousands of sensors and control elements (e.g., valve actuators) monitoring/controlling aspects of a multi-line process within an industrial plant. These sensors are of varied types and report on varied characteristics of the process. Their outputs are similarly varied in the meaning of their measurements, in the amount of data sent for each measurement, and in the frequency of their measurements. As regards the latter, for accuracy and to enable quick response, some of these sensors/control elements take one or more measurements every second. Multiplying a single sensor/control element by thousands of sensors/control elements (a typical industrial control environment) results in an overwhelming volume of data flowing into the manufacturing information and process control system. Sophisticated data management and process visualization techniques have been developed to handle the large volumes of data generated by such system.

Highly advanced human-machine interface/process visualization systems exist today that are linked to data sources such as the above-described sensors and controllers. Such systems acquire and digest (e.g., filter) the process data described above. The digested process data in-turn drives a graphical display rendered by a human machine interface. An example of such system is the well-known Wonderware INTOUCH® human-machine interface (HMI) software system for visualizing and controlling a wide variety of industrial processes. An INTOUCH HMI process visualization application includes a set of graphical views of a particular process. Each view, in turn, comprises one or more graphical elements. The graphical elements are "animated" in the sense that their display state changes over time in response to associated/linked data sources. For example, a view of a refining process potentially includes a tank graphical element. The tank graphical element has a visual indicator showing the level of a liquid contained within the tank, and the level indicator of the graphical element rises and falls in response to a stream of data supplied by a tank level sensor indicative of the liquid level within the tank. Animated graphical images driven by constantly changing process data values within data streams, of which the tank level indicator is only one example, are considerably easier for a human observer to comprehend than a stream of numbers. For this reason process visualization systems, such as INTOUCH, have become essential components of supervisory process control and manufacturing information systems.

The MES monitors production and records various production/manufacturing events and applies known business rules to render decisions governing production operations carried out by the SCADA system. MES systems interface to higher level enterprise resource planning (ERP) systems. The exemplary SCADA/MES environment schematically depicted in FIG. 1 comprises a SCADA portion 11 and an MES database 13. Runtime process data generated by a regulatory control system 12 is received by the SCADA portion 11 through any combination of process data interfaces 14. As those skilled in the art will appreciate, the source of the process data is generally sensor data provided by field devices to regulatory control processors (via a variety of interfaces). The process data thereafter passes from the regulatory control system 12 to the SCADA portion 10 via any of a variety of communications channels including gateways, integrators, and runtime process data storage applications (e.g., plant Historian database).

An MES application 15 running on a plant monitoring application node in the SCADA/MES environment schematically depicted in FIG. 1, provides a series of views driven by the production/utilization information contained within the configured entities (elements) within the MES database 13. MES applications software systems provide a configurable facility for tracking the status (and thus utilization and availability) of plant equipment. Thus, MES applications capture and provide real-time, instantaneous plant/production information relating to the operational status of equipment within manufacturing process chains. MES applications thus facilitate tracking equipment utilization and improving/optimizing plant equipment utilization through efficient use of the plant equipment.

Known MES applications provide performance monitoring on an entity basis. Entities are physical assets in a process/manufacturing facility (broadly, a "plant") whose activity is to be tracked by the MES. Entities can be an entire plant, an area of a plant (e.g., a production floor or warehouse), an organizational group of machines (e.g., those in a particular department), a piece of equipment (e.g., a mixer, dispenser, palletizer, etc.), or a module that makes up a piece of equipment. Entities may operate in varying states (e.g., running, idle, down, maintenance, etc.) at different times. Some MES applications are configured to present information about the operational states of selected entities. Likewise, some MES applications are configured to present information about any known reasons for a presently existing operational state of an entity. Still other MES applications are configured to present information about the production of an entity.

To facilitate the display of relevant entity information, known MES applications provide configuration tools that allow users to create data models of entities, utilization states, and reasons. An MES application may include model configuration templates for the various configurable MES models. A user may respond to queries in a configuration tool to populate the fields of a model configuration template and instantiate a model of a particular entity, state, reason, etc. Thus, for example, a user may be presented with an entity configuration view which queries the user as to a new entity's name, capabilities, etc. Likewise, a user may be presented with a utilization configuration view that queries the user as to a new utilization state's name, associated reasons, etc. As discussed in U.S. Pat. No. 8,639,376, which is assigned to the assignee of the present application and is hereby for all purposes incorporated by reference, data models may be imported from unified SCADA systems into the MES application. In some systems, modeled entities may be related to modeled utilization states and reasons, for example, using relational database techniques.

MES applications receive data from the physical plant either by way of manual data entry from the plant floor or automated reporting systems. Using entity attributes stored in an entity model and logical scripts (broadly, "procedures") stored in the entity database 13, the MES application can display information about the production/operation of a physical entity. If the entity model is associated with utilization states and reasons models, the MES application may be capable of displaying an indication of the utilization state of a particular physical entity and the reason for the present state. Thus, known MES applications are capable of providing information about the production and operation of individual entities. For example, an MES application may present information about the operational state of a particular piece of equipment in the process plant. Using stored procedures, the MES application may be able to determine the production rate of the particular piece of equipment, including information about the status of any jobs assigned to the equipment.

In modern plants, the entity-centric approach to MES reporting has proven inadequate. In many cases, plant operators are concerned with the production/operation of an arrangement of entities, which together carry out a particular production task (broadly, a "production line"). Known MES applications do not support modeling of production lines. For example, known model templates do not support the notion of an arrangement of entities, and instead treat each entity as its own self-contained model. While some systems provide configuration templates for entity models, configuring models of arrangements of entities requires the creation of custom scripts. Similarly, while graphical views are provided for presenting information about the production/operation of individual entities, these views are not aggregated to present information about the production/operation of a line of entities in known MES applications. Because known systems do not support modeling arrangements of entities, stored procedures may only provide production analytics on an entity-by-entity basis, bound by the constraints of the entity models. However, in some instances, line analytics may provide richer information. Accordingly, an MES application that provides configuration tools for configuring data models for lines of entities is desired. Moreover, an MES application with a line model template for modeling arrangements of entities is desired. Likewise, an MES application with analytical tools that evaluate the real-time or near real-time production of a physical production line is desired.

SUMMARY

In one aspect, the present invention includes software comprising processor-executable instructions stored in one or more tangible, non-transitory computer-readable media that when executed perform a method of providing a production metric about a physical production line comprising an arrangement of physical entities. (a) One or more interactive entity configuration views are presented on a display of a workstation. (b) User inputs are received to said one or more interactive entity configuration views. Said user inputs include entity data representing one of said physical entities. (c) An entity data model is generated from said entity data. (d) Steps (a) through (c) are repeated to generate an entity data model for each of the physical entities in the physical production line. (e) One or more interactive line configuration views are presented on said display of the workstation. At least one of said one or more interactive line configuration views has a work area and a palette of entity configuration objects. At least a plurality of said entity configuration objects represent said entity data models generated in steps (c) and (d). (f) User inputs are received that select said plurality of said entity configuration objects and place them on the work area to create a graphical object model representing the physical production line. Said graphical object model comprises an arrangement of entity objects representing said arrangement of physical entities. (g) A line data model is generated based on said user inputs. (h) Production data is received about the physical entities. (i) A production metric of the physical production line is determined using the production data and the line data model. (j) The production metric is displayed on said display.

In another aspect of the invention, a line data model represents a physical production line comprising an arrangement of physical entities. Said line data model is stored in one or more tangible, non-transitory computer-readable media. Said media further stores an entity model for each of the physical entities and processor-executable instructions for using the line data model and production data received from the physical entities to calculate a production metric for the physical production line. Said line data model comprises a line definition model providing a unique identifier for the line data model and a line layout model describing said arrangement of physical entities in the physical production line. Said line layout model includes an entity link model for each of the entity models. Each entity link model is associated with the line definition model and a respective one of the entity models. Each entity link model describes a line position of a respective one of the physical entities. Each entity link model has a data structure that conforms to an entity link template.

In another aspect of the invention, a processor-executable method dynamically determines a source of bottleneck for a physical production line comprising an arrangement of physical entities in at least a plurality of line positions. (a) Data representing an expected production rate for each of the physical entities is stored. (b) A line data model representing the arrangement of the physical entities is stored. Said line data model includes data representing the line position of each of the plurality of physical entities. Said line data model has a data structure conforming to a line model template. (c) A production rate for each of the physical entities is determined using its respective expected production rate. (d) The production rates for the physical entities are grouped by line position using the data representing the line position stored in the line data model to determine a production rate for each of the plurality of line positions. (e)

The production rates of each of the plurality of line positions are compared. (f) It is determined that the source of bottleneck is the line position with a lowest production rate.

Other aspects of the present invention will be apparent in view of the following description and claims.

BRIEF DESCRIPTION OF THE DRAWINGS

FIG. 36 is a table representing a data structure for a line layout template and a line layout model;

Corresponding reference characters indicate corresponding parts throughout the drawings.

DETAILED DESCRIPTION OF THE DRAWINGS

Figure 1:
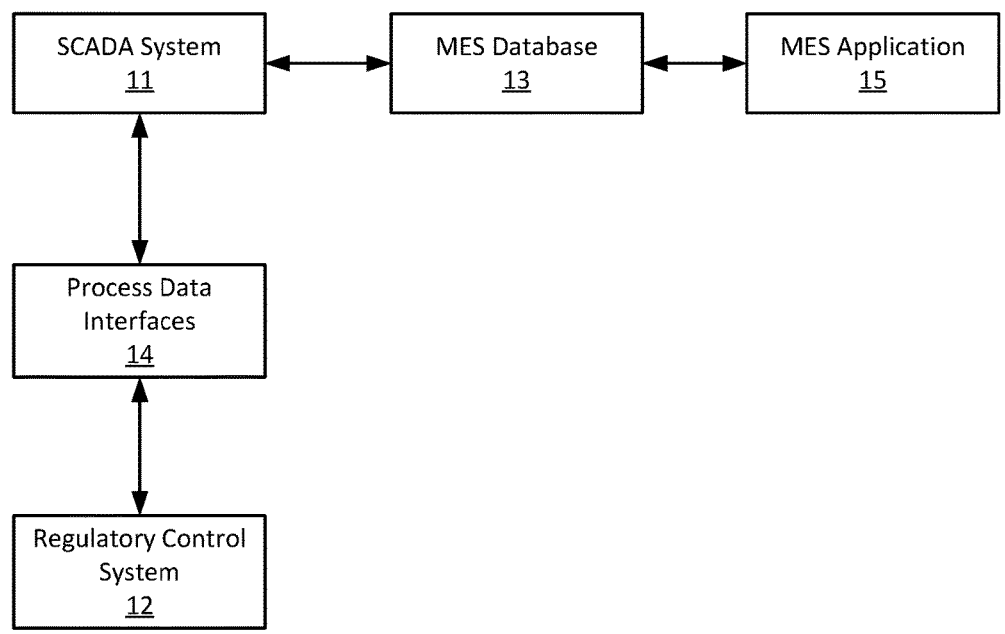
FIG. 1 is a schematic block diagram of a SCADA/MES environment.
Figure 2:
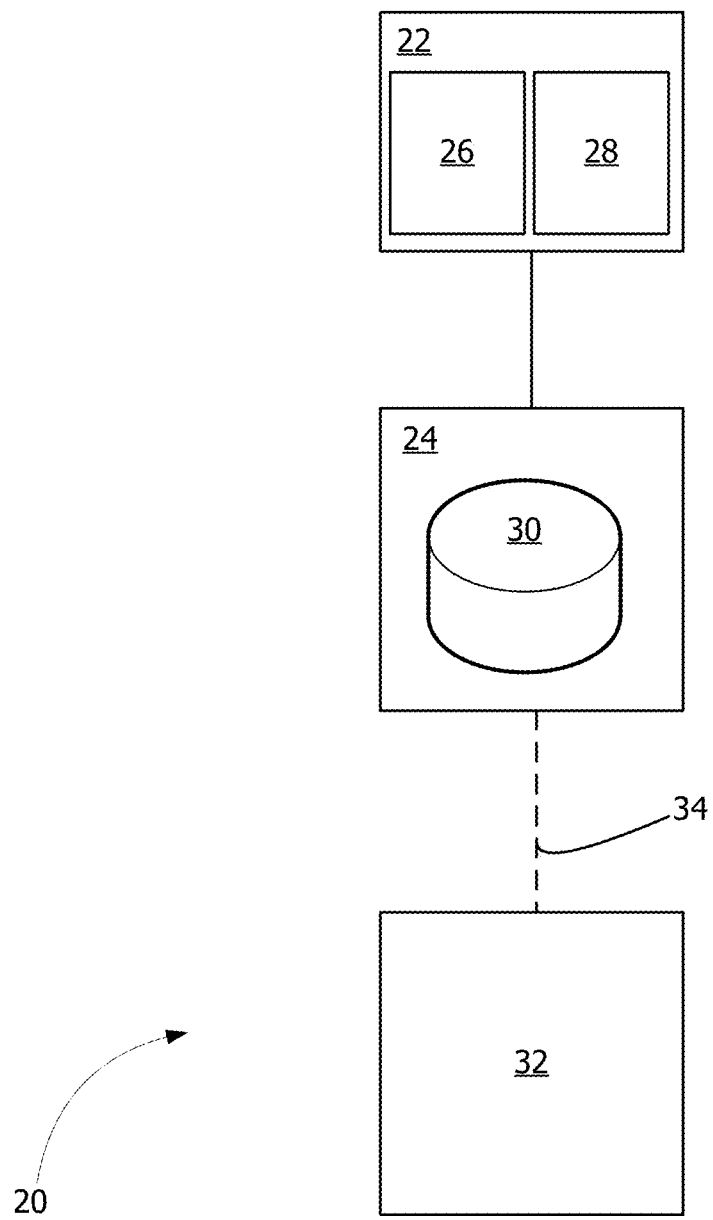
FIG. 2 is a schematic block diagram of an MES.

Referring to FIG. 2, an exemplary architecture for a manufacturing execution system (hereinafter, "MES") of the present invention is illustrated schematically and indicated generally at reference number 20. A workstation 22 provides user access to resources maintained on an MES server 24. In certain embodiments, the MES server 24 may be physically located remote from the workstation 22. The workstation 22 may be a personal computer, mobile device, or other suitable processing device with the capability to display MES information and allow for user input. In the illustrated embodiment, the workstation 22 may access MES resources on the server 24 through a client application 26 or a web browser 28 (e.g., using a web portal). The MES server 28 includes an MES database 30, which stores data models used to describe the various production lines and entities in a physical plant 32. The MES server 24 may likewise store procedures used, for example, in displaying information about the process plant 32 at the workstation 22 or in determining production metrics used to evaluate or predict the performance of the plant 32 and production lines and entities contained therein. The physical plant 32 may report production and status information to the MES server 24 by way of a communications link 34. The communications link 34 may include an intermediate SCADA system which communicates with the plant 32 by way of process data interfaces (see FIG. 1). Alternatively, data may be reported to the MES server 24 directly from the plant floor 32 either automatically or through manual data entry.

For purposes of the following discussion, an entity may be a physical device or geographical location of a process facility. In some embodiments, entities are assets used for the production or storage of goods either directly or indirectly. An entity can be a building, a location within a building, a department, a single machine, etc. Entities may be assigned various capabilities but are not required to have any capabilities assigned thereto. For example, an entity may have the capability to schedule and run jobs, schedule shifts, capture machine utilization, capture labor information, communicate with machine tools (e.g., by Distributed Numerical Control), track overall equipment effectiveness (hereinafter, "OEE"), receive production items, ship production items, store production items, log data, copy folders of files regarding an item's production relative to the entity, or capture quality information. A job may be an instance of an operation for a work order. In an MES, a physical entity may be represented by a data model associated with that entity stored, for example, in the database 30 of FIG. 2. The data model may include information about the capabilities assigned to the entity. In many physical production plants, multiple instances of the same entity type are present. These instances may be members of an entity class that are capable of performing the same task in a production plant. In some embodiments, MES applications may provide tools for creating data models describing an entity class. Other tools may allow easy instantiation of the class model to create corresponding models of each of the entity instances.

A production line may be an ordered arrangement of entities. Typically, entities in a production line are ordered sequentially to carry out a work order. A production line can be, for example, a linear series of machines and work areas that enhance the value of a product in an ordered manner with the previous step being completed before the next step can begin. Other production lines can be more complex, with parallel equipment or even parallel segments or multiple pieces of equipment to increase throughput. Equipment (i.e., entities) can also be shared between two or more production lines. In some cases, a production line may be part of another entity. For example, some kinds of entities may identify a geographical location or processing facility. Those entities may be comprised of one or more production lines. In the MES of the present invention, as discussed in more detail below, a physical production line may be represented by a data model associated with the line. In some physical production plants, multiple instances of the same line type are present (e.g., multiple lines that are made up of the same arrangements of entity types or entities that are capable of performing the same function). These lines may be members of a line class. In some embodiments, MES applications may provide tools for creating data models describing a line class. Other tools may allow easy instantiation of the line class to create corresponding models of each of the line instances.

Figure 3:
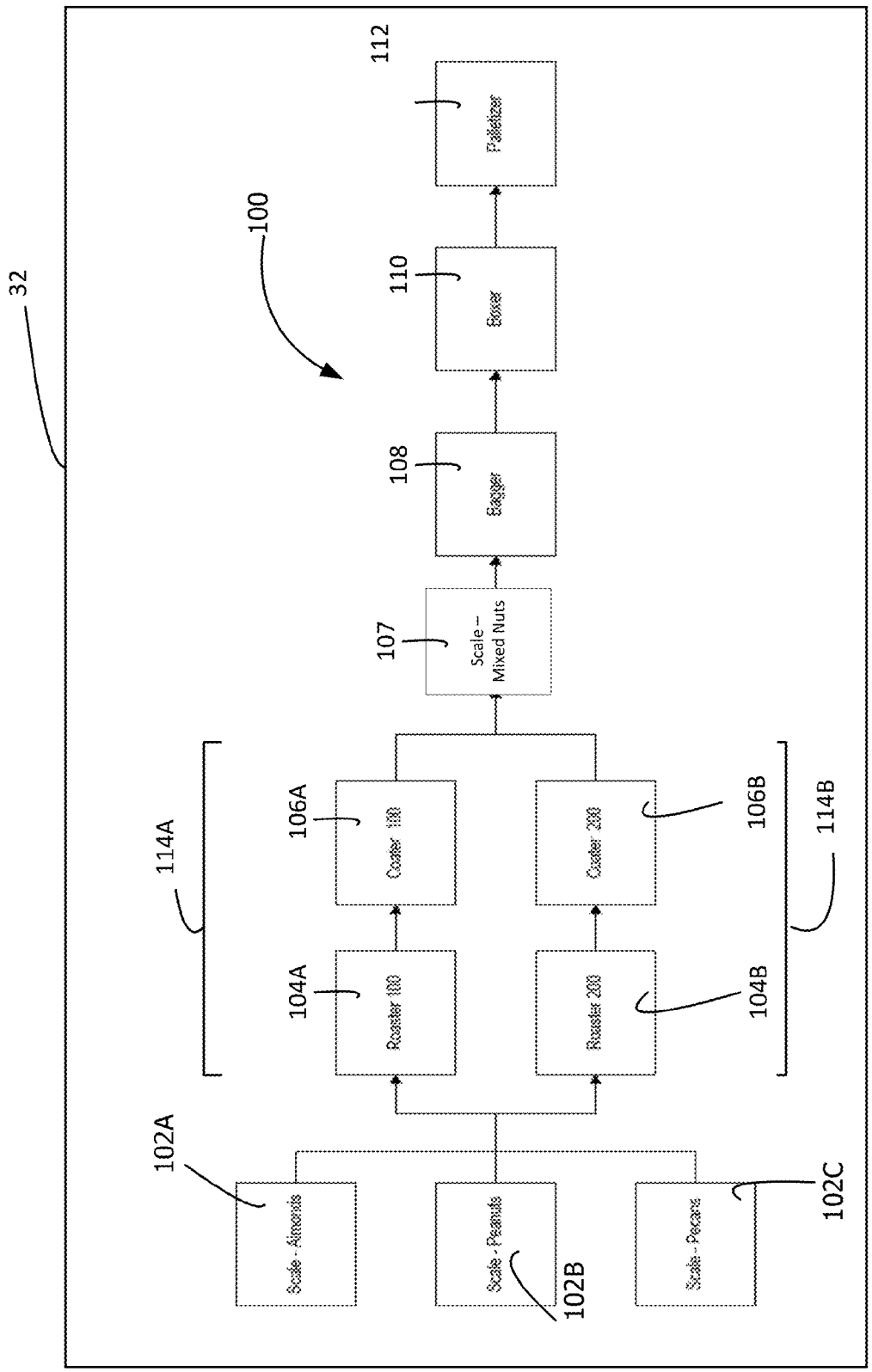
FIG. 3 is a schematic block diagram of a physical plant, including a mixed nuts production line.

As shown in FIG. 3, in one example of a physical plant 32, a production line 100 may be arranged to process raw bulk nuts into pallets of packaged mixed nuts. Such a production line may include one or more scale entities 102A-102C and 107, roasting entities 104A-104B, coating entities 106A-106B, bagging entities 108, boxing entities 110, and palletizing entities 112. Though the illustrated embodiment depicts a physical plant 32 that contains a single production line 100, other plants may include many production lines of the same or different type. The mixed nut line 100 is capable of performing a work order to produce pallets of mixed nuts. Performance of the work order transforms the raw ingredients (almonds, peanuts, pecans) into a finished product (palletized mixed nuts). Thus, the work order includes an ordered sequence of jobs (weighing, roasting, coating, weighing, bagging, boxing, and palletizing), and the production line includes the corresponding ordered arrangement of entities. The physical plant 32 may, as discussed above, be considered an entity and represented by an entity model stored in the MES database 30 of FIG. 2. In that case, the plant entity 32 would be considered a parent entity to the line 100 and each of the physical entities on the line 102-112. Each of the entities 102-112 may be represented by a respective entity model stored in the MES database 30. The mixed nuts line 100 may be represented by a line model stored in the MES database 30, as will be discussed in more detail below.

A production line, such as the mixed nut line 100, may include of a combination of serial and parallel entities. The basic structure of a production line is determined based on the number of entities at a given line position. In some embodiments, a line position may be a step in the sequence of a production line that carries out a particular job. In the illustrated line 100, there are seven line positions. The parallel scale entities 102A-102C make up a first line position, the roasters 104A-104B make up a second line position, the coaters 106A-106B make up a third line position, the scale 107 makes up the fourth line position, the bagger 108 makes up a fifth line position, the boxer 110 makes up a sixth line position, and the palletizer 112 makes up the seventh line position. The term "parallel entities" may refer to a set of two or more entities that are at the same line position. So, for example, in the illustrated production line 100, the scale entities 102A-102C are each at the first position on the line, and each sends material to the same set of entities (roasters 104A-104B) at the immediately subsequent line position. Likewise, the roasters 104A-104B and coaters 106A-106B are each respective pairs of parallel entities that receive source material from entities at the same prior line position, perform the same job function, and send the processed material to entities at the same subsequent line position. Purely serial entities, such as the bagger 108, boxer 110, and palletizer 112, do not have any other entities at the same position in the production line.

Some production lines, such as the mixed nuts line 100, may contain line segments, or subsets of entities in a line that act as lines unto themselves. Line segments may include a combination of serial and parallel entities. In the illustrated embodiment, the roaster 104A and coater 106A may be one line segment 114A, while the roaster 104B and coater 106B may be another, parallel line segment 114B. Line segments that are parallel with each other typically contain the same sequence of entity types, and the corresponding entities in the parallel segments use the same line positions. An entity in a line segment may be configured to receive source material from only one of several parallel entities at the prior line position. As will be discussed in more detail below, the illustrated MES application provides built-in capability for modeling line segments.

A work order represents a request for some quantity of an item (e.g., pallets of mixed nuts) to be produced on or before a due date. To be executed, the work order may comprise a set of jobs that represent the complete set of operations required to manufacture that item from ingredients or components (e.g., almonds, peanuts, and pecans). These ingredients may have been purchased or manufactured as the result of a previous work order. A job represents an instance of an operation for a given work order. A job can include a list of steps or procedures that are executed to perform that operation. In turn, a work order consists of a set of jobs that are executed to produce an item.

As mentioned above, the MES 20 may be used to provide information about various production events to users associated with a plant 32. The illustrated MES 20 uses the concepts of states and reasons (broadly, "utilization") to provide information to users about the entities, lines, work orders, and jobs in a plant. However, other MES applications may provide information about production events using another conceptual framework without departing from the scope of the invention. A utilization state refers to the present operating status of an entity, line, work order, or job. Thus, for example, an entity may be ascribed a state of running, idle, down, maintenance, etc. Suitably, the MES 20 may provide tools for configuring utilization states that describe to a desirable degree of granularity the operational statuses of the entities, lines, work orders, and jobs in a plant. Likewise, the MES 20 may provide tools for receiving data from a process plant 32, ascertaining the operational status of one of an entity, line, work order, or job, and displaying utilization state information to a user at a workstation 22. A utilization reason provides the underlying cause of a utilization state. Thus, for example, a reason "Bottle Jam" can be associated with a "Downtime" utilization state for a bottling entity (not shown). Like utilization states, utilization reasons may be configured using tools provided in the MES 20, by way of user inputs provided at the workstation 22. The MES 20 may be configured to receive data from a process plant 32, ascertain the reason for a presently existing operational state of an entity, line, work order, or job, and display utilization reason information to a user at a workstation 22. In some embodiments, utilization reasons may have associated priority. Thus, one utilization reason for an entity may have a higher utilization reason than another entity. Suitably, the MES 20 may be configured to store associations between utilization reasons and utilization reason priority in the MES database.

The illustrated MES 20 is configured to determine production metrics about lines and entities modeled therein. As discussed above, the server 24 receives production data from the physical plant 32. This data is used to determine some types of production metrics in real time or near-real time. For a given entity, an expected production rate may be the estimated production rate for the job currently running on the entity, the estimated production rate for the next job scheduled to run on the entity, or the default production rate for the entity (if, e.g., no jobs are scheduled for the entity). For each job assigned to an entity in a line, the MES database 30 may store an expected production rate for the entity (e.g., in a data element representing the job). Likewise, as discussed in more detail below, the MES database may store data representing the default production rate for one or more entities. The actual production rate is calculated by dividing the total production (good and reject) by the amount of time that the entity was in a running state for the job. In the illustrated MES 20, entities are associated with standard items for particular jobs. For example, the bagger 108 may produce a standard item of bags of mixed nuts. An entity's production may be measured in terms of its standard item.

To determine a line's production rate in the illustrated MES 20, several parameters must be defined. A standard item for a line is similar to a standard item for an entity; it defines the type of item being produced on the line. The mixed nuts line 100 may, for example, have a standard entity of pallets of mixed nuts. A line also has a standard batch size. A batch size may be the number of standard entities produced in one batch. The mixed nuts line may be configured to produce a batch of one pallet of mixed nuts. Additionally, to determine production metrics for a line, it may be helpful to define a production unit of measure, such as batches per hour. Standard item, batch size, and production unit of measure are merely exemplary of one set of parameters suitable for calculating production metrics associated with a production line. Other parameters may also be used without departing from the scope of the invention. The illustrated MES 20 may be used to calculate a line's performance amount and production amount. A line's performance amount is the amount of production (good and reject) to be used when calculating performance metrics. The performance amount is based on the production at the line's bottleneck entity. If a line's bottleneck is a set of parallel entities, the performance amount for the line will be the sum of the performance amounts of the parallel entities. A line's production amount is the amount of production that is usable for, for example, reporting to resource planning systems (good and reject). It is based on the amount of production at the entity defined as the line's production source, which is usually the last entity in the line. If there are other entities at the same position as the entity that is defined as the production source, the production amount will be the sum of the production on all the entities at the line position.

As will be discussed in greater detail below, the illustrated MES is capable of determining the source of bottleneck (broadly, the "bottleneck entity") for a modeled line. Identifying a bottleneck entity may be useful, for example, in determining a line's performance rate. The bottleneck entity is the entity or set of parallel entities in a line that have the lowest production rate, and thus limit the rate at which the entire line can produce items. In some production lines, the entity production rate can vary by whether a job is running and by which job is running Therefore, the bottleneck is not necessarily a fixed entity or line position. The production rate for a set of parallel entities is determined by adding the appropriate production rates of each eligible entity and converting them to a common unit of measure. The production rate of the bottleneck entity is used as the line's production rate, and the performance amount of the bottleneck entity or parallel entities may be used as the line's performance amount.

Figure 4:
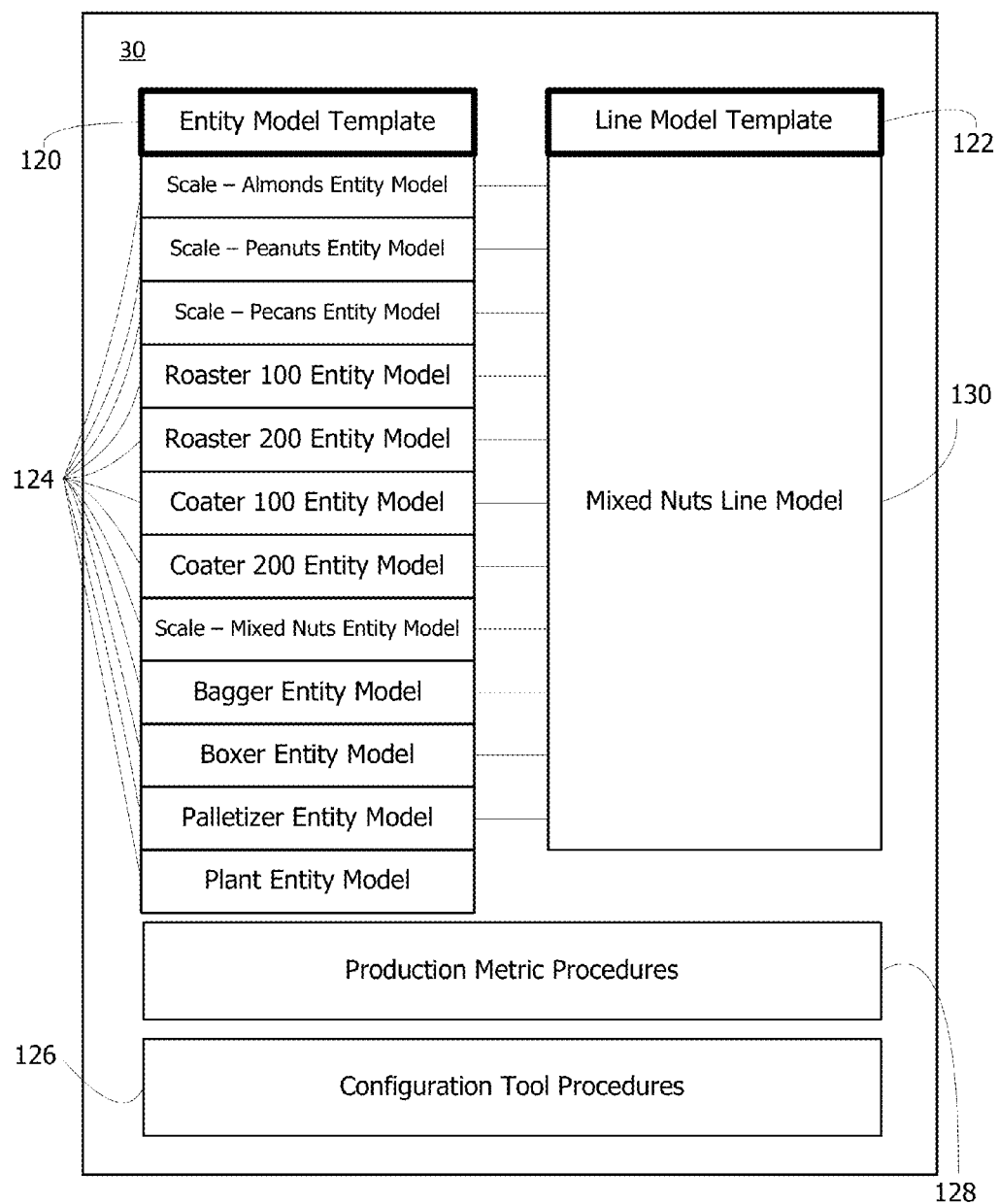
FIG. 4 is a schematic block diagram of an MES database.

As shown best in FIG. 4, in the illustrated MES 20, the MES database 30 is configured to store an entity model template 120 and a line model template 122. As will be discussed in more detail below, a plurality of entity data models 124, each representing a physical entity in a physical plant 32, may be configured using the entity model template 120. Thus, each of the entity data models 124, which respectively represent the entities 102-112 of the mixed nut line 100 shares a common data structure that is based on that of the entity model template 120. In some embodiments, the entity model template 120 is stored in the database 30 when the MES application is initially loaded on the server 24. Then, using configuration tool procedures 126, a user may instantiate entity data models 124 to represent the physical entities in the plant 32. The entity model template 120 may define the data fields that are used in an entity model. For example, if the MES database 30 is a relational database, the entity model template 120 may define a plurality of rows of entity parameters that make up an entity data model 124. To instantiate a particular entity data model 124, a user may access the configuration tool procedures 126 through the workstation 22 (FIG. 2) to provide data that describes a particular physical entity in terms of the parameters in the entity model template 120. Once these parameters are provided, the user may save the entity data model 124 to the database 30, where production metric procedures 128 may be configured to access the model. Each of the illustrated entity data models 124 was configured using the entity model template 120 and therefore has a data structure that is known and understood by the MES 20. Thus, production metric procedures 128, which may be stored in the database 30 when the MES application is loaded to the server 24, can be pre-programmed to interact with the data in the entity data models 124 using the structure of the entity model template 120.

One or more line data models 130, each representative of a production line in a physical plant 32, may be configured and stored in the database 30 using the line model template 122. In the illustrated embodiment, a single mixed nuts line data model 130 has been instantiated using the data structure of the line model template 122. In some embodiments, the line model template 122 is stored in the database 30 when the MES application is initially loaded to the server 24. As will be discussed in more detail below, each line data model 130 relates to a plurality of entity data models 124 as a physical production line relates to the plurality of its constituent entities. Thus, in some embodiments the configuration tool procedures 126 will permit a user to instantiate a line data model 130 from the line template 122 that relates to a plurality of preconfigured entity data models 124. The line model template 122 may define the data fields that are used in a line data model 130. For example, if the MES database 30 is a relational database, the line model template 122 may define a plurality of rows of line parameters that make up a line data model 130. To instantiate a particular line data model 130, a user may use the configuration tool procedures 126 to provide data that describes the particular physical production line (e.g., line 100) in terms of the parameters defined in the line model template 122. Once the parameters of the line models have been provided, the user may save the line data model 130 to the database 30, where production metric procedures 128 may be configured to access the model. Because configured line data models 130 may conform to a data structure (i.e., that of the line model template 122) that is known and understood by the MES application 120, the production metric procedures 128 may be pre-programmed to interact with the data in the line models.

It should be understood that schematic diagram of FIG. 4 may only represent a portion of the actual data stored in the MES database 30. For example, a user may use the configuration tool procedures 126 to store data models for utilization states and reasons. Much like the entity data models 124 may be related to a respective line data model 130, data models for utilization states and reasons may be associated with the entity data models 124 to which they apply. Similarly, data elements that represent work orders and jobs may also be stored on the database 30 without departing from the scope of the invention. As discussed above in reference to FIG. 2, the MES server 24 receives operational data from the physical process plant 32. This data may likewise be stored on the database 30 and accessed by the production metric procedures 128. Still other data elements may also be stored on the MES database 30 without departing from the scope of the invention. It should be understood that, though the illustrated embodiment stores the templates 120-122, the data models 124 and 130, and the procedures 126-128 in the MES database 30, other embodiments may use more than one data storage system without departing from the scope of the invention. Thus, the MES database may be physically stored on more than one storage medium without departing from the scope of the invention.

Figure 5:
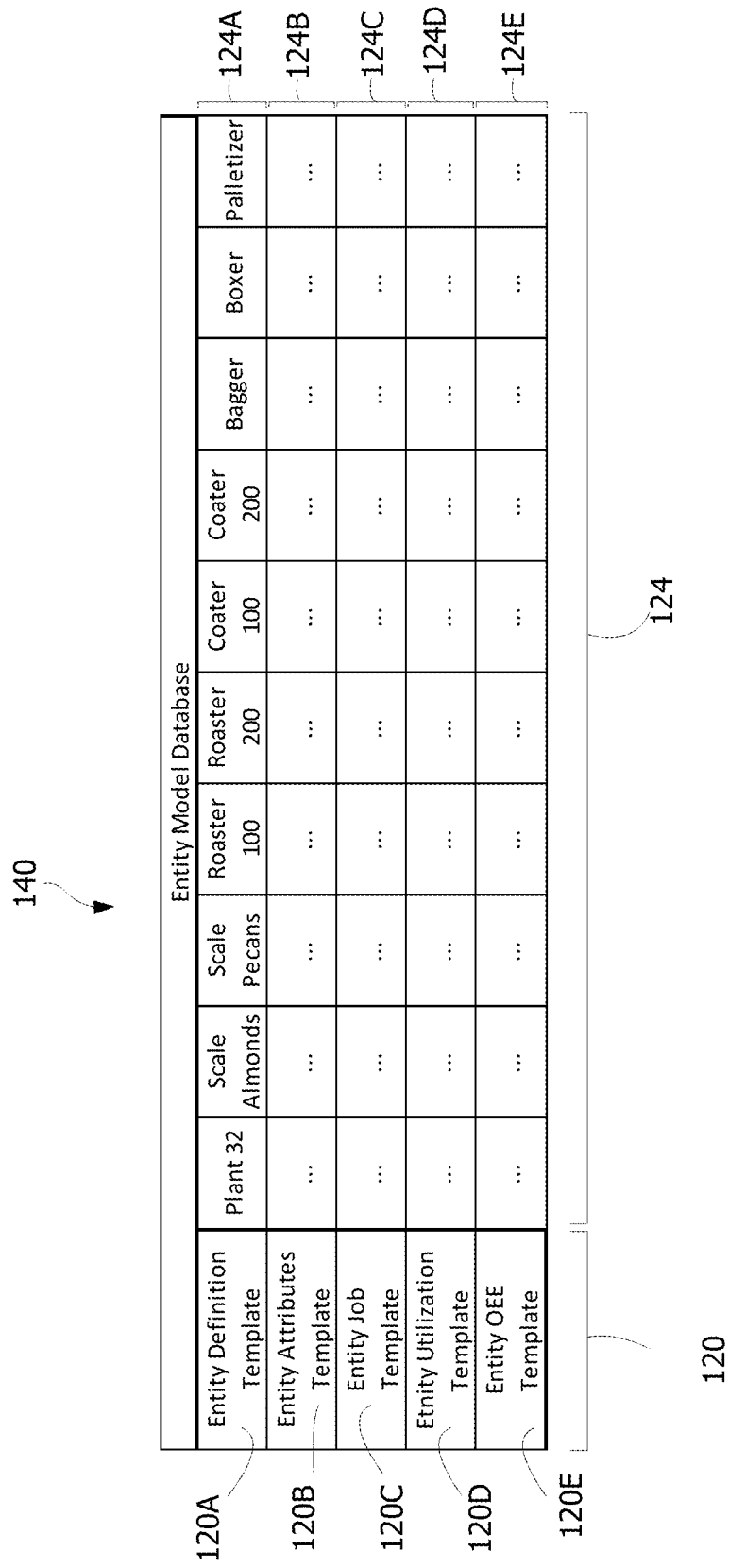
FIG. 5 is a table that schematically illustrates an entity model database.

As shown in FIG. 5, in some embodiments, entity data models 124 may be stored in a relational database 140 (which may, e.g., be a portion of the MES database 30). In the illustrated embodiment, the entity model template 120 is made up of several sub-templates 120A-120E. Each of the sub-templates 120A-120E may be used to define the structure of a separate table in the database 30. Thus, each entity data model 124 may include data formed in separate tables defined by the structures of separate sub-templates 120A-120E, which, in the aggregate, define the entity model template 120. Known relational database techniques may be used to associate the data from each of the separate tables to generate an entity data model 124. Alternatively, the sub-templates 120A-120E may be respective sub-parts of a single table defined by the data structure of the entity template 120. It should also be noted that, though the illustrated MES 20 provides a relational database-based modeling environment for the entity models, other modeling environments may also be used without departing from the scope of the invention.

The illustrated entity model database 140 includes, for each modeled entity 124, an entity definition model 124A, an entity attributes model 124B, an entity job model 124C, an entity utilization model 124D, and an entity OEE model 124E. The combination of an entity definition model 124A, entity attributes model 124B, entity job model 124C, entity utilization model 124D, and entity OEE model 124E for a particular entity defines the entity data model 124 for that entity. Each of the models 124A-124E is based on the data structure of a respective entity sub-template 120A-120E. As will be discussed in more detail below, the configuration tool procedures 126 may be used to populate the data fields in each of the entity models 124A-124E. Though the illustrated embodiment of the MES 20 provides the five sub-templates 120A-120E of the entity template 120 and the five models 124A-124E for each entity data model 124, it should be understood that other entity templates and entity model structures may also be used without departing from the scope of the invention.

Figure 6:
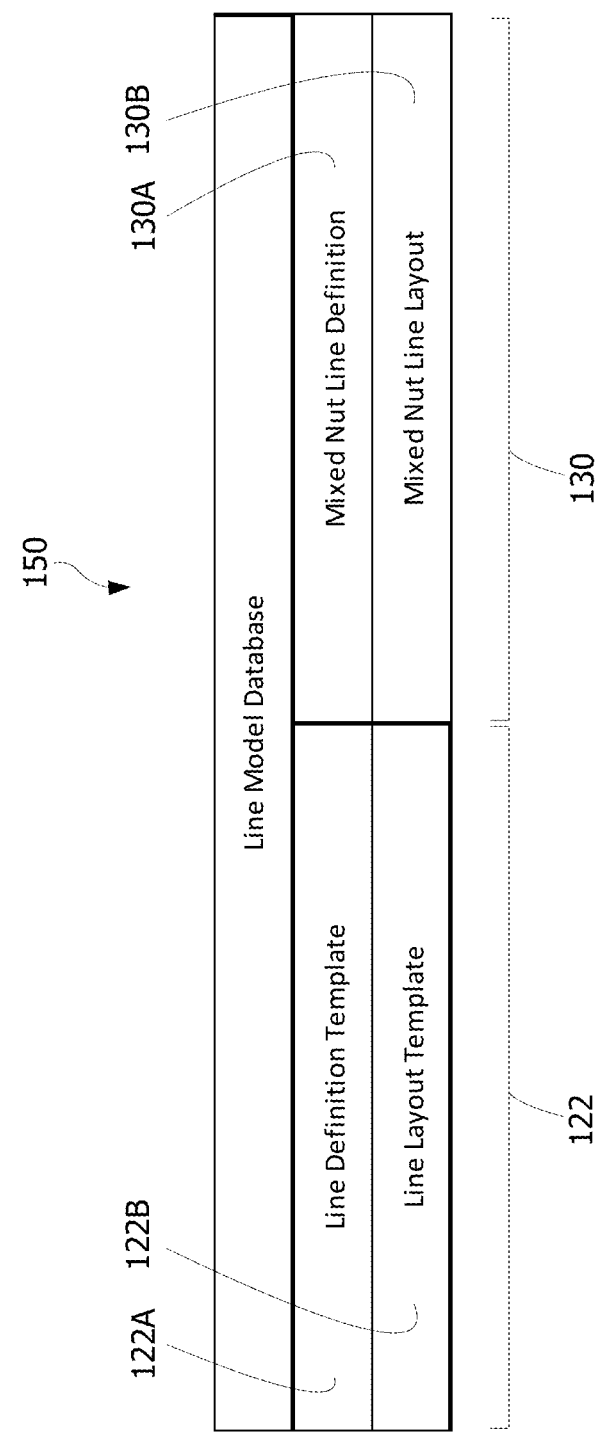
FIG. 6 is a table that schematically illustrates a line model database.

As shown in FIG. 6, in some embodiments, line data models 130 may be stored in a relational database 150 (which may, e.g., be a portion of the MES database 30). In the illustrated embodiment, the line model template 122 is made up of two sub templates 122A, 122B. It should be understood that each of the sub-templates 122A, 122B may be used to define the structure of a separate table in the database 30. Thus, each line data model 130 may include data formed in separate tables defined by the structures of separate sub-templates 122A, 122B, which, in the aggregate, define the line model template 122. Known relational database techniques may be used to associate the data from each of the separate tables to generate a line data model 130. Alternatively, the sub-templates 122A, 122B may each form a portion of a single template 122 for MES applications in which the line data models 130 are to be stored in a single table. It should also be noted that though the illustrated MES 20 provides a relational database-based modeling environment for the line data models 130, other modeling environments may also be used without departing from the scope of the invention.

The illustrated line model database 150 includes, for each modeled line, a line definition model 130A and a line layout model 130B. The combination of a line definition model 130A and a line layout model 130B for a particular line defines the line data model 130 for that line. Each of the models 130A, 130B is based on the data structure of a respective line sub-template 122A, 122B. As will be discussed in more detail below, the configuration tool procedures 126 may be used to populate the data fields in each of the line data models 130A, 130B. Though the illustrated embodiment of the MES 20 provides the two sub-templates 122A, 122B for each line template 122 and two line data models 130A, 130B for each line data model 130, it should be understood that other entity templates and entity model structures may also be used without departing from the scope of the invention.

Figure 7:
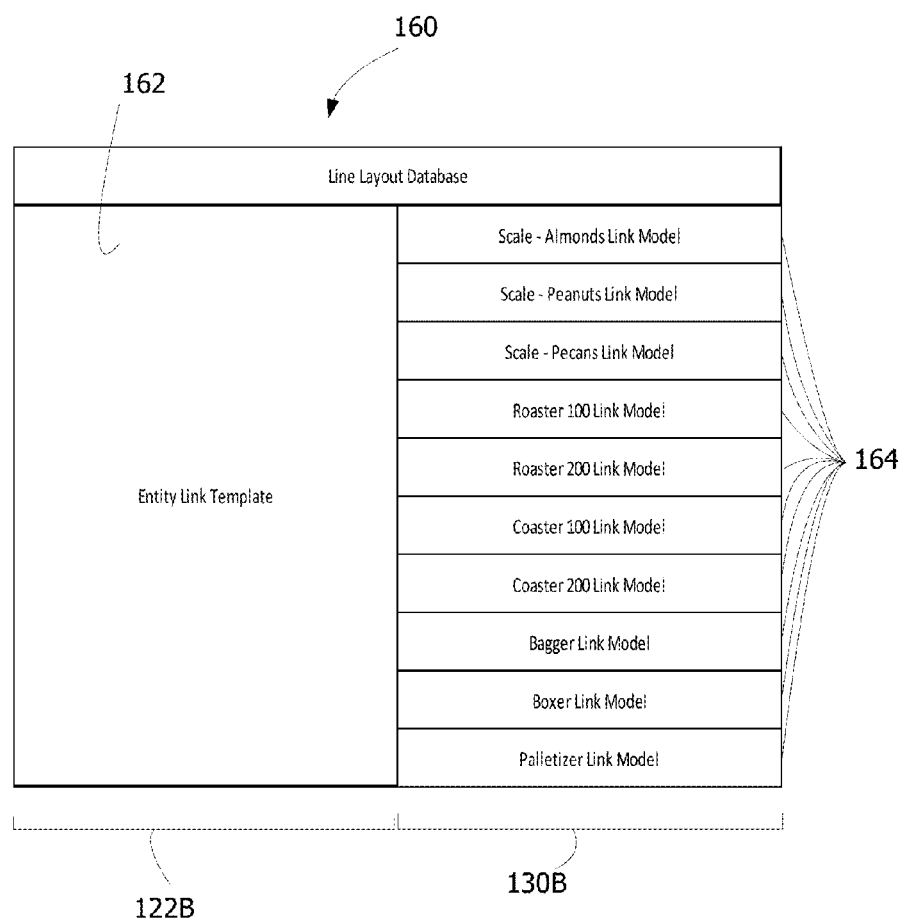
FIG. 7 is a table that schematically illustrates a line layout database.

As shown in FIG. 7, a line layout database 160 (which may, e.g., be a portion of the MES database 30) may be configured to store the line layout sub-template 122B and corresponding line layout models 130B. In the illustrated embodiment, the line layout sub-template 122B includes an entity link template 162. The illustrated entity link template 162 provides a data structure suitable for separately modeling each entity's place/role in a physical production line (e.g., the line 100 of FIG. 3). Thus, in the illustrated embodiment, the line layout model 130B includes a plurality of entity link models 164 that associate each of the respective entity data models 124 (FIGS. 4-5) with the line data model 130. Each of the entity link models 164 is respectively instantiated from the data structure of the entity link model template 162. In preferred embodiments, the entity link models 164 reference or are otherwise associated with particular ones of the entity data models 124 that are associated with the physical entities in the line. Likewise, in preferred embodiments, the entity link models 164 identify the place/role of an associated entity of a physical production line. In some embodiments, each entity link model 164 may further reference or be otherwise associated with a respective line definition model 130A. Thus, in the illustrated embodiment, the plurality of entity link models 164 each provide respective data representations of the place/role of one of the physical entities 102-112 in the mixed nuts line 100. Together, the entity link models 164 define the line layout model 130B, which, in association with the line definition model 130A, makes up the line data model 130.

Figure 8:
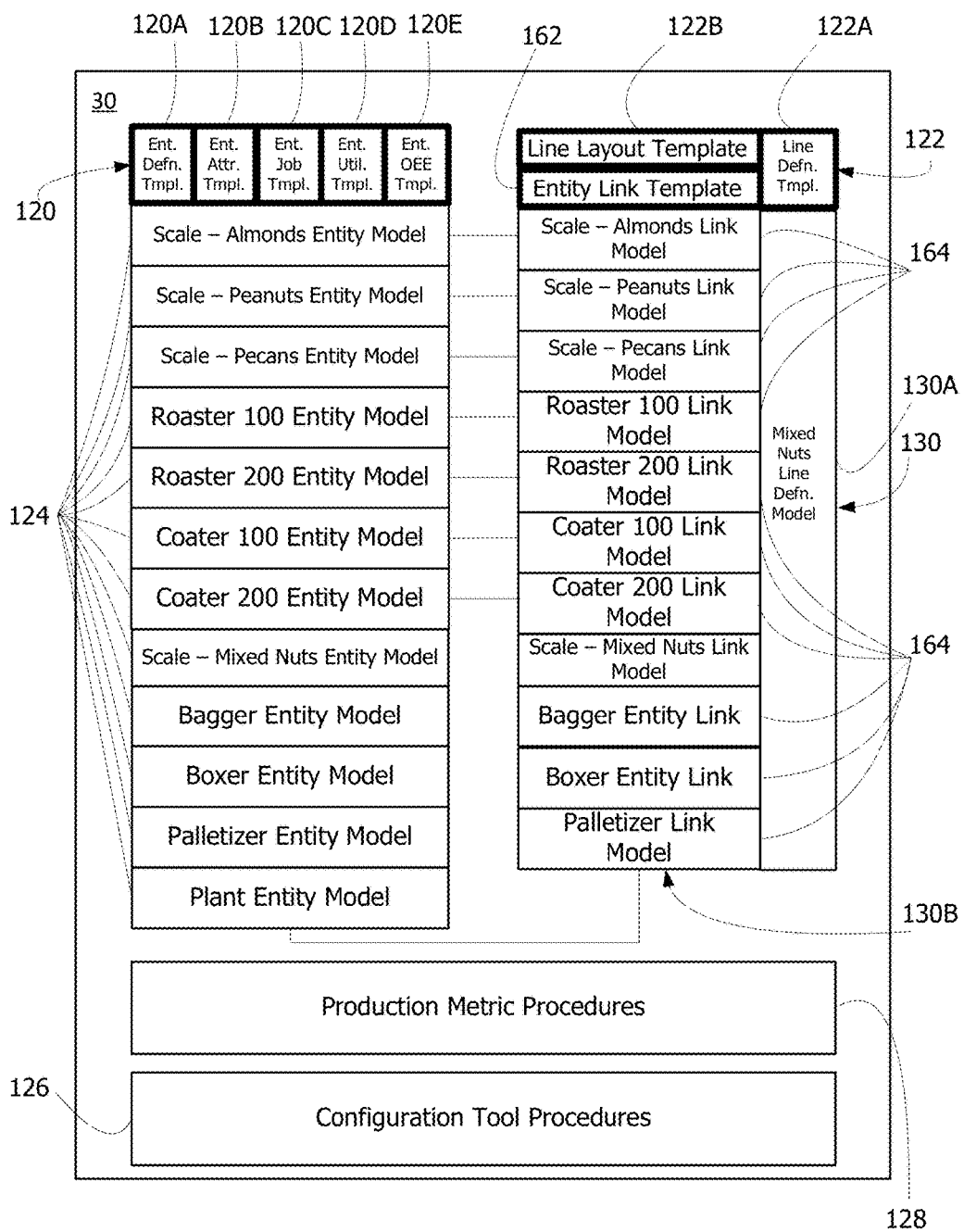
FIG. 8 is the schematic block diagram of FIG. 4, with the contents of the MES database shown in more detail.

As shown in FIG. 8, an exemplary MES database 30 includes the entity model template 120, made up of sub-templates 120A-120E. The database 30 also includes the line model template 122, which further includes the line definition sub-template 122A and the line layout sub-template 122B. As discussed above, the illustrated line layout sub-template 122B includes the entity link template 162. Entity data models 124 are configured in accordance with the entity model template 120 and entity model sub-templates 120A-120E (e.g., using the configuration tool procedures 126) to represent each of the physical entities 32, 102-112 in the plant 32 (see FIG. 3). A line data model 130 for the mixed nuts line 100 is configured in accordance with the line definition sub-template 122A and the line layout sub-template 122B. A mixed nuts line definition model 130A is configured using the configuration tool procedures 126 and the line definition sub-template 122A. An entity link model 164 is configured for each of the entities 102-112 in the line 100 using the entity link template 162 and configuration tool procedures 126. Each of the entity link models 164 is associated with a respective one of the entity data models 124. Likewise each of the entity link models 164 is associated with its respective line definition model 130A, thereby associating the line layout model 130B with the line definition model. As will be discussed in more detail below, other associations may also be made in the MES database 30. For example, in the illustrated embodiment, the parent plant entity data model 124 is associated with the line definition model 130A.

Figure 9:
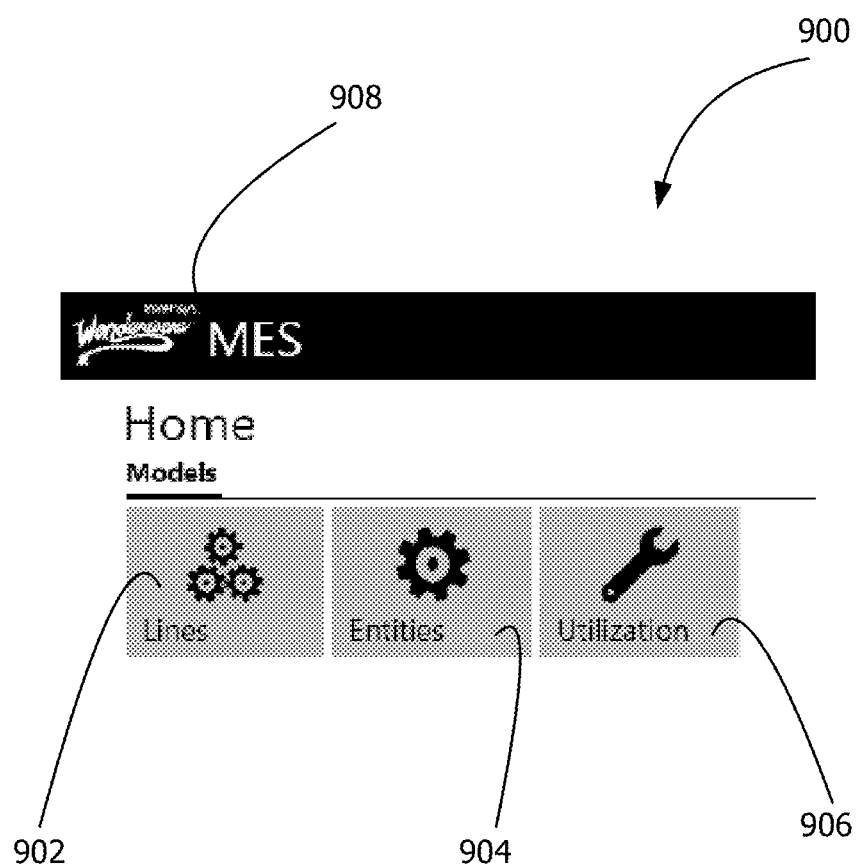
FIG. 9 is a partial screenshot of a home screen view of the MES.

Referring to FIG. 9, a screenshot of a home view of a graphical user interface of the MES 20 is indicated generally at reference number 900. The illustrated home view 900 may be presented on a display of the workstation 22 of FIG. 2. The illustrated MES 20 provides a user interface to configure and monitor plant models and production processes. More specifically, the illustrated MES 20 provides tools for configuring data models for production lines, entities, and utilization states and reasons. The data models may be stored on the database 30 and used to collect plant process information from operators or the physical process equipment directly. Analytical tools and display tools are also provided that present visual representations of operation and performance of the plant. During run-time, the MES 20 may be used, for example, to monitor the status of a line's work orders, jobs, and entities, add or reduce production for a job, manage entity events, or mark a job as complete. Other functions may also be performed by an MES application or an MES application operating in conjunction with additional resources without departing from the scope of the invention.

The home view 900 includes selectable display objects (broadly, "tiles") for accessing hierarchical features of the illustrated MES application. A lines tile 902 provides navigation to a lines view, an entities tile 904 provides navigation to an entities view, and a utilization tile 906 provides navigation to a utilization view. A user may select any of the tiles 902-906, using any suitable selection technique (e.g., left clicking a mouse with a cursor hovering over a desired tile, pressing a touch screen interface at a desired location, etc.) The home view navigational button 908 appears at the top of each view of the illustrated MES 20. Selection of the home view navigational button 908 will direct the application back to the home view 900 of FIG. 9. In the illustrated MES application, the home view 900 and subsequently discussed views may be displayed in a web browser 28. In this case, the displays are generated at the MES server 24 and transmitted through a network to a browser 28 of a workstation 22. It should be understood, however, that MES views may also be generated at the workstation 22 without departing from the scope of the invention.

Figure 10:
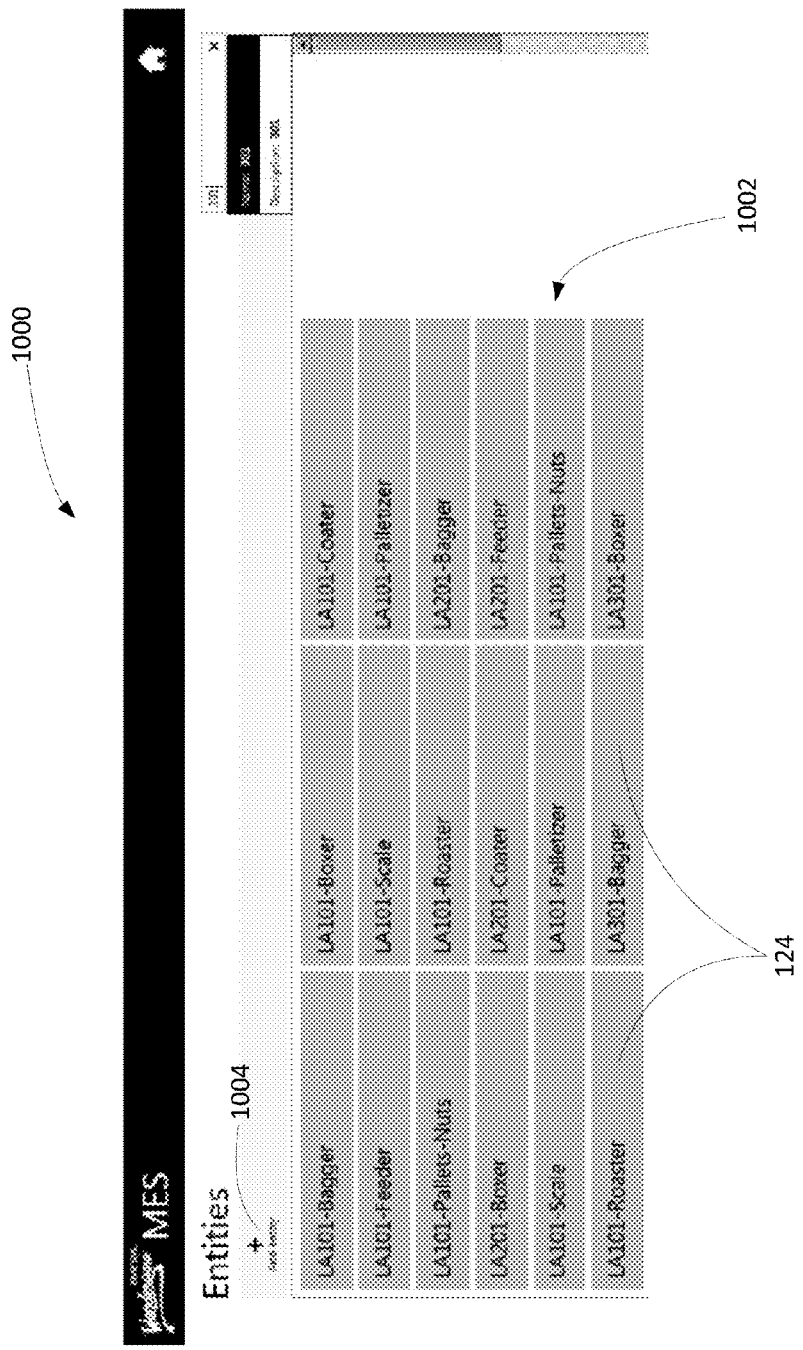
FIG. 10 is a partial screenshot of an entities collection view of the MES.

A user may select the utilization tile 906 to access tools for configuring utilization states and reasons. Likewise, as shown in FIG. 10, the MES 20 may be configured to navigate from the home view 900 to an entities view 1000 when the entities tile 904 is selected. In some embodiments, the entities view may provide a list 1002 of the entity data models 124 that have been configured and stored in the MES database 30. In addition, the entities view may provide an add entity selection object 1004 that navigates to the new entity configuration view 1100 of FIG. 11.

Figure 11:
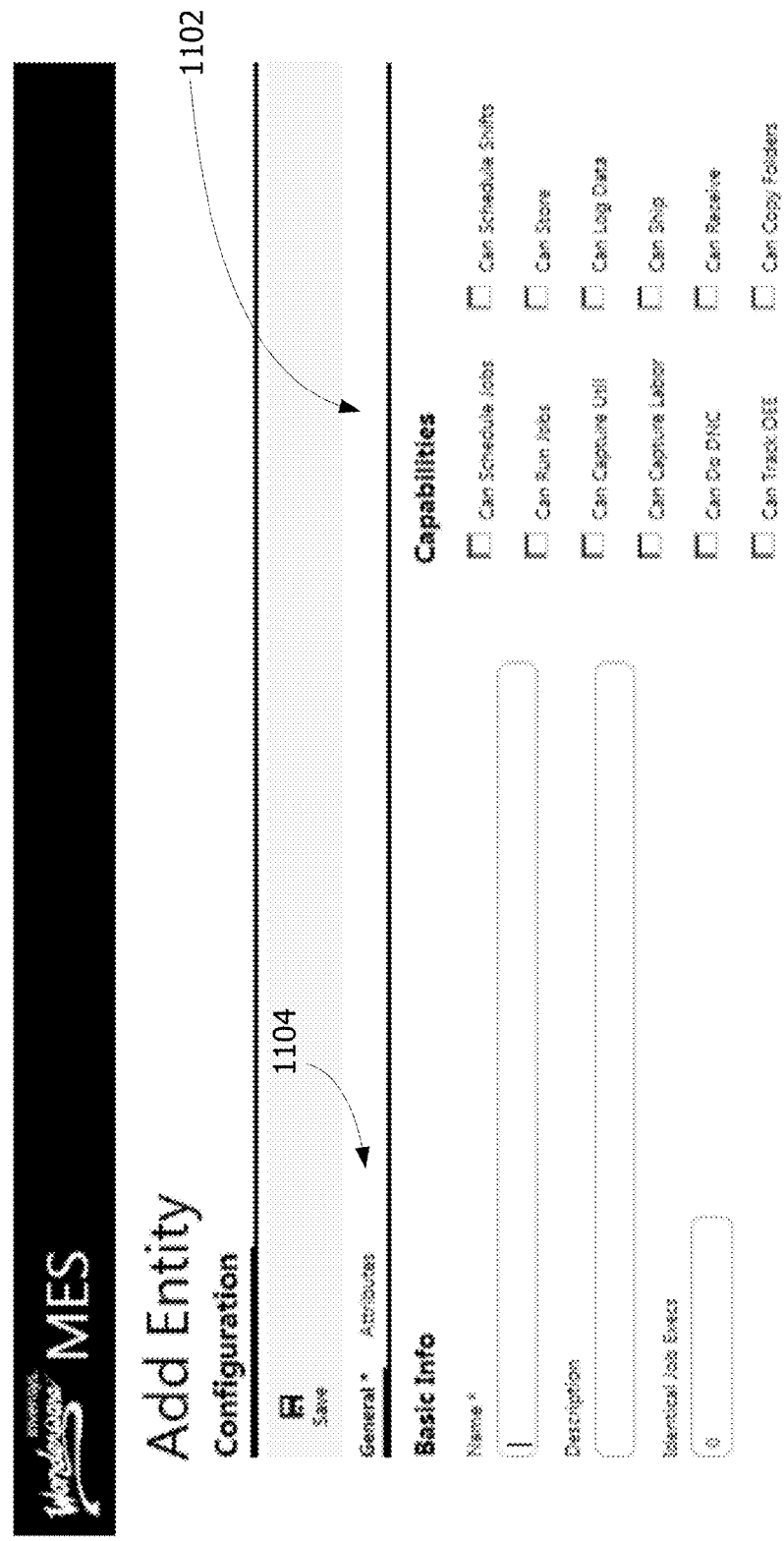
FIG. 11 is a partial screenshot of an entity definition configuration view of the MES.
Figure 12:
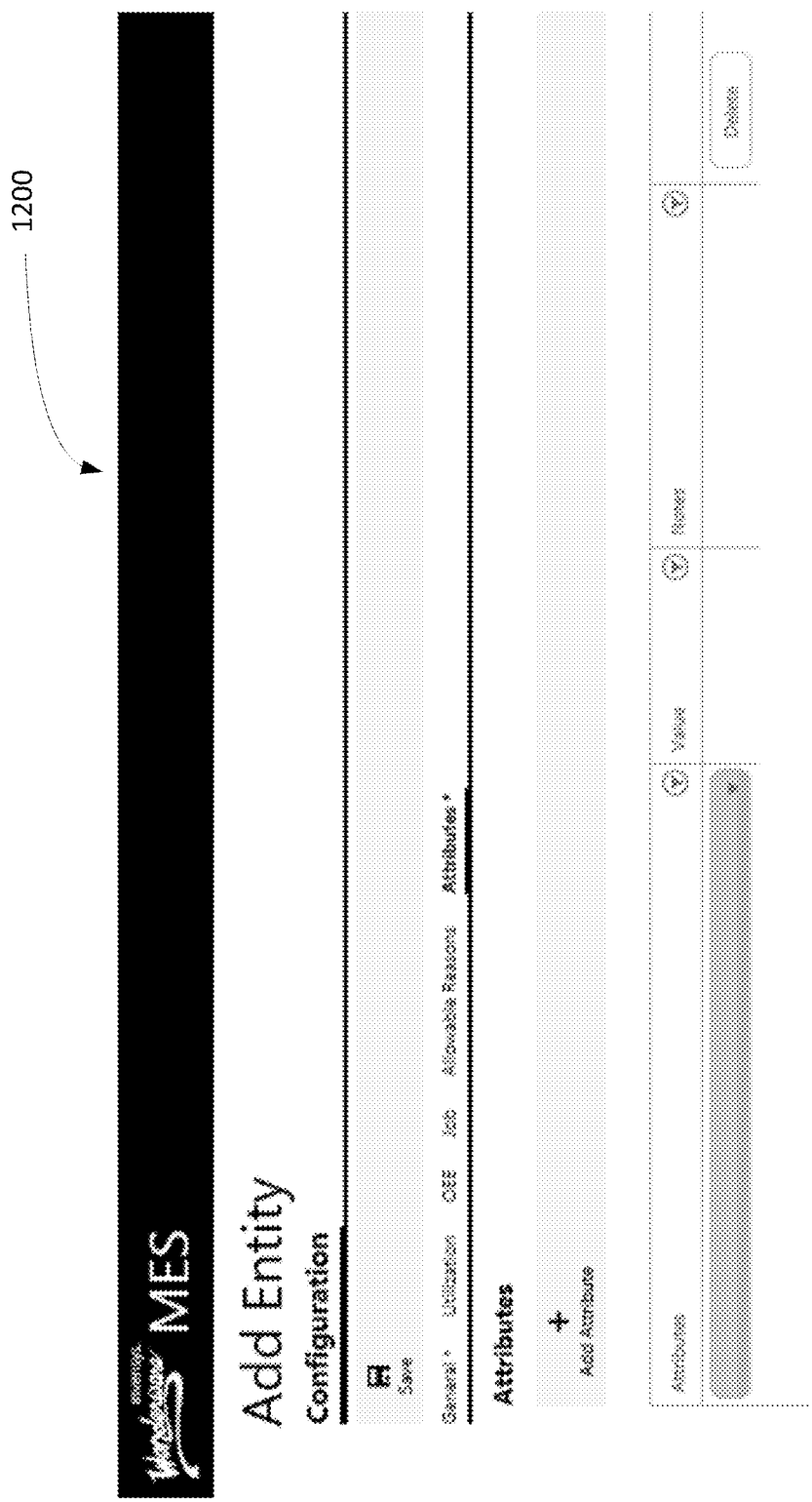
FIG. 12 is a partial screenshot of an entity attributes configuration view of the MES.

As shown best in FIGS. 11-16, the configuration tool procedures 126 may present a plurality of views that provide user input functionality that enables a user to configure entity data models 124 and store them on the MES database 30. For example, the view 1100 of FIG. 11 provides a graphically based data entry form with fields that correspond to the data structure of the entity definition sub-template 120A (FIG. 5). For each physical entity in a process plant, a user may enter data into the fields of the view 1100 to instantiate an entity definition model 124A representative of the physical entity. When the user saves the entries in view 1100, a new entity definition model 124A may be created. In some embodiments, the entity definition model 124A may be a standalone table in the MES database 30. Preferably, in these embodiments, relational database techniques are employed to associate the entity definition model 124A with other parts of the entity data model 124. In other embodiments, the entity definition model 124A may be a subset of the data stored in a larger table that defines the entire entity data model 124.

The view 1100 includes a capabilities palette 1102. A user may select or deselect various capabilities from the capabilities palette 1102 to create a model 124 that appropriately reflects an entity's capabilities. In the illustrated embodiment, the "Can Run Jobs," "Can Capture Utilization," and "Can Track OEE" capabilities must be selected for an entity data model 124 to be usable with a line data model 130. As will be discussed in more detail below, selection of each of these capabilities from the palette 1102 enables access to new tabs in the tabulation ribbon 1104, which respectively link to views used to configure the entity job model 124C, entity utilization model 124D, and entity OEE model 124E for an entity data model 124.

The view 1200 (FIG. 12) provides a graphically based data entry view, largely in the form of an on-screen table. The user may access the view 1200 to assign additional attributes (e.g., those not defined in the entity definition model 124A) to an entity data model 124. In the illustrated embodiment, the view 1200 is configured to query the user for the data required to instantiate an entity attributes sub-template 120B of the entity model template 120. When the user saves the entries in the view 1200, a new entity attributes model 124B may be created (FIG. 5). In some embodiments, the entity attributes model 124B may be a standalone table in the MES database 30. Preferably, in these embodiments, relational database techniques are employed to associate the entity attributes model 124B with other parts of the entity data model 124. In other embodiments, the entity attributes model 124B may be a subset of the data stored in a larger table that defines the entire entity data model 124. In the illustrated embodiment, the entity attributes model 124B is an optional aspect of the entity data model 124. Thus, if no additional attributes are relevant to a particular physical entity, the user may forego configuring an entity attributes model 124B for the entity. An entity data model 124 may be complete with an empty entity attributes model 124B that has no data stored therein (i.e., when the attributes model is empty).

Figure 13:
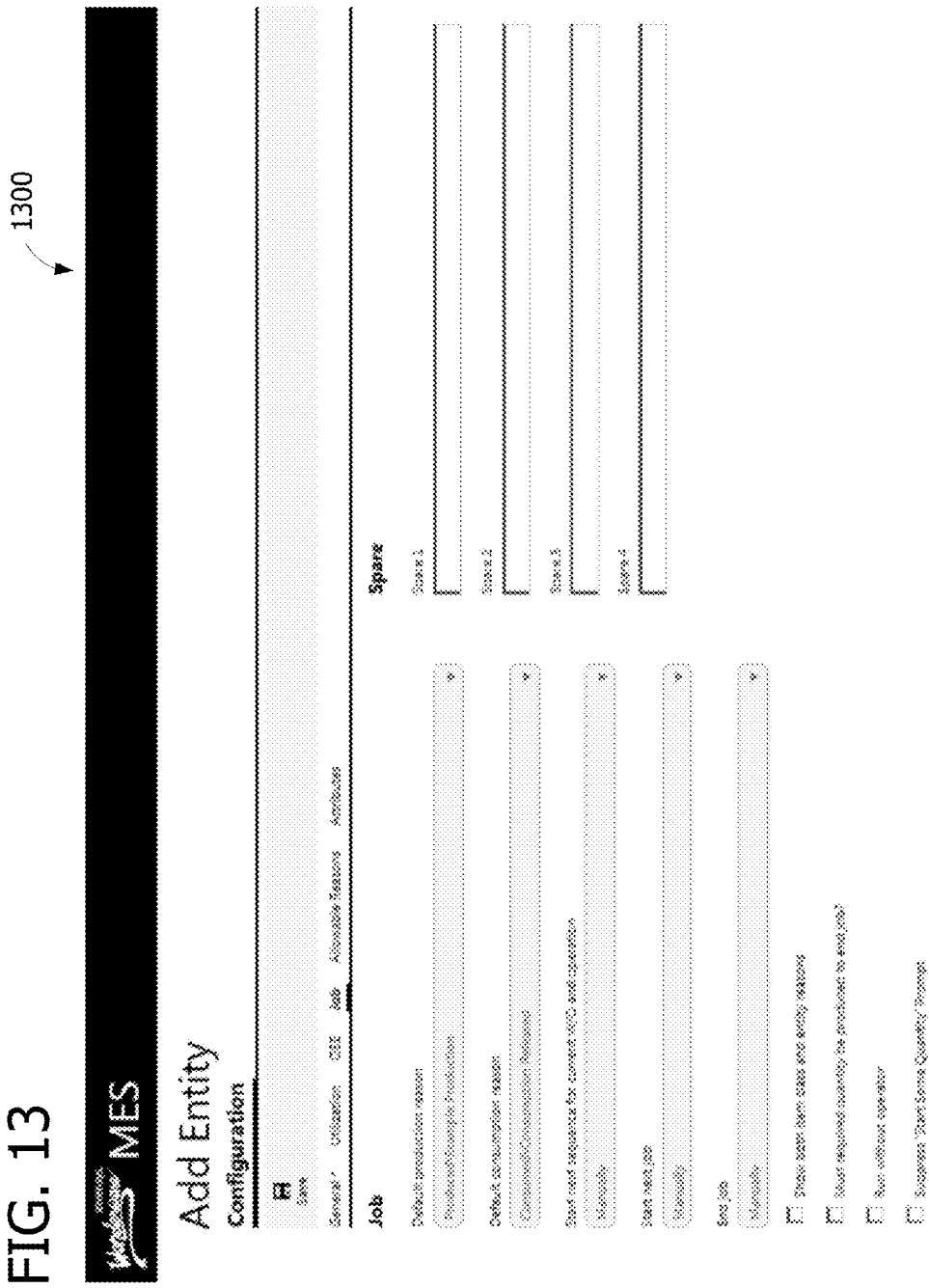
FIG. 13 is a partial screenshot of an entity job configuration view of the MES.

As shown in FIG. 13, for entities capable of carrying out jobs, an entity job model 124C (FIG. 5) may be configured using the job configuration view 1300. In the illustrated embodiment, a physical entity that is part of a line modeled in a line data model 130 will have the capability of performing jobs. Thus, in preferred embodiments, each entity data model 124 associated with a physical entity that is also represented in a line data model 130 will have an entity job model 124C configured therefor. Entity data models 124 for entities not modeled as constituent parts of a line data model 130 may be configured with an empty entity job model 124C. In the illustrated embodiment, the view 1300 is configured to query the user for the data required to instantiate an entity job sub-template 120C of the entity model template 120. When the user saves the entries in the view 1300, a new entity job model 124C may be created. In some embodiments, the entity job model 124C may be a standalone table in the MES database 30. Preferably, in these embodiments, relational database techniques are employed to associate the entity job model 124C with other parts of the entity data model 124. In other embodiments, the entity job model 124C may be a subset of the data stored in a larger table that defines the entire entity data model 124.

Figure 14:
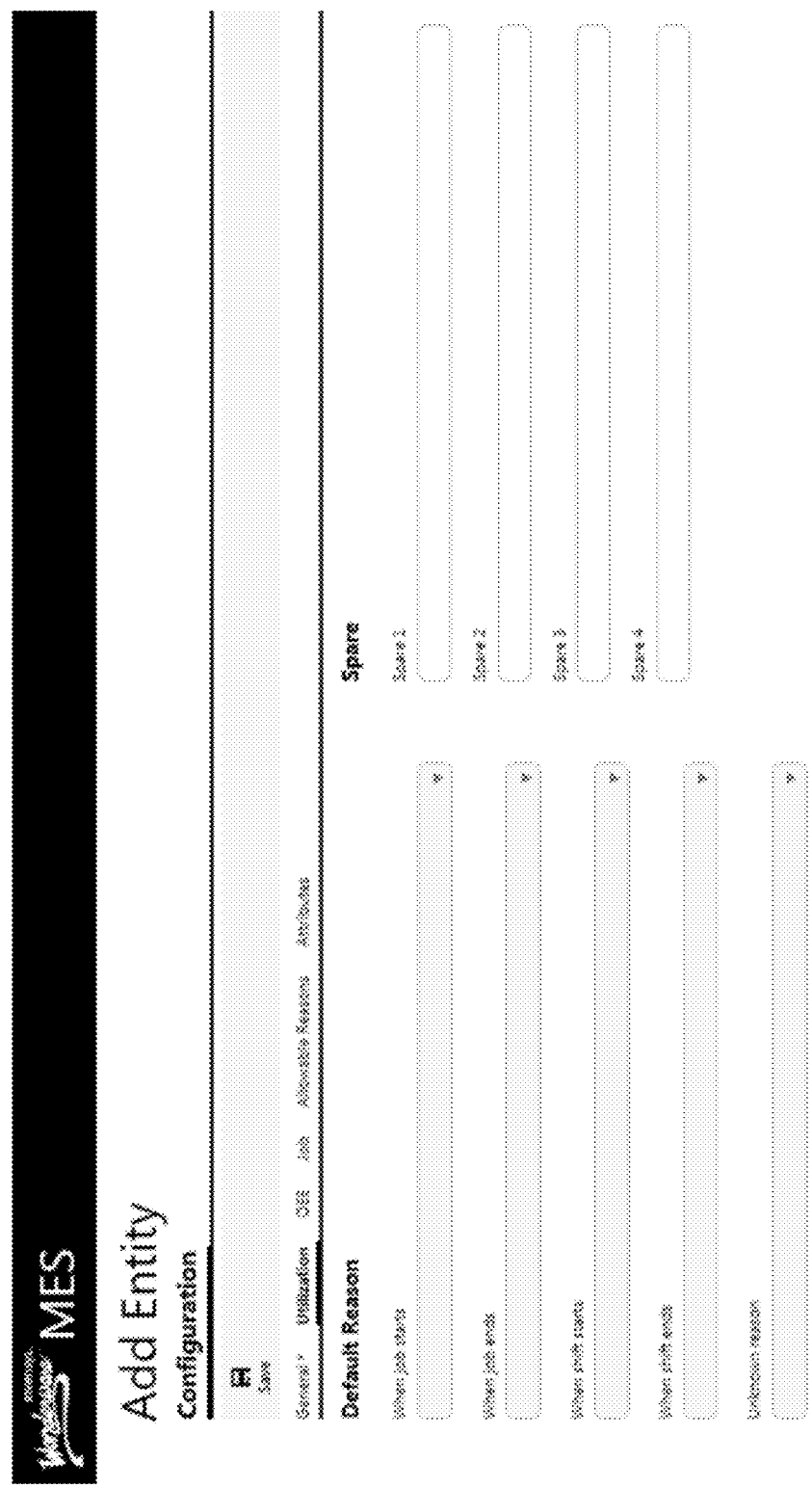
FIG. 14 is a partial screenshot of an entity utilization state configuration view of the MES.
Figure 15:
FIG. 15 is a partial screenshot of an entity utilization reasons configuration view of the MES.
Figure 16:
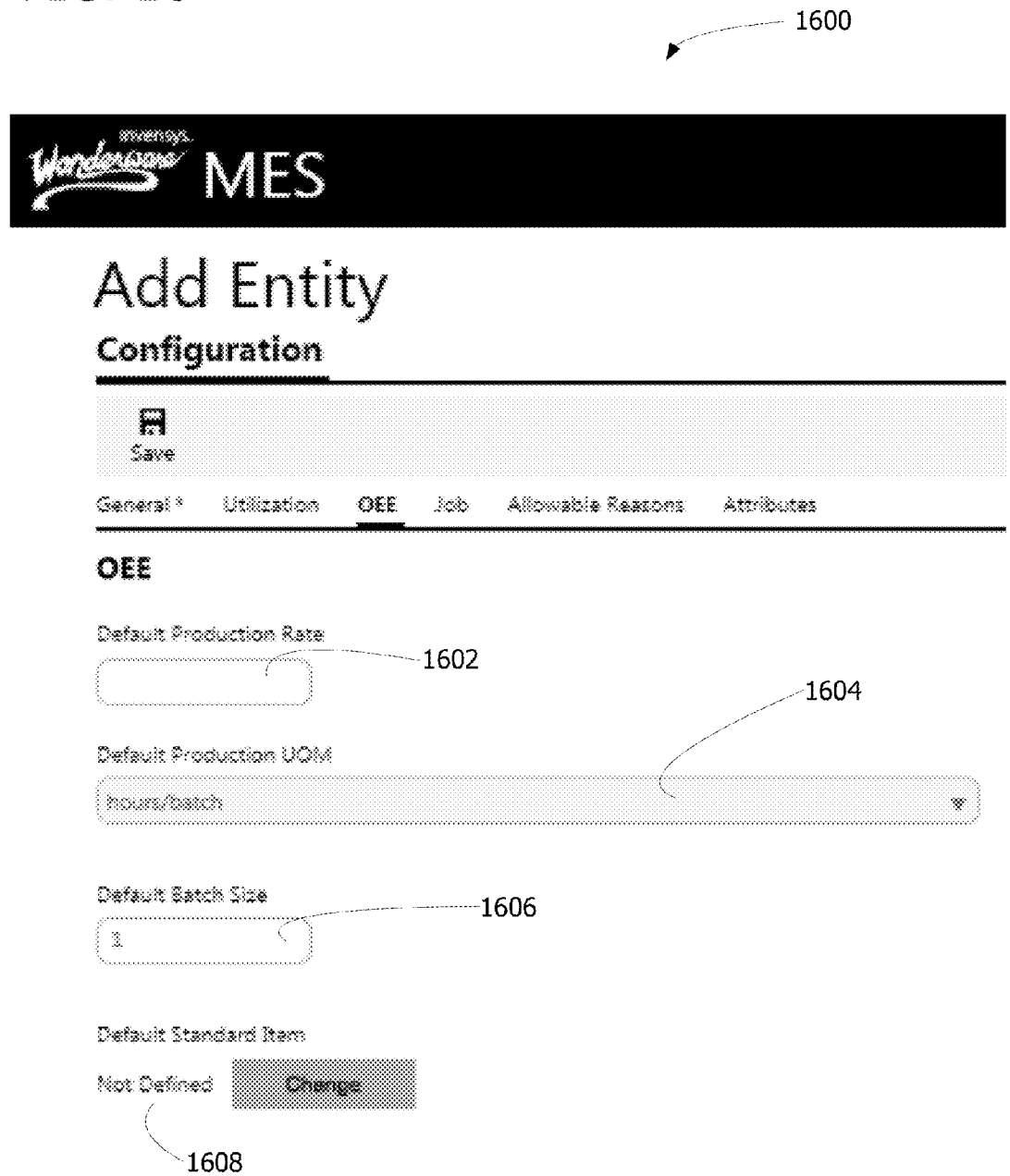
FIG. 16 is a partial screenshot of an entity OEE configuration view of the MES.

As shown in FIGS. 14-15, if an entity is capable of capturing utilization data, the user can optionally configure an entity utilization model 124D (FIG. 5) for the entity. In the illustrated embodiment, the entity state configuration view 1400 allows a user to select default utilization states that the MES 20 associates with the entity when the following events occur: job starts; job ends; shift starts; shift ends; and, a reason code is received that is not pre-associated with the entity data model 124. The selectable default utilization states may be preconfigured using the utilization configuration tools accessible through the utilization tile 906 of FIG. 9. Using the utilization reasons configuration view 1500 of FIG. 15, a user may specify the utilization reasons that can be used with the entity. Like the utilization states, the selectable utilization reasons may be preconfigured using the utilization configuration tools accessible through the utilization tile 906 of FIG. 9. In the illustrated embodiment, the views 1400-1500 are configured to query the user for the data required to instantiate an entity utilization sub-template 120D of the entity model template 120. When the user saves the entries in the views 1400-1500, a new entity utilization model 124D may be created. In some embodiments, the entity utilization model 124D may be a standalone table in the MES database 130. In other embodiments, the entity utilization model 124D is made up of two separate tables, one for the utilization states associated with the entity and one for the utilization reasons associated with the entity. Preferably, in these embodiments, relational database techniques are employed to associate the entity utilization model 124D (or respective tables thereof) with other parts of the entity data model 124. In other embodiments, the entity utilization model 124D may be a subset of the data stored in a larger table that defines the entire entity data model 124. In the illustrated embodiment, the entity utilization model 124D is an optional aspect of the entity data model 124. Thus, if an entity is not set up to capture utilization data, the user may forego configuring an entity utilization model 124D for the entity. An entity data model 124D may be complete with an empty entity utilization model 124D

The view 1600 (FIG. 16) provides a data entry view for configuring OEE aspects of an entity data model 124. If an entity is capable of capturing OEE data, the user can optionally configure an entity OEE model 124E (FIG. 5). In the illustrated embodiment, the view 1600 is configured to query the user for the data required to instantiate an entity OEE sub-template 120E of the entity model template 120. When the user saves the entries in the view 1600, a new entity OEE model 124E may be created. In some embodiments, the entity OEE model 124E may be a standalone table in the MES database 130. Preferably, in these embodiments, relational database techniques are employed to associate the entity OEE model 124E with other parts of the entity data model 124. In other embodiments, the entity OEE model 124E may be a subset of the data stored in a larger table that defines the entire entity data model 124. In the illustrated embodiment, the entity OEE model 124E is an optional aspect of the entity data model 124. Thus, if the entity is not set up to capture OEE data, the user may forego configuring an entity OEE model 124E for the entity. An entity data model 124 may be complete with an empty entity attributes model 124E. However, in the illustrated embodiment, for an entity data model 124 to be associated with a line data model 130, the default production rate, default batch size, and default standard item must be configured.

In the illustrated embodiment, the OEE configuration view 1600 includes a default production rate field 1602, a default unit of measure field 1604, a default batch size field, 1606, and a default standard item field 1608. The default production rate field 1602 permits a user to input a value that defines the default production rate for the entity. The value of the rate supplied in the production rate field 1602 may be given meaning with the default production unit of measure field 1604. In the illustrated embodiment, the default production unit of measure field 1604 includes a drop down list of units of measure standard to the MES 20 (e.g., hours-per-batch, minutes-per-batch, seconds-per-batch, batches-per-hour, batches-per-minute, and batches-per-second). A user may select one from the list to define the unit of measure used in the entity data model 124. The default batch size field 1606 is used to define the amount of a product that is processed at one time by the entity. Thus, in some embodiments, the batch size may be measured in units of the standard item. The standard item is defined using the standard item field 1608. In some embodiments, one from a list of standard items defined in the MES 20 may be selected at the standard item field 1608.

Though the illustrated embodiment provides separate configuration views for each of the aspects of the entity model (generally corresponding with the sub-templates 120A-120E), it should be understood that other MES applications may provide any other number of configuration views without departing from the scope of the invention. Moreover, it should be understood that, in some embodiments, an entity data model 124 may be configured using a single entity template 120 and a single entity configuration view. It should also be understood, that, while the illustrated embodiment describes configuration techniques for five aspects 124A-124E of an entity data model 124, other MES applications may have entity models that are made up of additional or different aspects without departing from the scope of the invention. In the illustrated embodiment, each of the aspects 124B-124E of the entity data model 124 are optional. Thus, a complete entity data model 124 may only contain data populating the fields of the entity definition model 124A. Likewise, an entity data model 124 may be complete with data populating the entity definition model 124A and any number of the other aspects 124B-124E of the entity data model 124.

Figure 17:
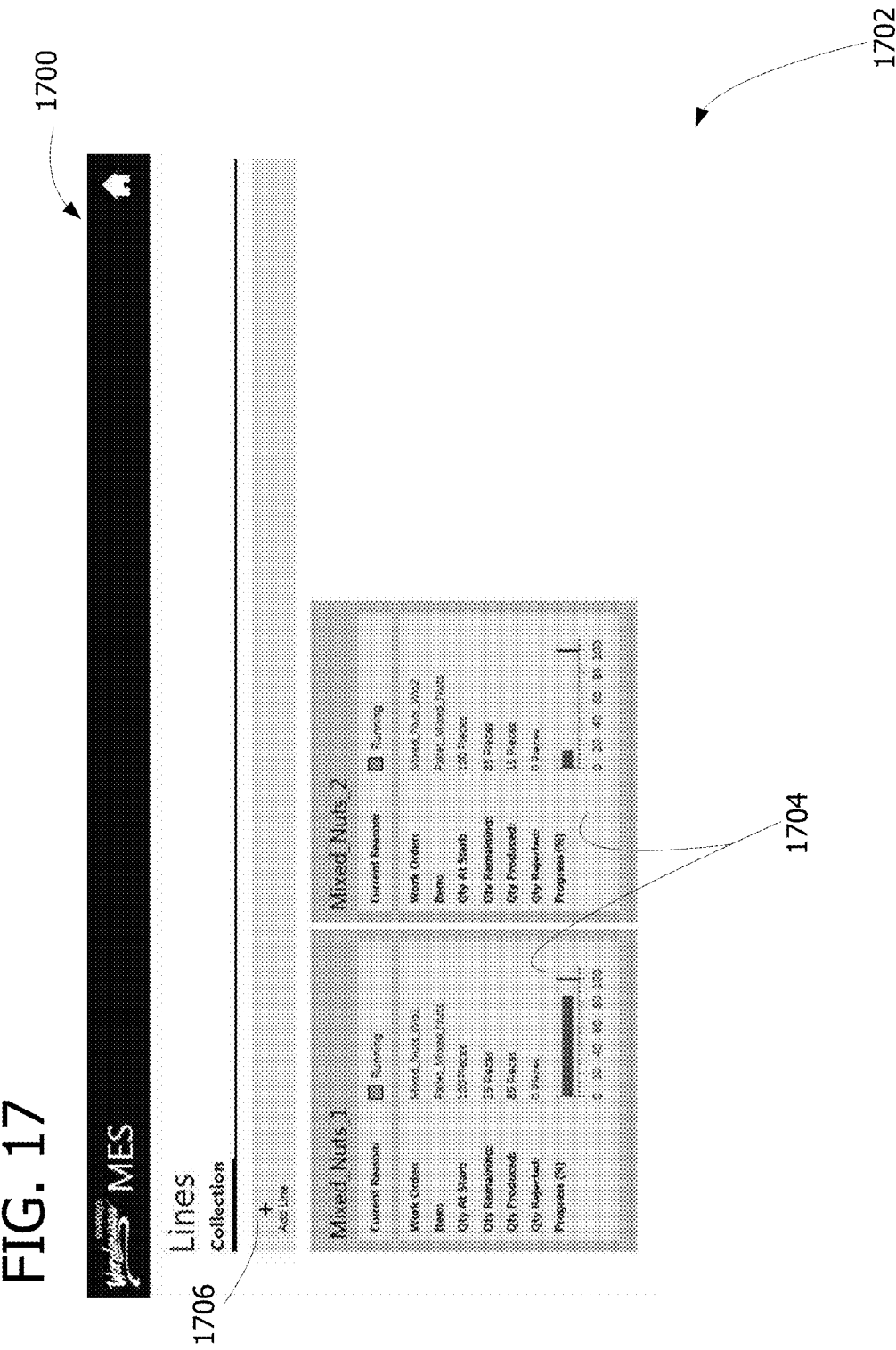
FIG. 17 is a partial screenshot of a lines collection view of the MES.

As shown in FIG. 17, when the lines tile 902 is selected form the home view 900 (FIG. 9), a user is directed to a lines collection view 1700. The lines collection view 1700 includes a display area 1702 with graphical display objects 1704 for each of the line data models 130 that have been configured and saved to the MES database 30. Preferably, the MES 20 has preprogrammed scripts for generating and displaying the display objects 1704 using the data stored in the line data models 130. The graphical form of the display objects 1704 may be pre-configured to present information about the production status of each modeled production line (broadly, one or more "production metrics"). In the illustrated example, two lines are accessible from the line collection page 1700. Each of the lines has presently assigned work orders. Basic work order data, such as work order name, item description, total quantity of items to be produced, quantity of items remaining to fill the work order, quantity of completed items to pass inspection, quantity of items to fail inspection, and progress of work order may be presented. The line collection page may also present a plain list of the configured lines or present other information about the configured lines without departing from the scope of the present invention. From the line collection view 1700, a user may access more information about each line by selecting the line object 1704 associated therewith. An add a line selection object 1706 may also be presented on the lines collection view 1700. Selecting the add a line object 1706 may provide automatic navigation to a line definition configuration view 1800, as shown in FIG. 18.

The line definition configuration view 1800 provides a graphical data entry form for configuring definitional aspects of a line data model 130. For each new line, the user can use the line definition configuration view 1800 to configure a line definition model 130A. In the illustrated embodiment, the view 1800 is configured to query the user for the data required to instantiate a line definition sub-template 122A of the line model template 122. In the illustrated embodiment, the line definition configuration view 1800 provides a line name field 1802 in which a user may type a name used to identify a line data model 130 and associate the model with the physical production line it represents. A labor load data field 1804 allows a user to input a numerical representation of the number of workers it takes to run the physical production line. Likewise, a maximum work orders data field 1806 allows the user to input a numerical representation of the maximum number of simultaneous work orders that may be run on the physical production line. The standard item data entry field 1808 allows the user to enter the standard item that is being produced on the physical production line. As will be discussed in more detail below, this setting may be used to derive a common unit of measure for item production when determining a line's production rate. To use the data entry field 1808, a user may select the change box 1809, at which point a standard items dialog box (not shown) may appear. The standard items dialog box may include a list of selectable standard items. The batch size data entry field 1810 allows the user to input a standard batch size for items produced on the line (e.g., in terms of the number of standard items that could be contained in a single batch). The production unit of measure field 1812 provides a dropdown list of units of measure which may be selected to define the production rate unit of measure for the line data model 130. The parent entity for scheduling field 1814 allows the user to select an entity, whose model 124 includes data indicating the entity is capable of scheduling shifts (see capabilities palette 1102 of FIG. 11), that is the parent of the line (e.g., the plant entity 32 with respect to the line 100 of FIG. 3) and from which the line and its entities inherit their scheduled shifts.

Figure 19:
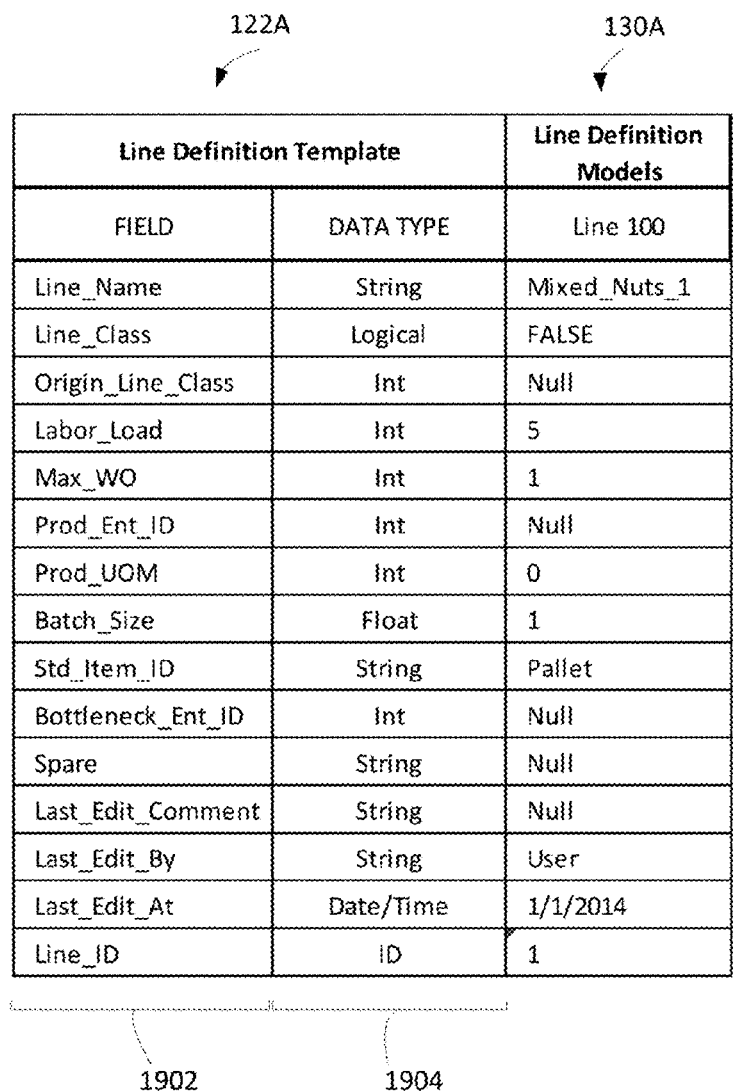
FIG. 19 is a table representing a data structure for a line definition template and a line definition model.

As shown in FIG. 19, using the configuration tools provided on the line definition configuration view 1800, a user may configure a line definition model 130A based on the format of a line definition sub-template 122A. The line definition sub-template 122A includes a list of fields 1902, each field having a corresponding data type 1904. Together, the fields 1902 and their associated data types define the data structure for the line definition model 130A. The Line_Name field of the line definition sub-template 122A provides a row in each line definition model 130A for a user-supplied name for the line model. Typically, the user will supply a name that associates the line definition model 130A with the physical production line (e.g., Mixed_Nuts_1 for the mixed nuts line 100). The Line_Name may be received in name field 1802 of the line definition configuration view 1800. The Line_Class field 1902 of the line definition sub-template 122A may be used to identify whether a line definition model 130A models a line class or a line instance/from scratch line. The default logical value for each new line definition model 130A is FALSE. Thus, once a line definition model 130A is saved from the line definition configuration view 1800, the MES application automatically assigns a logical FALSE value to the Line_Class field of the line definition model. Briefly stated, a line definition model will only become a line class model (i.e., be given a logical TRUE value for the Line_Class field) if each of the entities assigned to a line layout model 130B is an entity class. The Origin_Line_Class references the line class model from which the line definition model 130A was instantiated. In the illustrated embodiment, the line definition model 130A was not instantiated from a line class, so the Origin_Line_Class is null. If a line definition model 130A was instantiated from a line class, the Origin_Line_Class field 1902 could be set to the Line_ID for the class.

Figure 18:
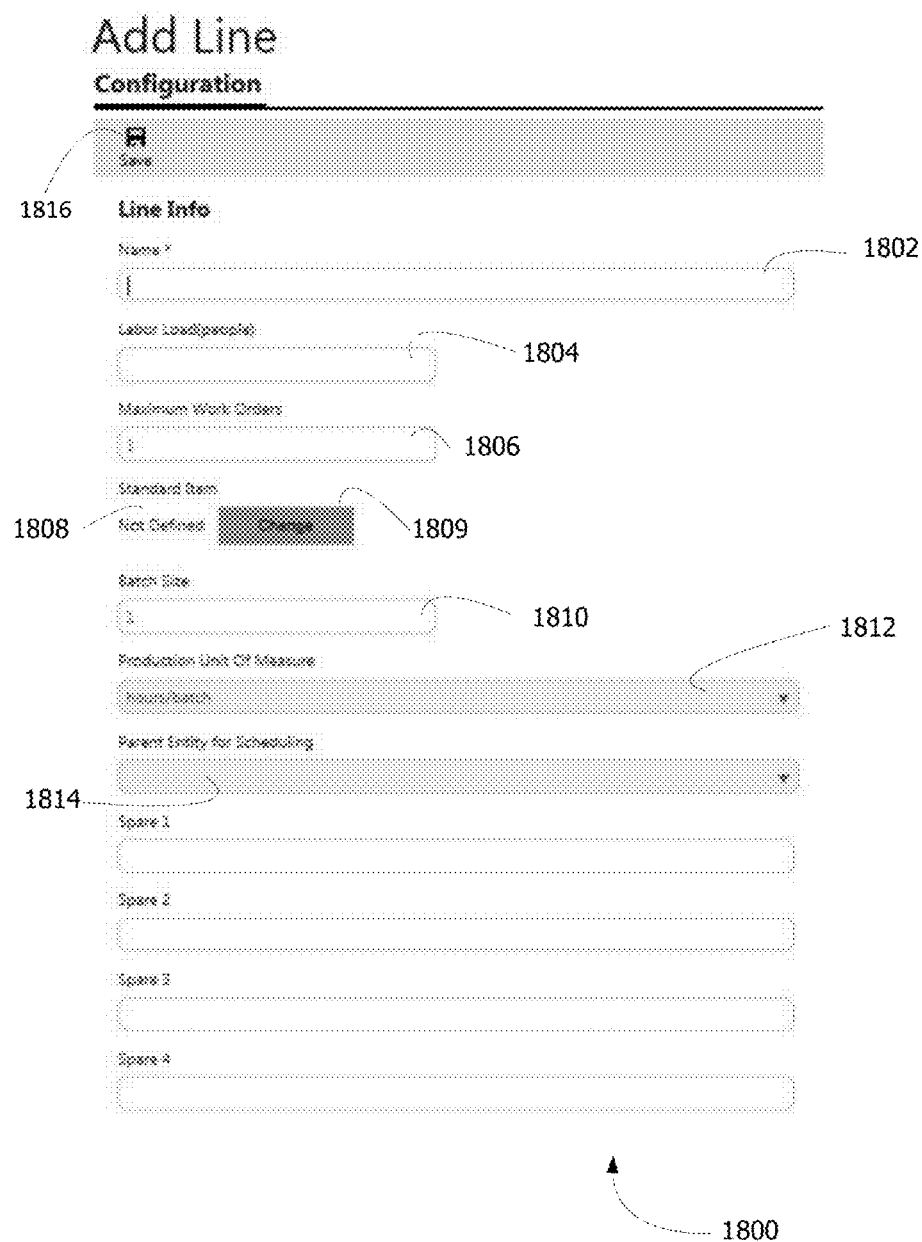
FIG. 18 is a partial screenshot of a line definition configuration view of the MES.

The Labor_Load and Max_WO fields 1902 each correspond with integer values provided in respective fields 1804 and 1806 of FIG. 18. Thus, in the line definition model 130A, the Labor_Load value of 5 indicates to the MES application that five people work on the physical mixed nuts line 100. The Max_WO value of 1 indicates that the line is only capable of running one work order at a given time. The Prod_Ent_ID and Prod_UOM fields 1902 respectively identify the entity that is the source of production counts for the line and the standard unit of measure used for reporting the production rate for the line. The Prod_UOM value may be provided, for example, using the corresponding field 1812 of the line definition configuration view 1800. The illustrated MES 20 uses six standard units of measure. Thus, each standard unit of measure may have an integer identifier ("ID") associated therewith in the programming of the MES 20. The value in the Prod_UOM field 1902 may be set equal to the integer value associated with the desired standard unit of measure. Similarly, each of the entity data models 124 may include an entity ID set to an integer value. This ID may be unique for each entity data model 124 stored in the MES database 30. Thus, the Prod_Ent_ID field 1902 may be used to associate the entity ID integer value for the entity that will be the source of production counts for the line with the line definition model 130A. The techniques for identifying the entity that is the source of production counts for a given line will be discussed in more detail below. In the illustrated embodiment, the line definition model 130A has a value of 0 for the Prod_UOM field, which is a default value that corresponds to production reporting in hours-per-batch. The line definition model 130A has a Prod_Ent_ID field set to Null, which indicates the line layout model 130B has not yet been configured. The Batch_Size field 1902 of the line definition sub-template 122A defines the standard batch size for the line. The value of the Batch_Size field for a line definition model 130A may, for example be provided in the corresponding field 1810 of the line definition configuration view 1800. For the mixed nuts line 100, the Batch_Size has been set to the default value of 1, which means that there is one standard item in each batch of mixed nuts. The standard item for a line definition model 130A is built into the line definition sub-template 122A with the Std_Item_ID field 1902. The user may provide a Std_Item_ID value for a line definition model 130A using a corresponding data entry field 1808 on the line definition configuration view 1800. For the mixed nuts line 100, the Std_Item_ID has been set to Pallet, indicating that the standard item for production reporting purposes is a pallet of packaged mixed nuts.

The illustrated line definition sub-template 122A further includes a field 1902 named Bottleneck_Ent_ID. The value for Bottleneck_Ent_ID may automatically be generated using techniques discussed in more detail below. In the illustrated embodiment, the line definition model 130A has been assigned a Bottleneck_Ent_ID of null. As such, the line definition model 130A indicates the MES should dynamically determine the source of a bottleneck. The spare field 1902 permits a user to provide other information about the line in the line definition model 130A over and above the information in the standard fields of the line definition sub-template 122A. A user may supply the data for the Spare field 1902 using the corresponding data entry fields shown in the configuration view 1800. The Last_Edit_Comment, Last_Edit_By, and Last_Edit_At fields 1902 of the line definition sub-template 122A each relate to maintaining an audit trail for configuration changes made to a line definition model 130A. The MES application may be configured to automatically generate data for the Last_Edit_Comment, Last_Edit_By, Last_Edit_At, and Line_ID fields when a new line data model 130 is saved or a preexisting line model is edited. Editing of the line definition model 130A may be performed using an editing tool (not shown) that appears as a view on the workstation 22 that is substantially similar to the view 1800. The primary difference between the editing tool view and the new line definition configuration view 1800 is that the editing tool view may have pre-entered data in one or more of the data entry fields 1802-1814, based on the previously configured version of the line definition model 130A.

When a line definition model 130A is first saved to the MES database 30, it is automatically given a Line_ID. The Line_ID field 1902 is used as a system tag for line definition models 130A configured therefrom. Thus, each Line_ID for an instantiated line definition model 130A is a unique identifier for a particular line data model 130. In the illustrated embodiment, the Line_ID field has an integer format. The line definition model 130A for the mixed nuts line 100 has a Line_ID of 1, which indicates that it was the first line data model 130 saved to the database. Each successive line data model 130 will increment to a new Line_ID value. The illustrated line definition sub-template 122A is but one example of a suitable data structure for configuring line definition models 130A. It should be understood that other line model templates 122 may also be used without departing from the scope of the invention.

Figure 20:
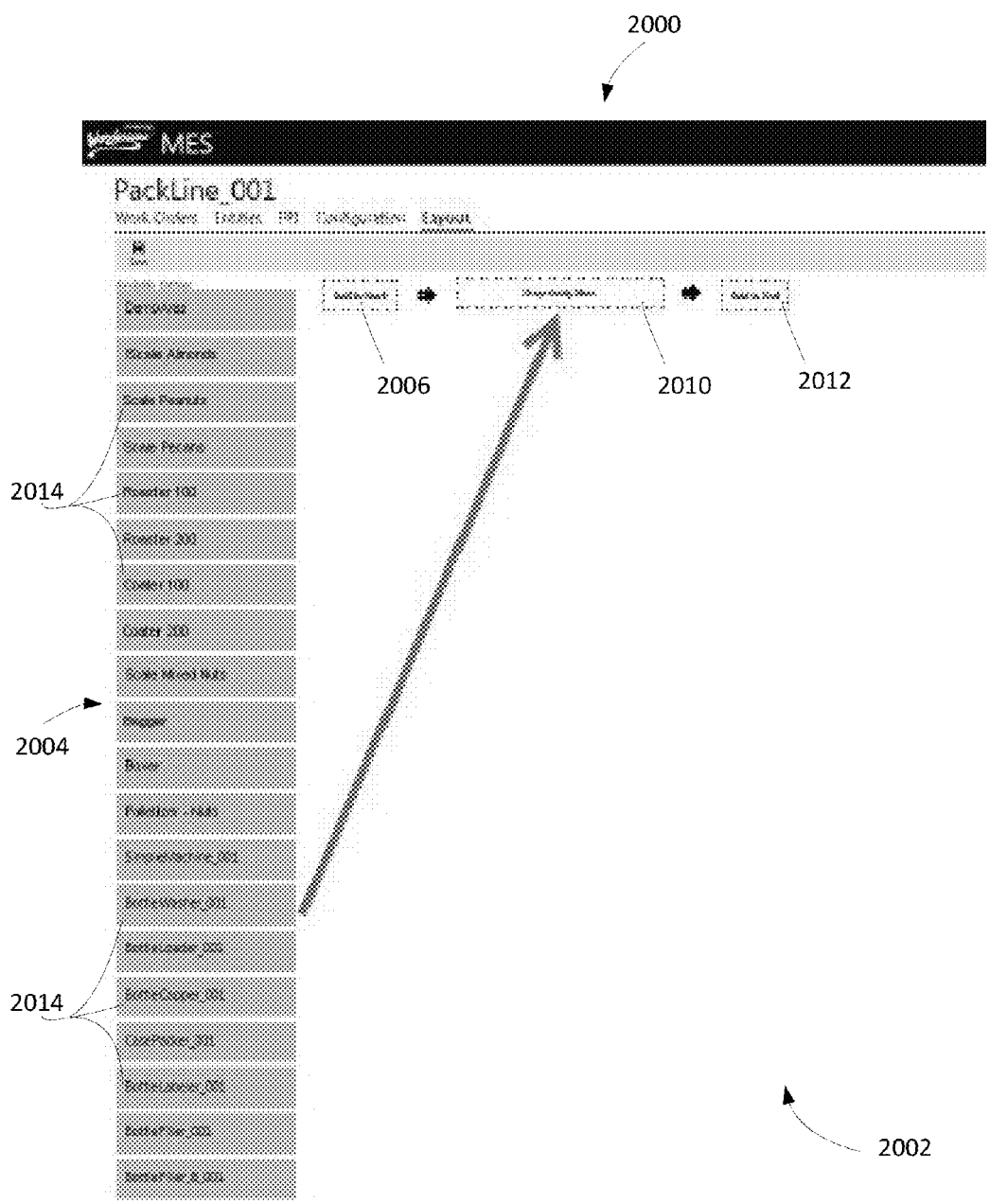
FIG. 20 is a partial screenshot of a line layout configuration view of the MES with no entity objects in the work area and an arrow schematically representing a user input.
Figure 21:
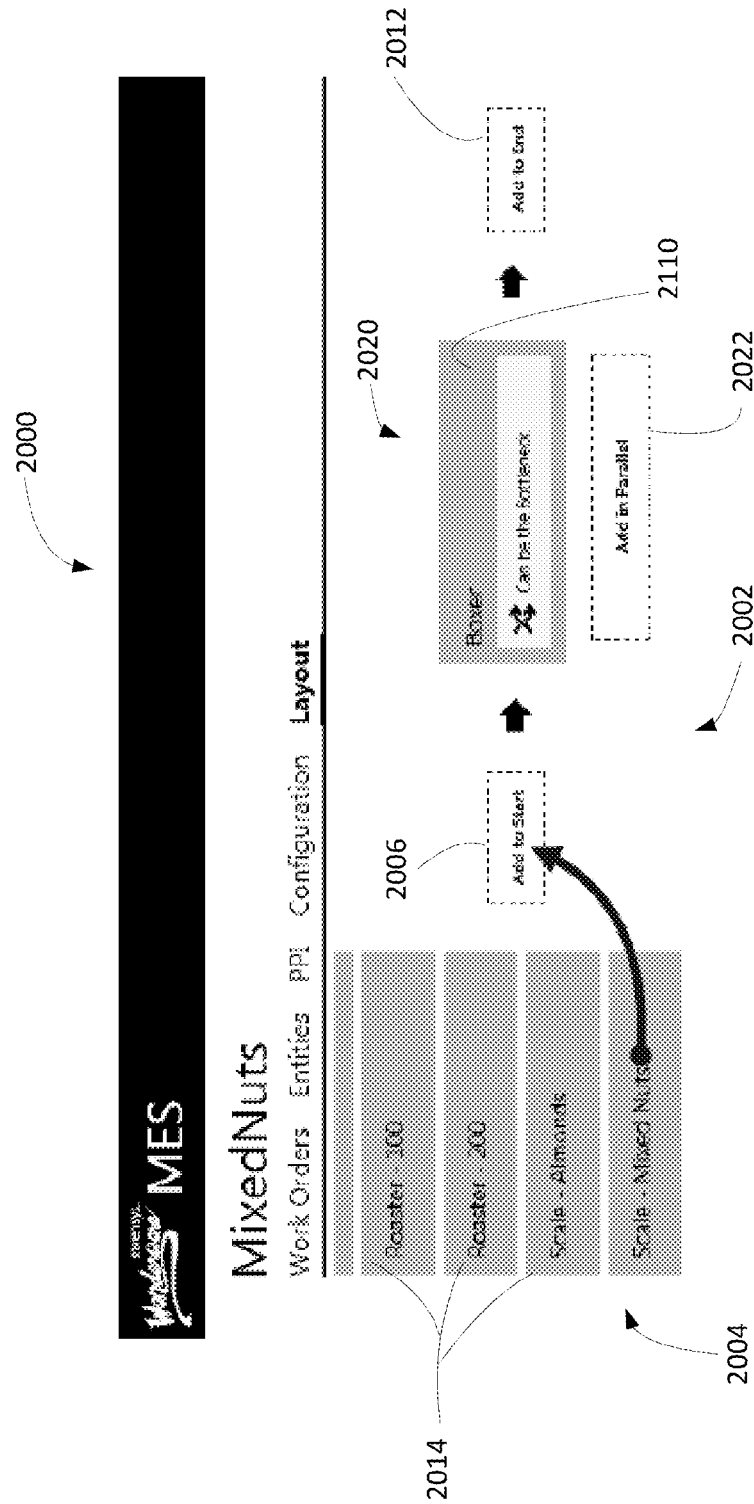
FIG. 21 is a partial screenshot of the line layout configuration view after the user input of FIG. 20 has been received and an arrow schematically representing a another user input.

Once the line definition model 130A has been saved to the MES database 30, for example, using the save selection object 1816 shown in FIG. 18, the line layout model 130B may be instantiated based on the line layout sub-template 122B. As shown in FIGS. 20-34, the exemplary MES 20 includes a line layout configuration view 2000. The line layout configuration view 2000 includes a work area 2002 and an entities palette 2004. Together with configuration procedures 128 stored on the MES database 30, the configuration layout view 2000 may be used to create a visual object model 2020 of a line layout. As will be discussed in more detail below, once the object model 2020 of a line is created on the configuration layout view 2000, a line data model 130 may be saved to the MES database. Preferably, the line data model 130 will reflect attributes of the object model configured on the line layout view 2000. FIG. 20 shows the line layout configuration view 2000 before any steps have been taken to configure an object model 2020 representing the line 100. At this point, the work area 2002 includes three configuration drop objects 2006, 2008, 2012, and the entities palette 2004 contains a complete list of the available entities. Each of the available entities (e.g., the entity data models 124 configured in accordance with the discussion above, saved to the MES database 30, and capable of being an entity in a line) is shown as a configuration object 2014 in the palette 2004. To begin configuring the object model 2020 to represent the line 100, the user simply selects a configuration object 2014 from the entities palette 2004 and places it on the work area. In some embodiments, the user may perform a drag-and-drop operation to place each configuration object on the work area. When no configuration objects 2014 have been placed onto the work area 2002, an Add to Start drop object 2006 is shown at the far left of the work area, and an Add to End drop object 2012 is shown to the far right of the work area. A Drop Entity Here drop object 2010 is disposed between the Add to Start drop object 2006 and the Add to End drop object 2012. To begin configuring the object model 2020, the user simply selects any one of the available entity configuration objects 2014 from the palette 2004 that represents an entity on the physical production line and places it on the Drop Entity Here drop object 2010. In some embodiments, the user may likewise be able to begin configuring the object model by placing the configuration object 2014 on the Add to Start drop object 2006, the Add to End drop object 2012, or elsewhere on the work area 2002. Though the illustrated embodiment leverages drop objects to create a very user friendly layout configuration view 2000, it is contemplated that other embodiments may permit users to place configuration objects anywhere on a work area to reflect the actual layout of the physical production line.

Figure 22:
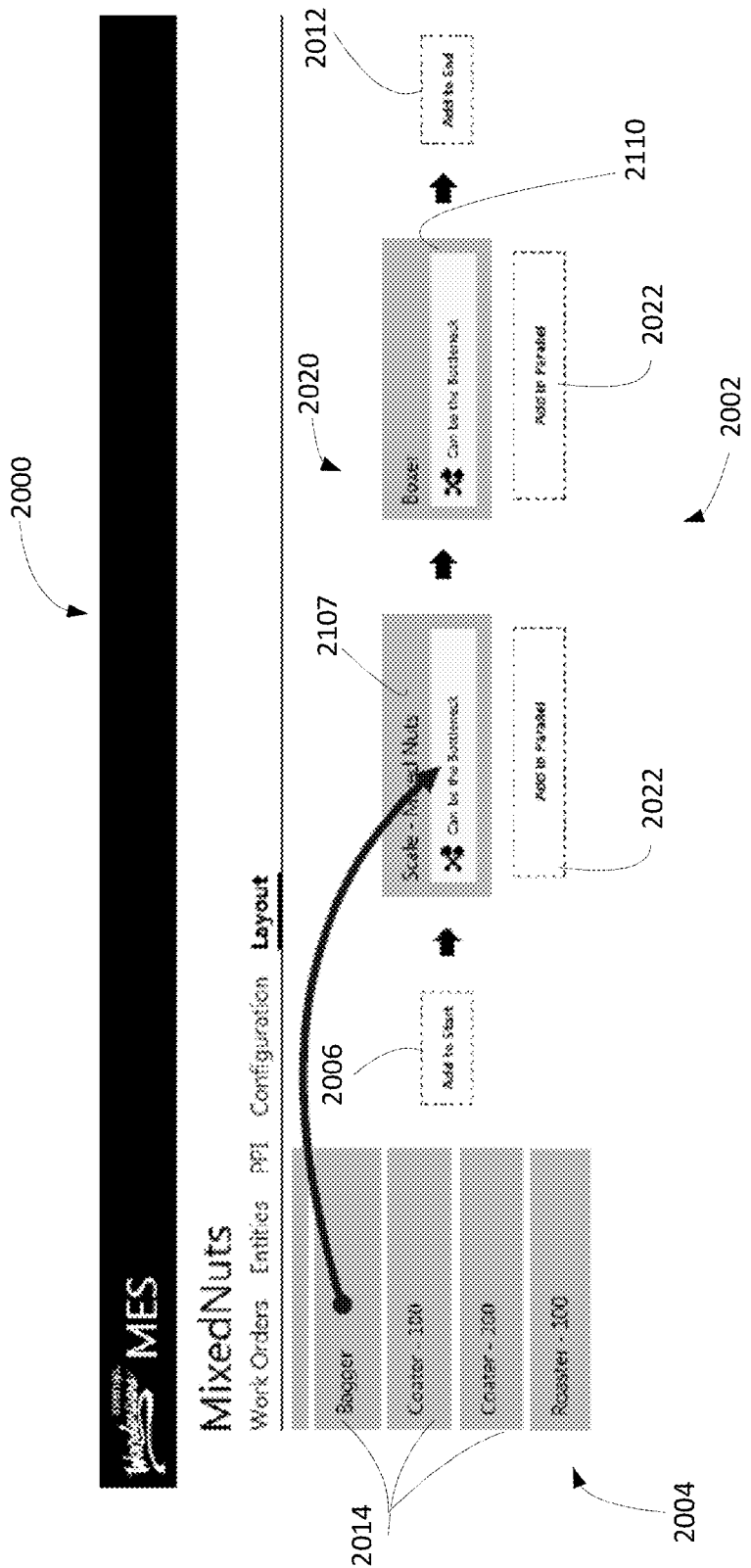
FIG. 22 is a partial screenshot of the line layout configuration view after the user input of FIG. 21 has been received and an arrow schematically representing another user input.
Figure 23:
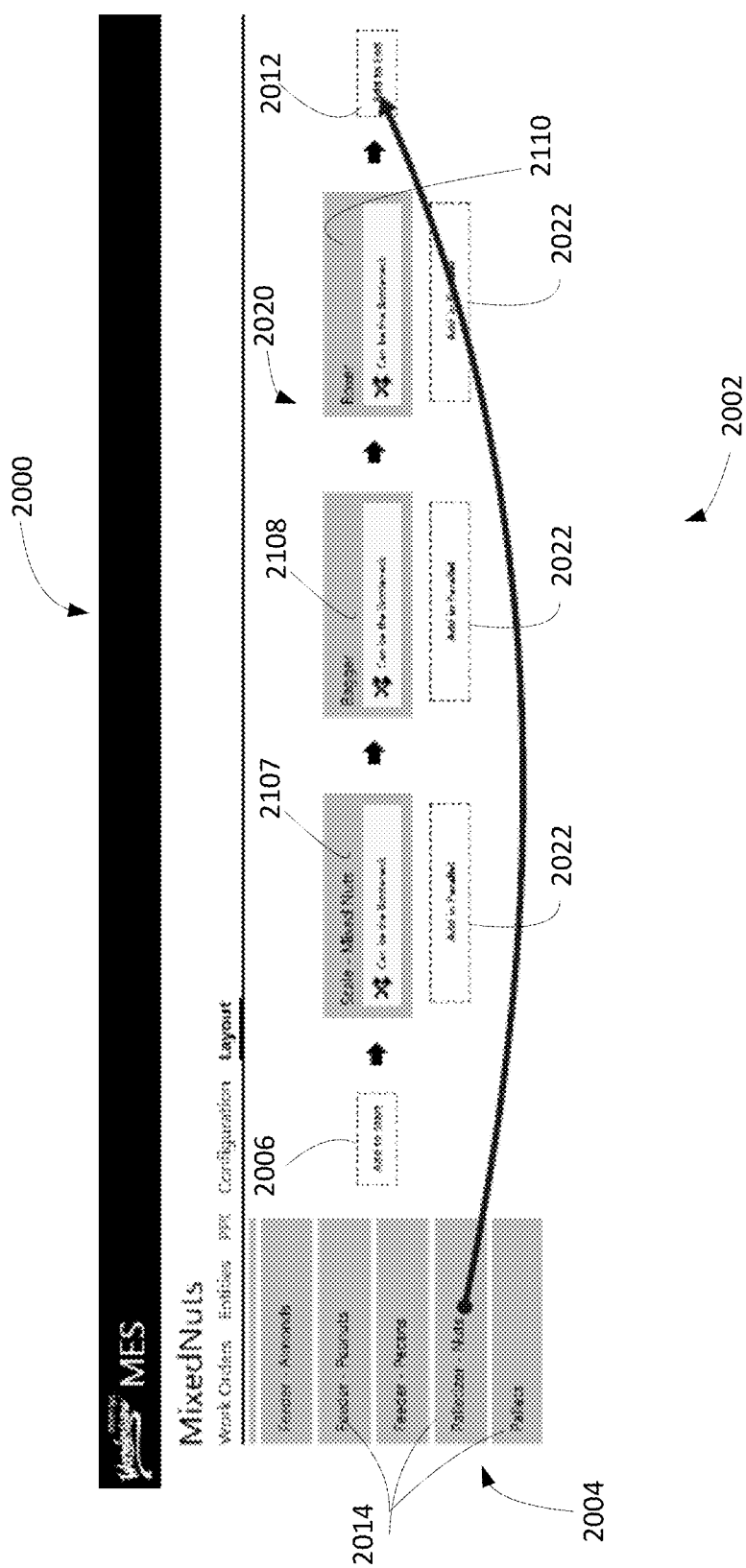
FIG. 23 is a partial screenshot of the line layout configuration view after the user input of FIG. 22 has been received and an arrow schematically representing another user input.
Figure 24:
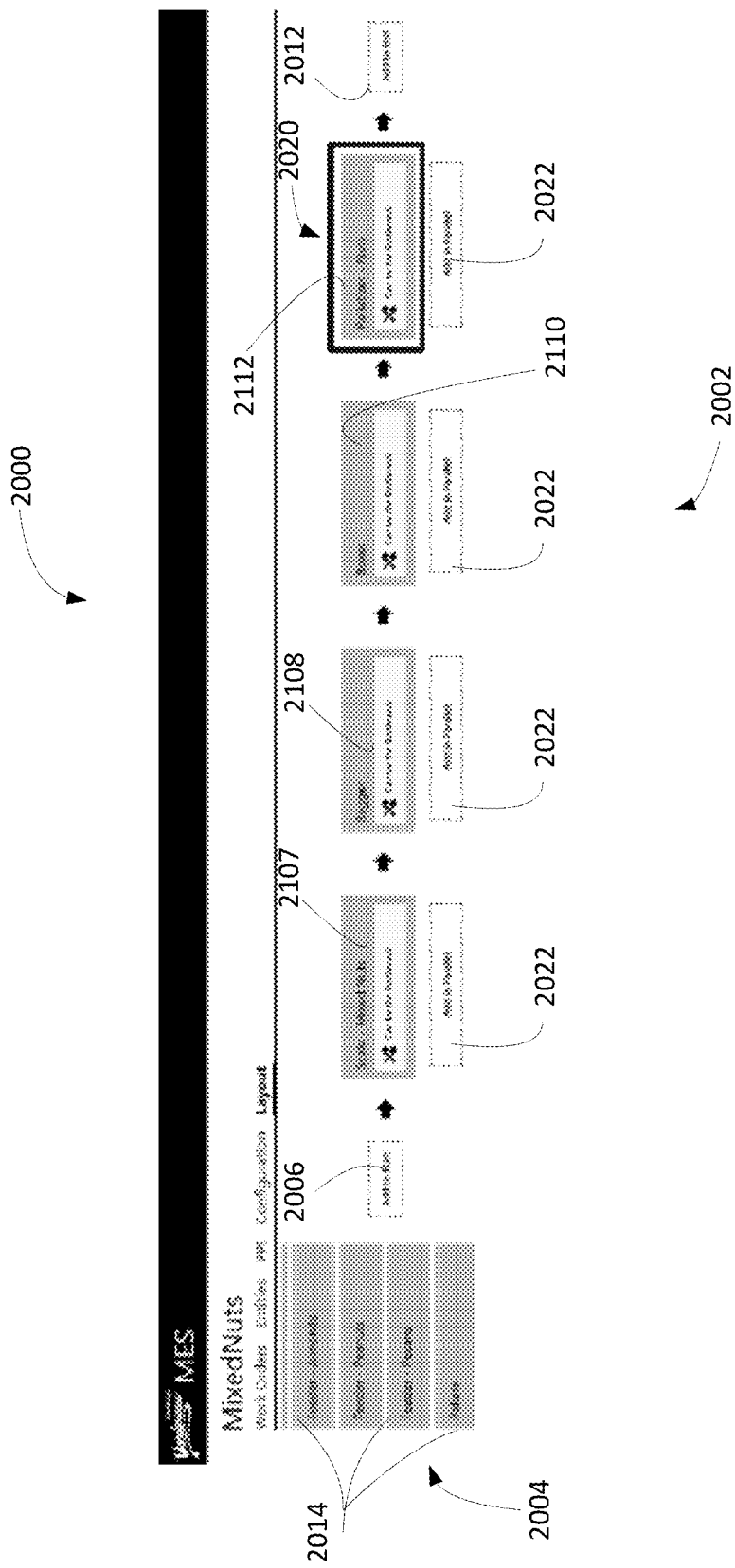
FIG. 24 is a partial screenshot of the line layout configuration view after the user input of FIG. 23 has been received and schematically representing the effect thereof.

As shown best in FIGS. 21-35, each time a configuration object 2014 is placed onto the work area 2002, an entity object is added to the object model 2020. Thus, in the illustrated example, the initial configuration object 2014 placed onto the work area 2002 creates a Boxer entity object 2110 in the object model 2020. Throughout the figures and related discussion, each of the entity objects 2102-2112 is given the reference number of the physical entity in the mixed nuts line 100 it represents, plus 2000. Each time a configuration object 2014 is placed onto the work area 2002, an Add in Parallel drop object 2022 is created. Likewise, each time a configuration object 2014 is placed onto the work area 2002, it may disappear from the available entities palette 2004. The configuration tool procedures 126 of the MES application support configuring object models that include entity objects arranged in parallel and arranged in serial. To arrange entity objects in an object model 2020 in serial, an available configuration object 2014 may be selected from the palette 2004 and placed on one of the following objects: the Add to Start drop object 2006, the Add to End object 2012, and any entity object currently displayed in the object model 2020. If, as shown in FIG. 22, a configuration object 2014 is placed on the Add to Start drop object 2006, a corresponding entity object will be created at the first position in the object model 1022 (e.g., the Scale—Mixed Nuts entity object 2107 will be shown in serial in the first position, ahead of the Boxer object 2110). If, as shown in FIGS. 22-23, a configuration object 2014 is placed on an entity object (e.g., Scale—Mixed Nuts object 2107), a corresponding new entity object will be added to the object model 2020 at a position immediately following the preexisting entity object (e.g., the Bagger entity object 2108 will be shown in serial between the Scale—Mixed Nuts object and the Boxer object 2110). If, as shown in FIGS. 23-24, a configuration object 2014 is placed on the Add to End drop object 2012, a corresponding new entity object will be added at the last position in the object model 2020 (e.g., the Palletizer Nuts object 2112 will be shown in serial in the last position, after the Scale—Mixed Nuts object 2107, the Bagger object 2108, and the Boxer object 2110). In the illustrated embodiment, after a configuration object 2014 is placed on the Add to Start drop object 2006, a new Add to Start object 2006 will be created to the left of the object model 2020. Likewise, when a configuration object 2014 is placed on the Add to End drop object 2012, a new Add to End drop object will be created to the right of the object model 2020. Thus, the user always retains the ability to add an entity to the beginning, end, or any other serial location in the object model 2020.

Figure 25:
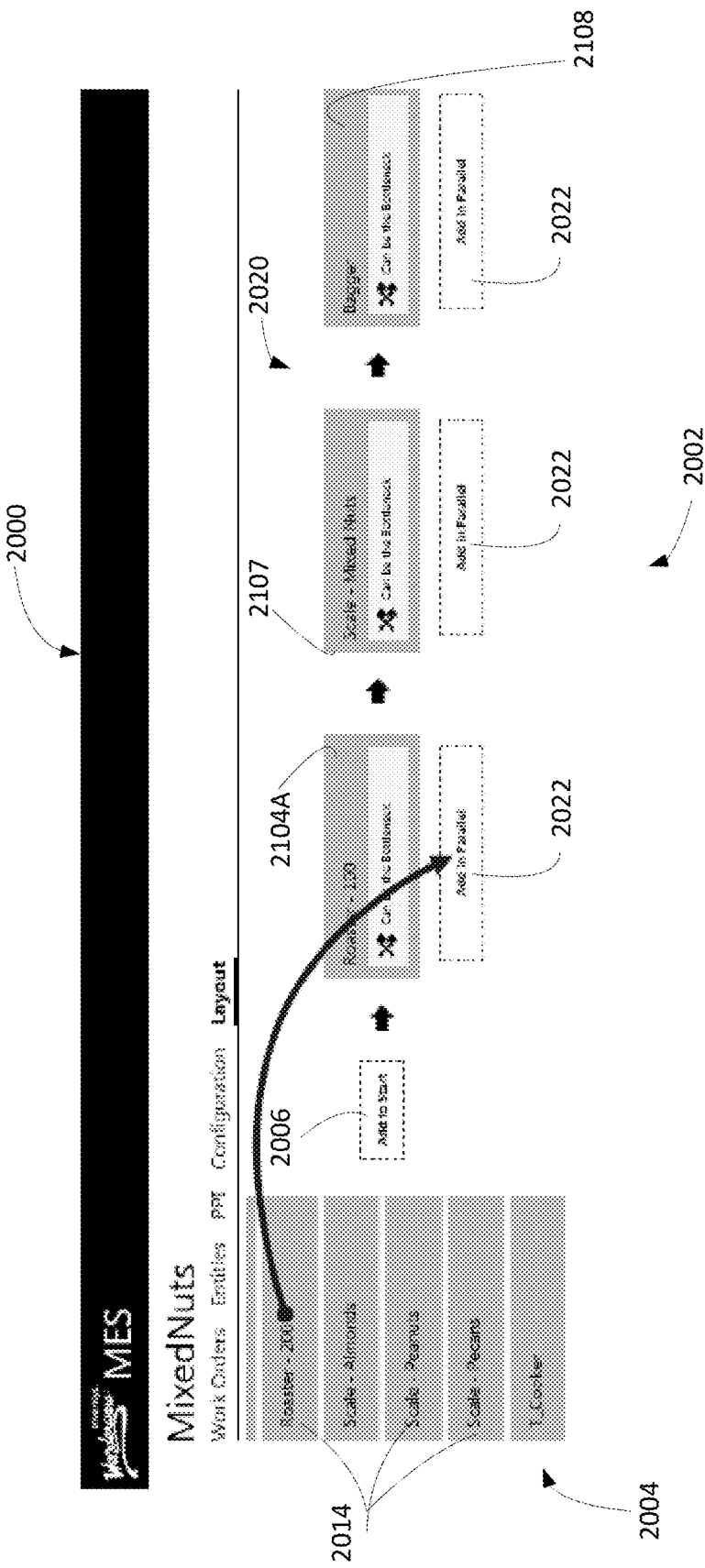
FIG. 25 is a partial screenshot of the line layout configuration view with certain entities in the object model and an arrow schematically representing a user input to add an entity object in parallel with another entity objects.
Figure 26:
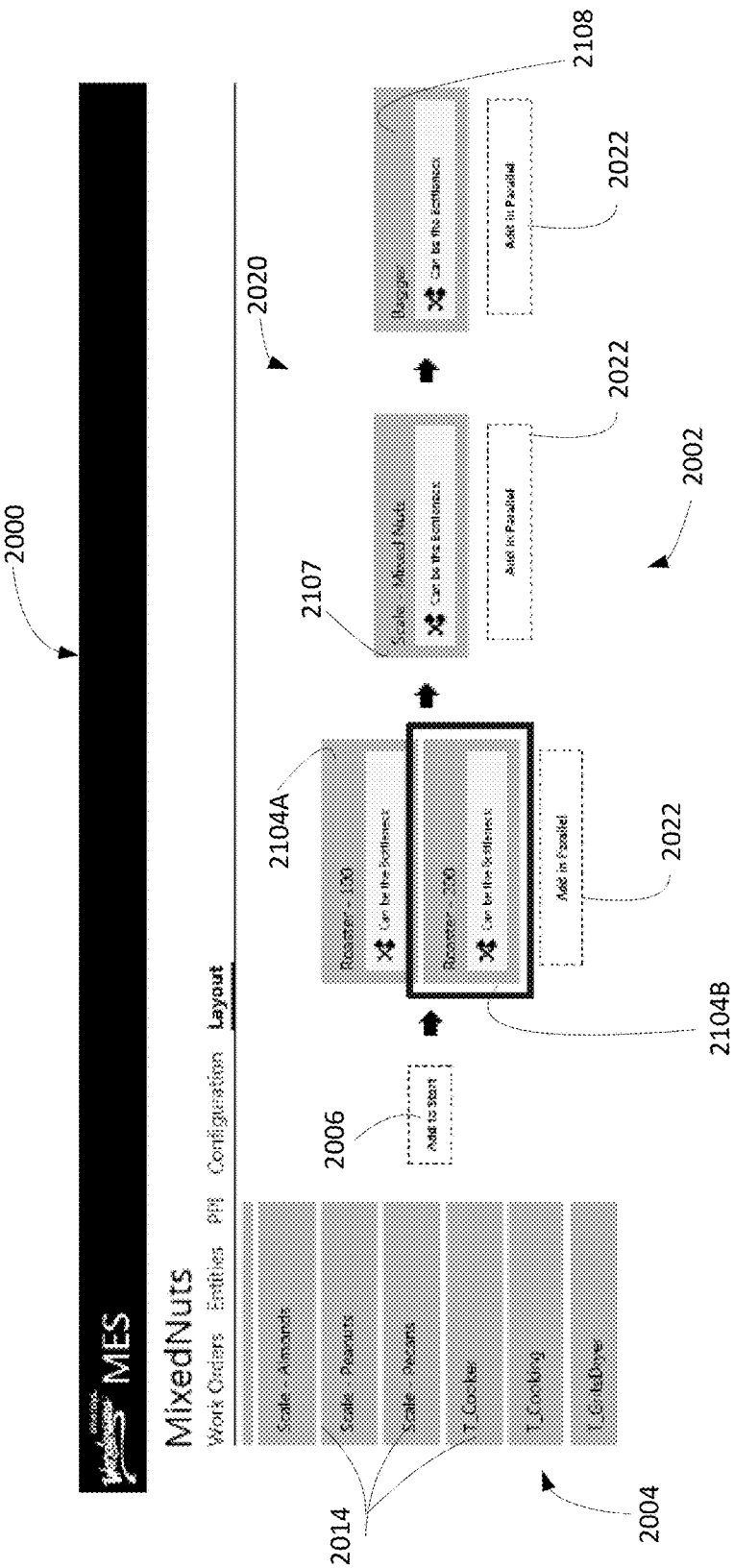
FIG. 26 is a partial screenshot of the line layout configuration view after the user input of FIG. 25 has been received and schematically representing the effect thereof.
Figure 27:
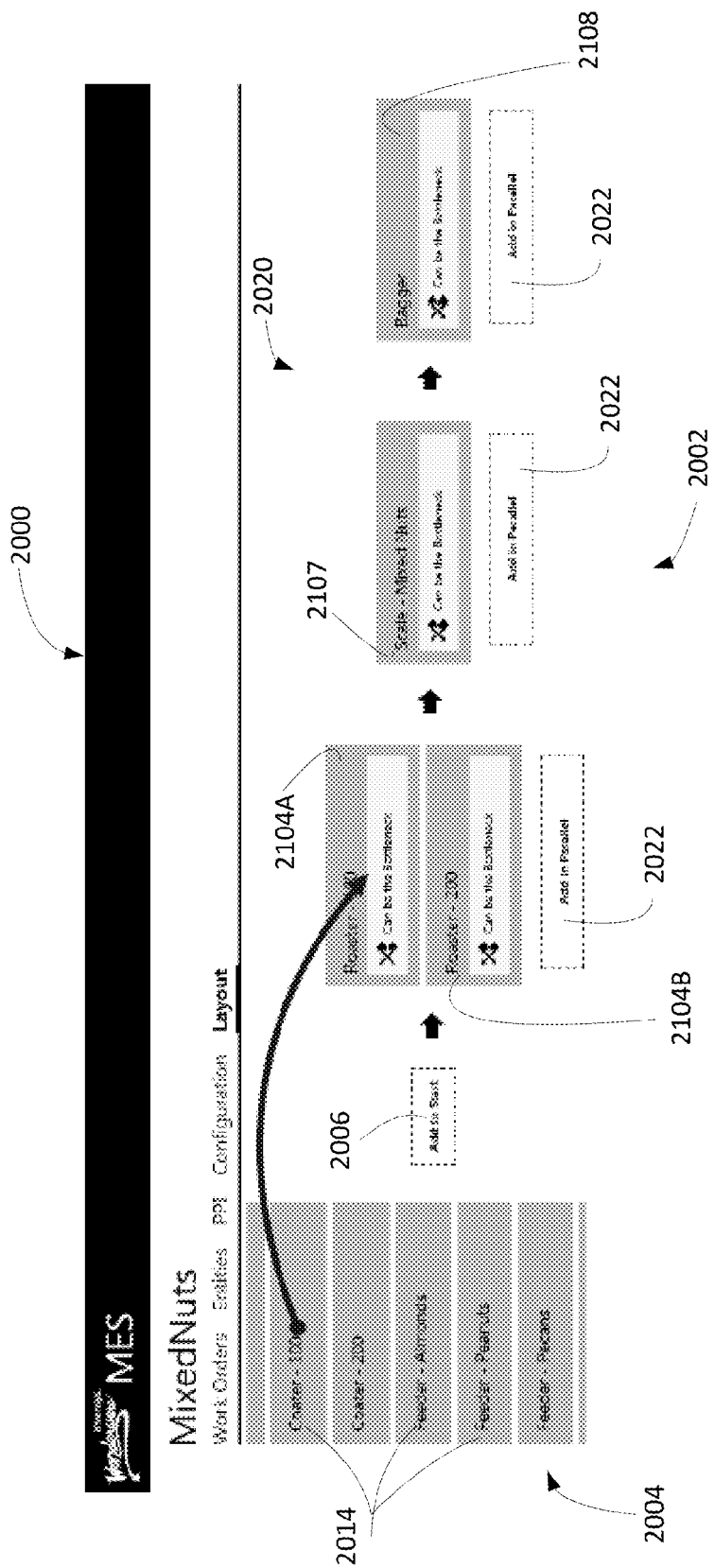
FIG. 27 is a partial screenshot of the line layout configuration view after the user input of FIG. 25 has been received and an arrow schematically representing a user input effective to add an entity object to the object model in a line segment with another of the entity objects.
Figure 28:
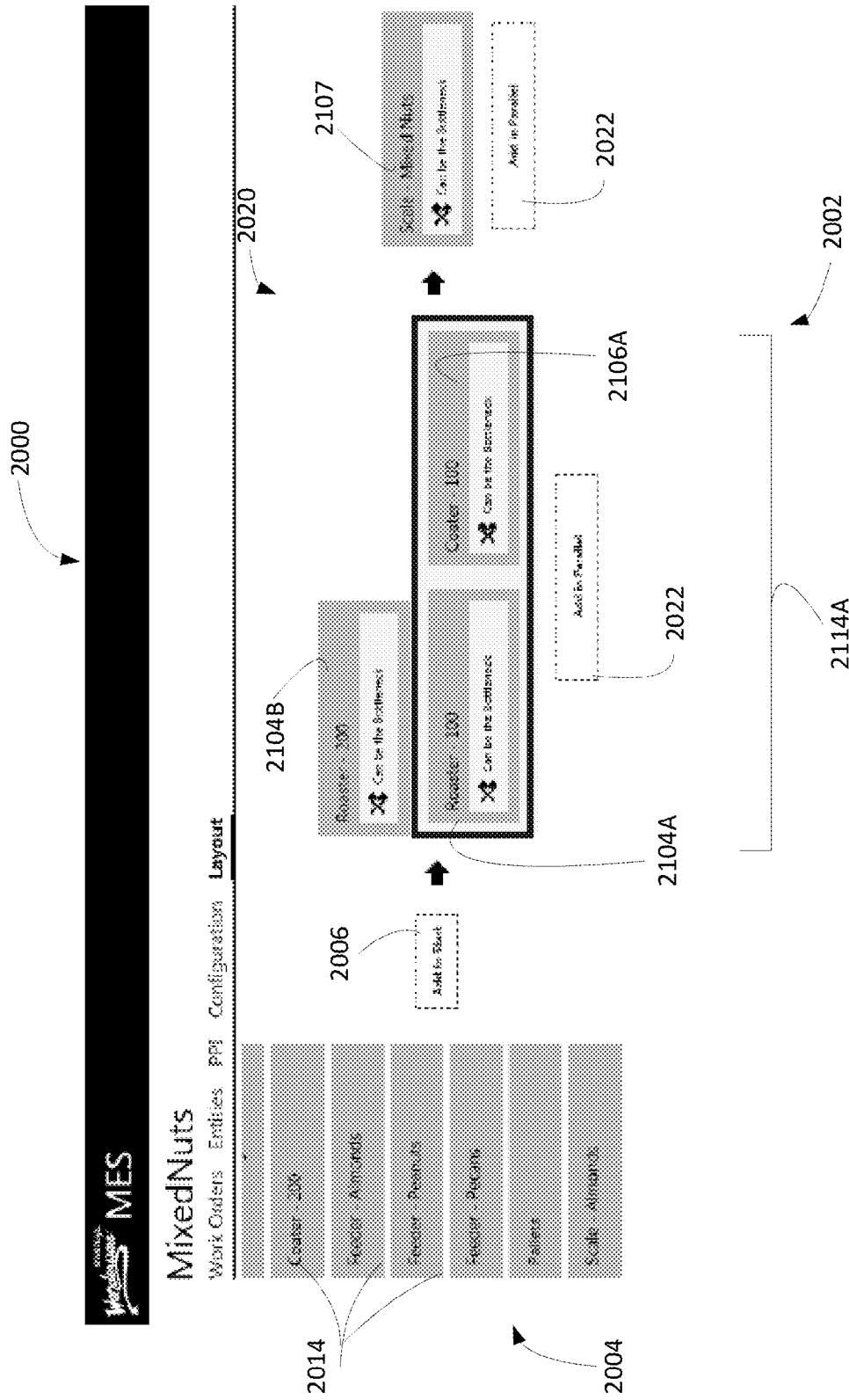
FIG. 28 is a partial screenshot of the line layout configuration view after the user input of FIG. 27 has been received and schematically representing the effect thereof.
Figure 29:
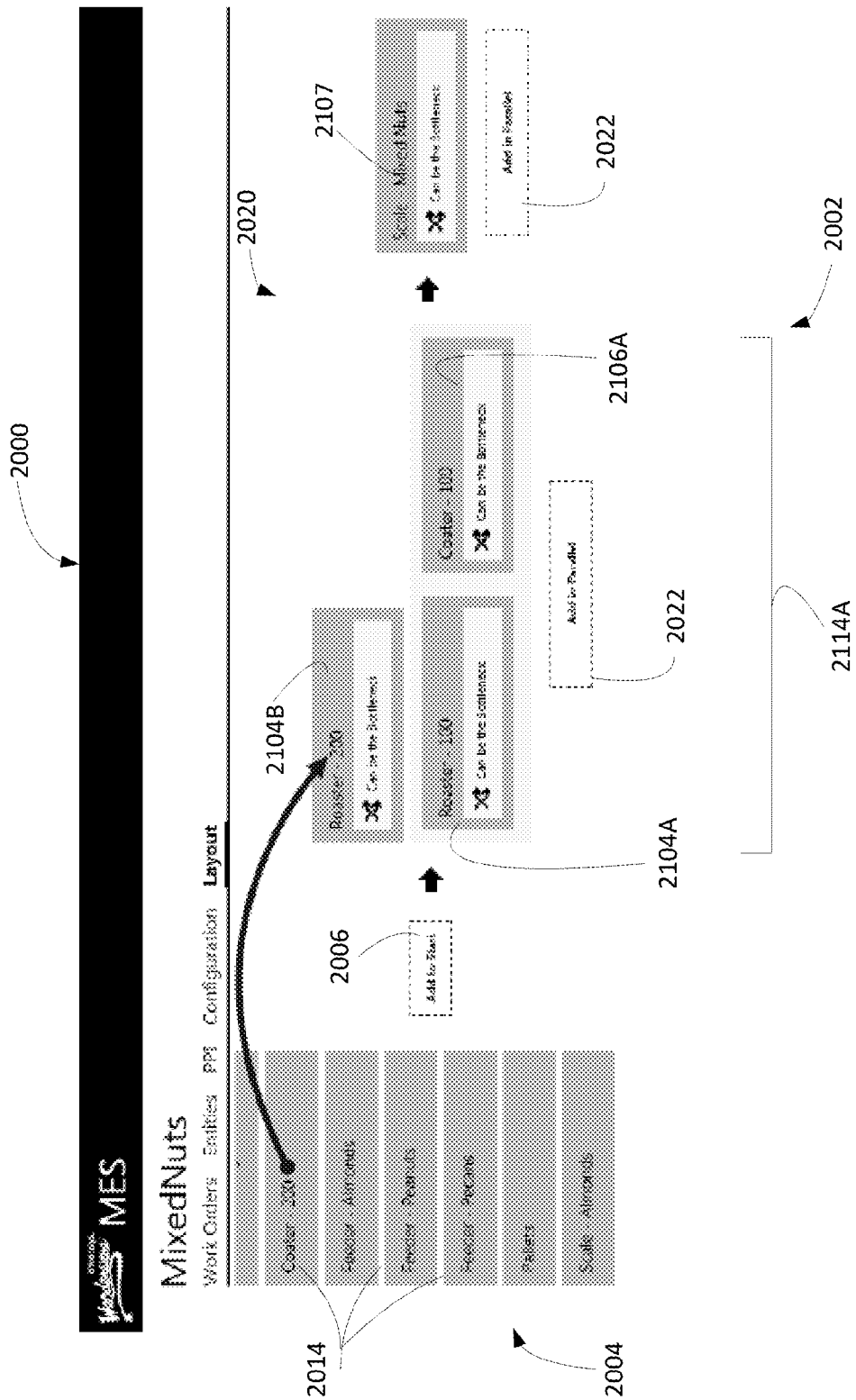
FIG. 29 is a partial screenshot of the line layout configuration view after the user input of FIG. 27 has been received and an arrow schematically representing a user input effective to add an entity object to the object model in a line segment with another of the entity objects.
Figure 30:
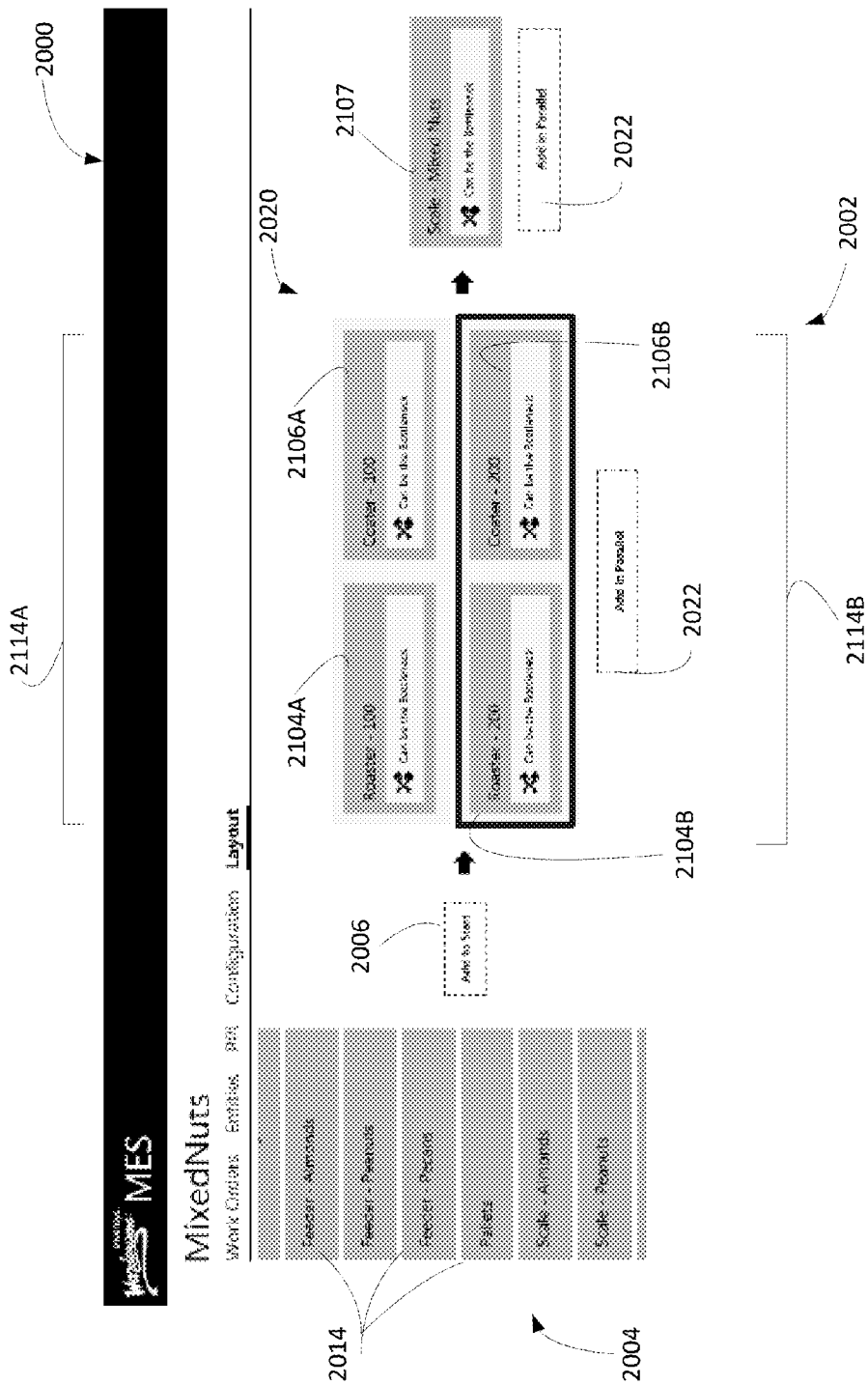
FIG. 30 is a partial screenshot of the line layout configuration view after the user input of FIG. 29 has been received and schematically representing the effects thereof.

To configure the object model 2020 to have entities arranged in parallel, a configuration object 2014 is placed onto an Add in Parallel drop object 2022. Thus, as shown in FIGS. 25-26, when a configuration object 2014 is dragged from the palette 2004 to the Add in Parallel drop object 2022 shown beneath the Roaster—100 object 2104A, a new Roaster—200 object 2104B is added to the object model 2020 in parallel with the Roaster—100 object. To configure a line segment in the object model 2020, a configuration object 2014 is selected from the palette 2004 and placed on a parallel object in the object model that will precede it in the line segment. As shown in FIGS. 27-30, when a configuration object 2014 is dragged from the palette 2004 to the Roaster 100 object 2104A in the object model 2020, a corresponding Coater 100 object 2106A is added to the object model in a line segment 2114A with the Roaster—100 object. Likewise, when a configuration object 2014 is dragged from the palette 2004 to the Roaster—200 object 2104B in the object model 2020, a corresponding Coater 200 object 2106B is added to the object model in a line segment 2114B with the Roaster—100 object. In the illustrated example, the object model 2020 has been configured to include parallel line segments 2114A-2114B representing the physical parallel line segments 114A-114B (FIG. 3).

Figure 31:
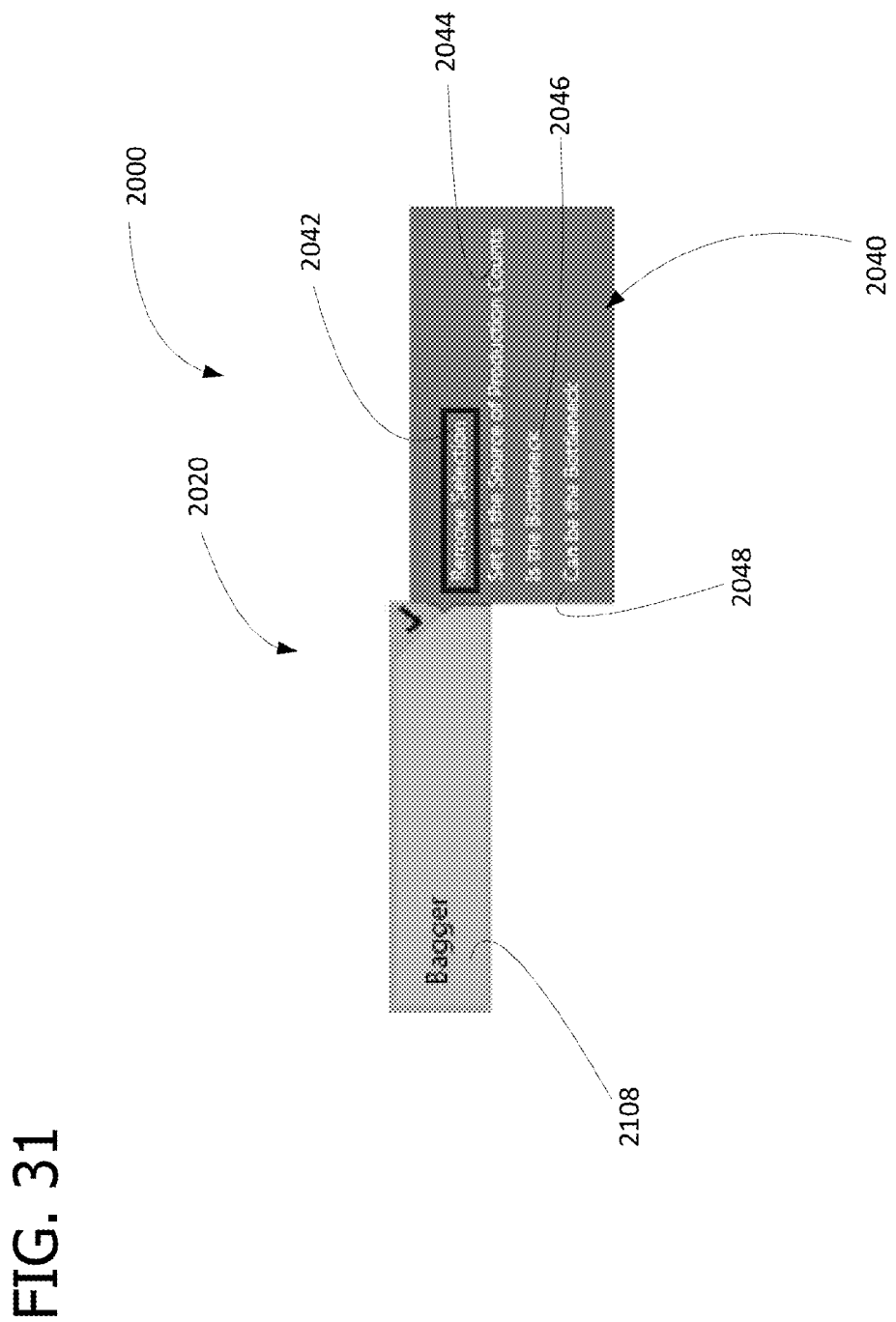
FIG. 31 is a partial screenshot of the line layout configuration view illustrating an entity object and a first drop down menu.

The configuration tool procedures 126 of the illustrated MES 20 also allow a user to modify or delete objects in an object model 2020. If, for example, a configuration object 2014 is placed at an incorrect position in an object model 2020, it may be selected from its erroneous location in the object model and placed at a correct position in the object model, for example, using a drag-and-drop operation. As shown in FIG. 31, if an object was erroneously added to a line (e.g., if the Bagger object 2108 does not belong in the object model 2020 at all), the object may be selected (e.g., by clicking with a mouse, etc.) and the Remove Selection option 2042 may be chosen from an object drop down menu 2040. Various other object-specific aspects of the object model 2020 may also be configured using the drop down menu 2040.

Figure 32:
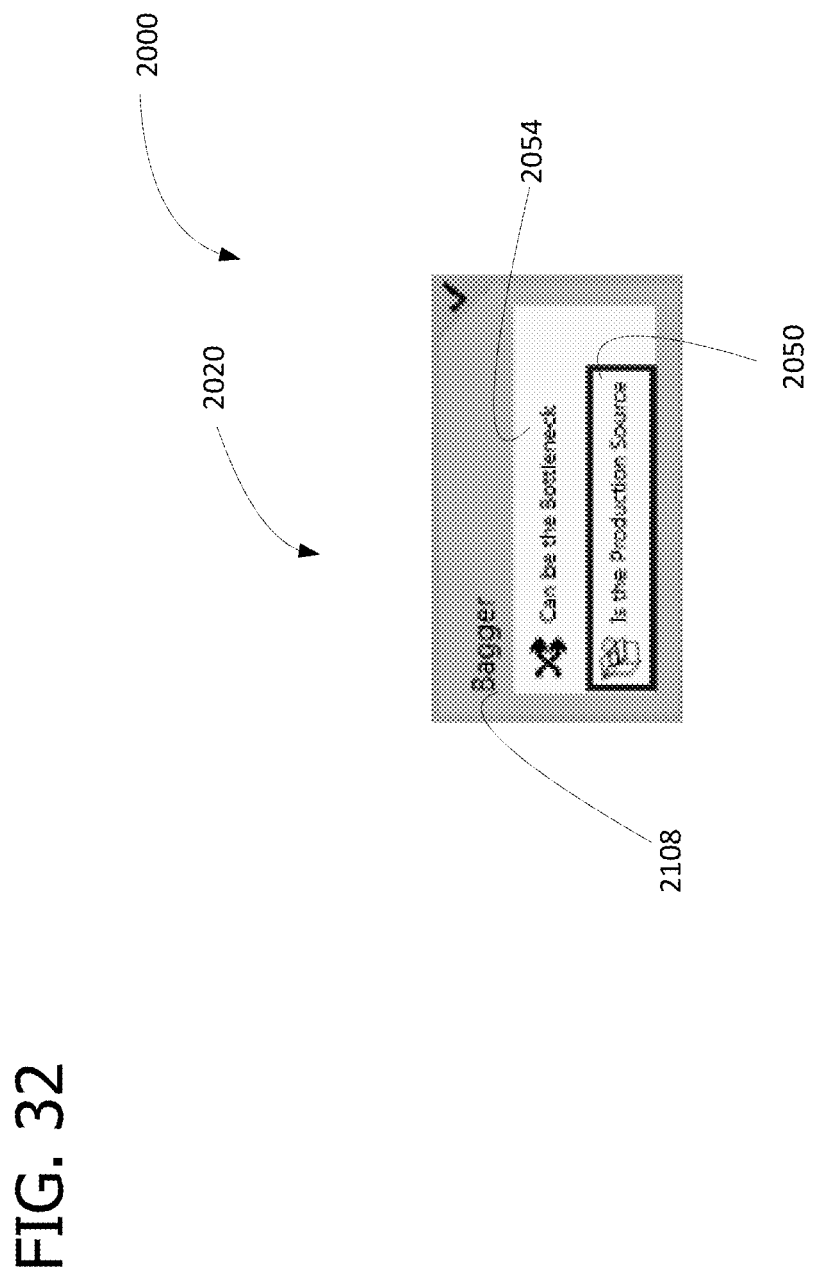
FIG. 32 is a partial screenshot of the line layout configuration view illustrating the entity object with two different display items thereupon.
Figure 33:
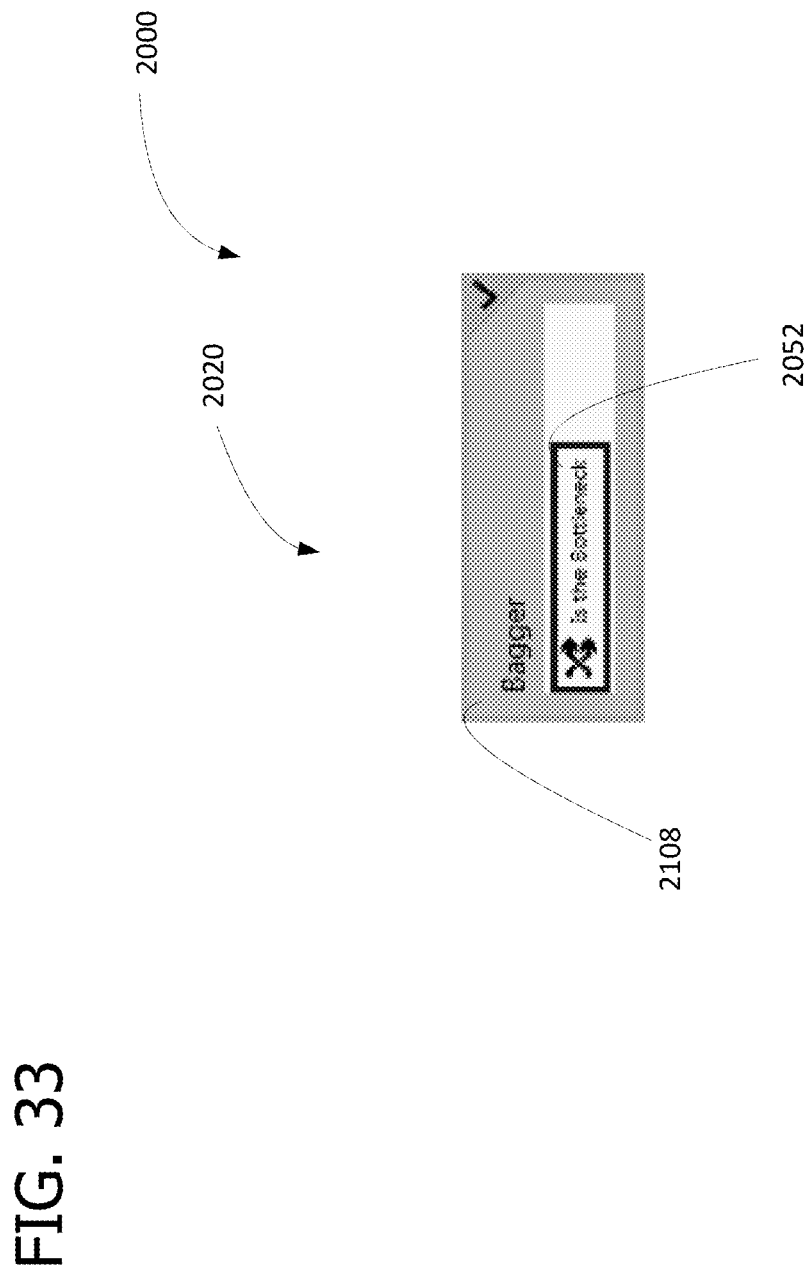
FIG. 33 is a partial screenshot of the line layout configuration view illustrating the entity object with another display item thereupon.
Figure 34:
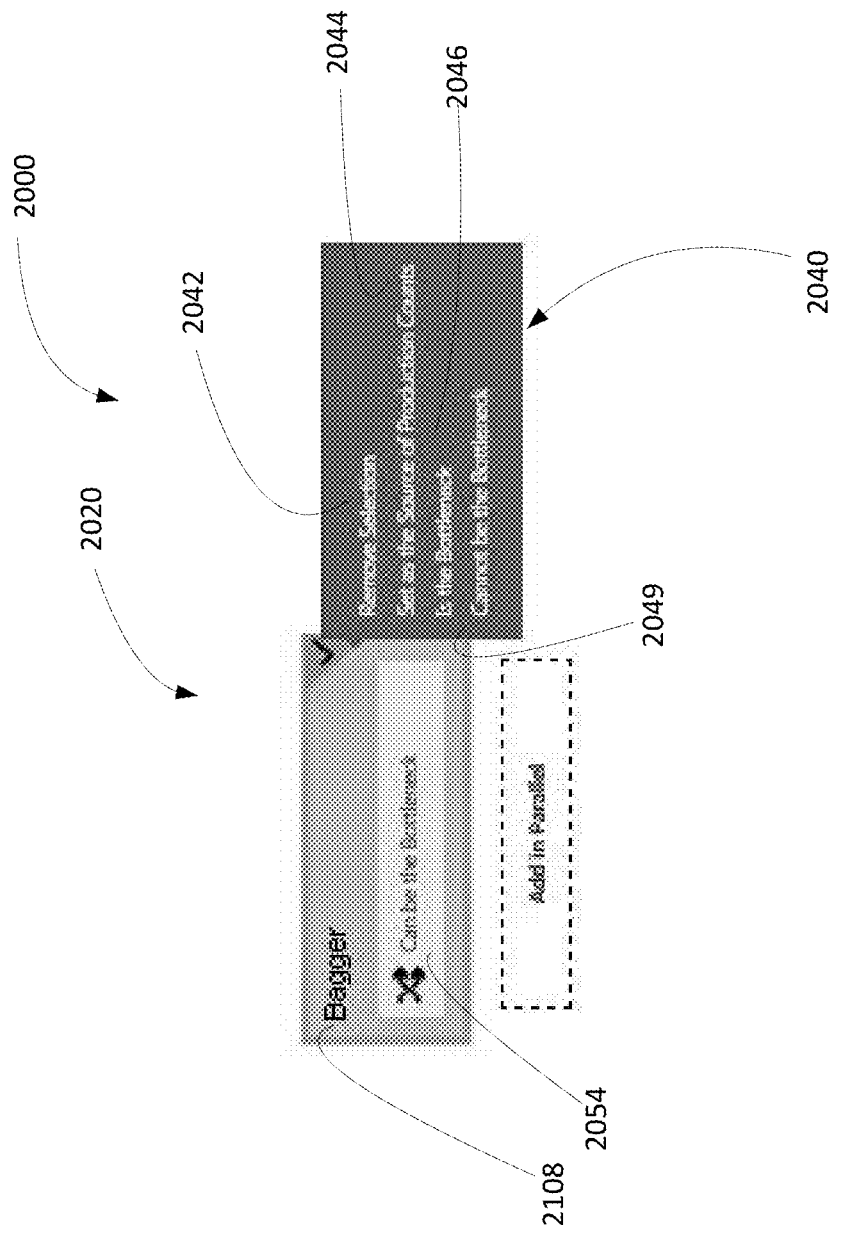
FIG. 34 is a partial screenshot of the line layout configuration view illustrating the entity object and a second drop down menu.

For example, if the entity represented by the object (e.g., the bagger entity 108, which is represented by the bagger object 2108) is the source of production counts for a line represented by an object model 2020 (e.g., the mixed nuts line 100, which is represented by the object model 2020), the Set as the Source of Production Counts option 2044 may be selected from the menu 2040. When that option is selected for a particular object, an Is the Production Source display item 2050 will be presented with the object in the object model 2020 (FIG. 32). Similarly, if the entity represented by the object (e.g., the bagger entity 108, which is represented by the bagger object 2108) is known to be the source of bottleneck for a line represented by an object model (e.g., the mixed nuts line 100, which is represented by the object model 2020), the Is the Bottleneck option 2046 may be selected from the menu 2040. When that option is selected for a particular object, an Is the Bottleneck display item 2052 may be presented with the object in the object model 2020 (FIG. 33). If the entity represented by an object (e.g., the bagger entity 108, which is represented by the bagger object 2108) is one possible source of bottleneck when the actual source of bottleneck is not known for a line represented by an object model (e.g., the mixed nuts line 100, which is represented by the object model 2020), the Can be the Bottleneck option 2048 may be selected from the menu 2040. When that option is selected for a particular object, a Can be the Bottleneck display item 2054 may be presented with the object in the object model 2020 (FIG. 32). As shown in FIG. 34, when an object has been assigned the Can be the Bottleneck display item 2054, the options on the drop down menu 2040 change. A new Cannot be the Bottleneck option 2049 is presented and the Can be the Bottleneck option is removed. When the Cannot be the Bottleneck option 2049 is selected for a particular object, a Cannot be the Bottleneck display item (not shown) may be presented with the object in the object model 2020. Similarly, after any of the other menu options 2042-2049 are selected for an object, the drop down menu may be changed to include an option for the removal of the item 2050-2054 that is displayed with the object.

As will be discussed in more detail below, the selections made using the drop down menu 2040 may be reflected in the line data model 130 associated with the object model 2020. Furthermore, these aspects of the data model 130 may be used to calculate a production metric for the physical production line represented thereby. It should be understood that FIGS. 20-34 present one view and set of tools for configuring line layout models 130B in accordance with the present invention. Other views and tools may also be used without departing from the scope of the invention.

When an object model 2020 has been configured to suit a user's purposes (FIG. 35), it may be saved to the MES database 30, for example, using the save selection object 2060. Saving the object model 2020 causes a corresponding line data model 130 to be generated based on the configuration settings chosen in the object model. More specifically, a line layout model 130B will be generated in its entirety, and certain data items for the line definition model 130A will be updated. As discussed above, a line layout model 130B conforms to the data structure of a line layout sub-template 122B. In the illustrated embodiment, the line layout sub-template 122B includes an entity link template 162 for each of the entities associated with the line data model 130. Thus, for each of the objects in an object model 2020 (e.g., objects 2102-2112) the MES 20 automatically generates an entity link model 164. Each entity link model 164 corresponds to the data structure defined by the entity link template 162, and the entity link template includes data fields for many of the configuration settings defined in the line layout configuration view 2000.

FIG. 36 depicts the data structure of an exemplary entity link template 162. The line layout sub-template 122B, which in the illustrated embodiment corresponds with an entity link template 162, includes a list of fields 3602. Each field 3602 has a corresponding data type 3604. Together, the fields 3602 and their associated data types 3604 define the data structure for the line layout model 130B, which in the illustrated embodiment includes rows in a table defining an entity link model 164. As discussed above, each entity represented by an object in an object model 2020 may have a corresponding entity link model 164. The Line_ID field 3602 identifies the line to which the entity represented by the entity link model 164 belongs using, for example, a corresponding Line_ID value from a line definition model 130A (see FIG. 19). In the illustrated example, the entity link model 164 represents the bagger entity 108 of the mixed nuts line 100. Thus, the Line_ID field for the model 164 has a value of 1, which associates the model with the line definition model 130A of FIG. 19 using, for example, a foreign-key relationship. The Ent_ID field 3602 identifies the entity represented in the entity link model 164. In the illustrated example, the Ent_ID number of 9 corresponds with an Ent_ID field in an entity data model 124 for the bagger entity 108. Thus, the Ent_ID field relates the entity link model 164 to a corresponding entity data model 124. In combination, the Line_ID and Ent_ID fields 3602 associate an entity link model with an entity data model 124 and a line definition model 130A. For each entity link model 164, the MES 20, therefore, understands the line to which it belongs and the particular entity it represents.

Figure 35:
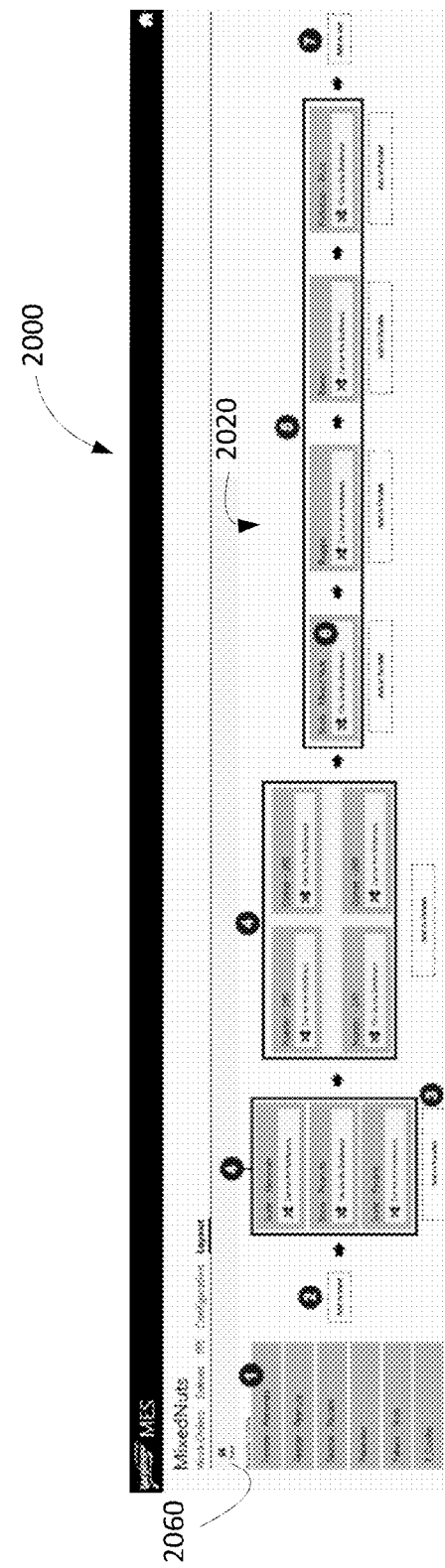
FIG. 35 is a partial screenshot of the line layout configuration view after an object model representing the mixed nuts production line of FIG. 3 has been configured.

Beginning with the Child_Order data field 3602, the entity link model 164 defines layout configuration parameters for the entity. The integer value in each Child_Order data field specifies the relative order of the entity in the line layout. As discussed above, the bagger 108 has the fifth line position in the mixed nuts line 100. Moreover, the bagger object 2108 has the fifth line position in the object model 2020 (FIG. 35). Thus, the Child_Order value of 5 provides an indication that the entity represented by the illustrated entity link model 164 is the fifth entity in the line corresponding with the Line_ID of 1. Successive serial entities will have a different Child_Order value, but parallel entities will have the same Child_Order value. The Line_Is_Child field 3602 indicates whether the entity represented by the entity link model 164 is a parent entity for the line. In the illustrated embodiment, only the plant entity 32 is a parent to the mixed nuts line 100. Thus, Line_Is_Child is set to FALSE for the bagger entity 108 (Ent_ID=5). For entity link models 164 having a Line_Is_Child set to TRUE, the Child_Order, Input_Pct, and Segment_No fields 3602 will automatically be set to null.

The Segment_No field 3602 is set to null for every entity that is not part of a line segment. Thus, for the bagger entity 108, the entity link model 164 has a Segment_No set to Null. The MES 20 is configured to automatically assign an identifier to each new line segment that is saved from an object model 2020. In the object model 2020 of FIG. 35, two line segments, corresponding respectively to the Roaster 100 object 2104A and the Coater 100 object 2106A and to the Roaster 200 object 2014B and the Coater 200 object 2106B, were configured. The MES application may be configured to assign unique integer identifiers to each of these new segment models. Thus, entity link models 164 for each of the objects 2104A, 2106A will be given the same Segment_No identifying number. Likewise, entity link models 164 for each of the objects 2104B, 2106B will be given the same Segment_No identifying number. A Segment_No value indicates to the MES that the output of the entity only flows to the next entity/entities at the next position in the line segment (unless the entity is the last in the segment). The Can_Be_Bottleneck field 3602 indicates whether the entity represented by the entity link model 164 is capable of being considered the bottleneck for the line. In the illustrated example, the Can be the Bottleneck option 2048 was selected for the Bagger object 2108 in the object model 2020

(FIG. 35). Thus, the Can_Be_Bottleneck field 3602 is set to TRUE for the bagger entity link model 164. As will be discussed in more detail below, when Can_Be_Bottleneck is set to TRUE for more than one entity in a line the MES 20 may use production metric tools 128 stored on the MES database to dynamically determine the source of the bottleneck for the physical production line. If the Can_Be_Bottleneck field 3602 is set to FALSE, the object model 2020 may include a Cannot Be the Bottleneck item 2049 for the associated entity.

The Last_Edit_Comment, Last_Edit_By, and Last_Edit_At fields 3602 of the entity link template 162 each relate to maintaining an audit trail for configuration changes made to an entity link model 164. The MES application may be configured to automatically generate data for the Last_Edit_Comment, Last_Edit_By, Last_Edit_At, and Line_ID fields 3602 when a new entity link model 164 is saved or a preexisting model is edited. Any changes to entity configuration settings on the line layout configuration view 2000 can cause changes to the Last_Edit_Comment, Last_Edit_By, Last_Edit_At, and Line_ID fields 3602. The Row_ID field 3602 is an automatically generated ID that uniquely identifies the entity link model 164. It may be generated using similar principles to the Line_ID field 1902 of the entity definition table 130A (e.g., integer incrementing for each new entity link table 164 saved to the MES database 30). The illustrated line layout sub-template 122B is but one example of a suitable data structure for configuring line layout models 130B. Moreover, the use of entity link models 164 is but one example of a suitable way to configure line layout models 130B. It should be understood that other line model templates 122 may also be used without departing from the scope of the invention.

As mentioned above, certain configuration settings that can be changed using the layout configuration view 2000 may affect the line definition model 130A. For example, if the Is the Bottleneck option 2046 (FIG. 31) is selected for an entity in an object model 2020, the entity's ID (e.g., Ent_ID) may be provided for the Bottleneck_Ent_ID item 1902 in the line definition model 130A. Likewise, when the Set as the Source of Production Counts option 2044 is selected for an entity in an object model 2020, the entity's ID may be provided for the Prod_Ent_ID field 1902 in the line configuration object model A. If a user fails to define source of production counts for an object model 2020, the MES 20 will automatically provide a Prod_Ent_ID for the line equal to the entity ID of the entity with the highest line position (which is representative of the furthest downstream entity at the end of the production line), for example, using the Child_Order field. Still other aspects of the line configuration object model 130A may be configurable from the line layout configuration view 2000 without departing from the scope of the invention.

Figure 37:
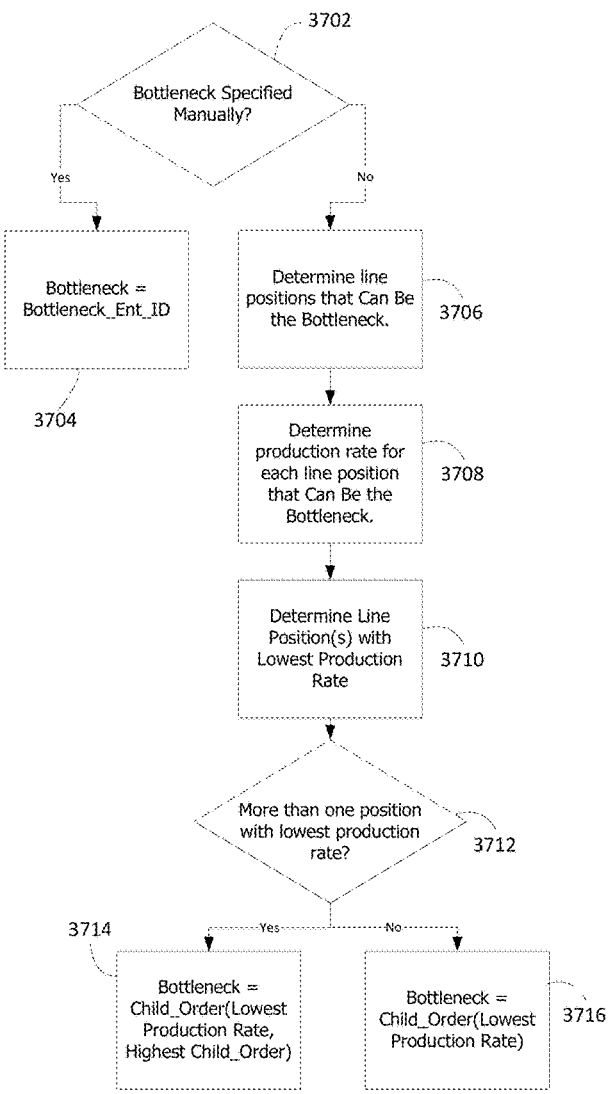
FIG. 37 is a flowchart illustrating the steps and decision points for a dynamic bottleneck determination method of the MES.

As discussed above, the illustrated MES 20 may be configured to use stored procedures 128 to determine production metrics for a production line. One example of a production metric that may be determined using the illustrated MES is bottleneck. As shown in FIG. 37, depending on the configuration of the line data model 130, the MES application may automatically determine the source of bottleneck for the production line or may do so on the basis of user-supplied configuration parameters (step 3702). If the source of bottleneck is manually specified (e.g., if the Is the Bottleneck display item 2052 appears in an object of the object model 2020 (FIG. 33) or if a line definition model 130A has a value other than Null in its Bottleneck_Ent_ID field 1902 (FIG. 19)), the bottleneck line position used in calculating a line's performance amount is that of the manually specified bottleneck entity (step 3704). Thus, the production from the entity/entities at the line position with the manually assigned bottleneck identifier will be used for reporting the line's performance amount. If there is more than one entity at the same line position as the manually-designated entity, the performance amount is based on the combined production of the entities at that line position. In some embodiments, an entity's production is based on the reported number of good and rejected items produced by the entity. As discussed above, a standard type of item produced by the entity may be defined in the entity data model 124. Likewise, each job to be performed by the entity may define the item to be produced thereupon.

If the bottleneck is not defined manually, the MES 20 may dynamically determine the source of bottleneck. As discussed above, each entity in an object model 2020 may have a Can be the Bottleneck or Cannot be the Bottleneck option 2048 or 2049 selected therefor. In the entity link model 162 for each entity, the Can_Be_Bottleneck field 3602 may identify whether the entity is capable of being the source of the bottleneck for the production line. At step 3706, the MES 20 determines which of the entities in the line data model 130 are capable of being the bottleneck based on this data. At step 3708, the MES 20 determines the production rate for each of the line positions that can be the bottleneck. In the illustrated embodiment, the MES 20 uses an expected production rate. The expected production rate for an entity may be based on a production rate provided in a job assigned to the entity or the standard production rate for the entity as defined by the entity data model 124.

"Bottleneck" typically describes the line position with the lowest expected production rate, rather than a particular entity. When determining the source of bottleneck, the expected production rates for parallel entities are added together to determine the production rate for their respective line position. If two or more of the line positions share the distinction of having the lowest production rate (decision block 3712), the MES 20 identifies the bottleneck as the highest of the line positions (i.e., the furthest downstream position) that share the lowest production rate (3714). If only one line position has the lowest production rate, the MES 20 identifies that line position as the bottleneck (3716). The MES 20 will calculate the line's performance amount using the production for the entity/entities identified as the bottleneck. Likewise, in some embodiments, the MES 20 may calculate the production rate for the line based on the actual or expected production rate for the bottleneck entity/entities.

Figure 38:
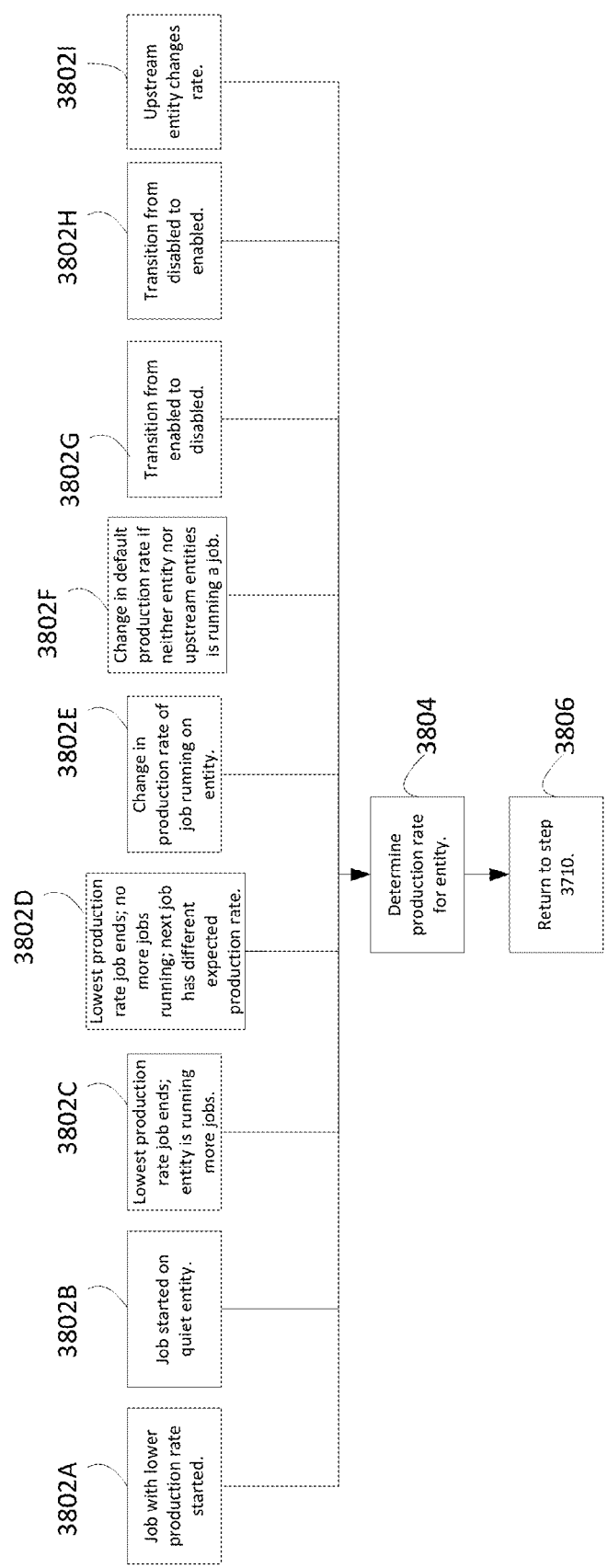
FIG. 38 is a flowchart illustrating trigger events that cause the MES to determine a production rate for an entity.

As shown in FIG. 38, if the bottleneck is to be dynamically determined, any of the trigger events 3802A-3802I may cause the MES 20 to determine a new production rate for an entity and its line position. In some embodiments, the MES 20 may receive production data from the physical plant 32 that indicates the occurrence of a trigger event. Condition 3802A provides that when a job is started on an entity and the new job has an expected production rate that is lower than the expected production rate of any other job running on the entity, the MES application will determine the production rate for the entity (step 3804) and re-compare the production rates for each of the line positions (step 3806). Upon the occurrence of any of the other trigger conditions 3802B-3802I, the MES application will also determine a new production rate for the entity (step 3804) and re-compare the production rates for each of the line positions (step 3806). Condition 3802B is satisfied when a job is started on an entity, which is not running any other jobs, and the new job's production rate is different than the entity's previous production rate. Condition 3802C occurs when a job that has a production rate that is lower than the production rate of any other job that will still be running on the entity ends. Condition 3802D is triggered when a job is ended on the entity, which is not running any other jobs, and the entity's projected production rate is different than that of the job that was ended. The entity's projected production rate may be determined, for example, using an expected production rate for the next job scheduled or the standard production rate for the entity that is stored in the data model 124. Trigger condition 3802E is satisfied when there is a change in the expected production rate of a job running on the entity. Condition 3802F occurs when there is a change in the default production rate of an entity, if neither that entity nor any of entities upstream thereof are running any jobs. Conditions 3802G and 3802H are triggered when an entity transitions from enabled to disabled or disabled to enabled, respectively. Condition 3802I is triggered when the entity is running no jobs, and the next upstream entity that is running jobs has a change in production rate.

Figure 39:
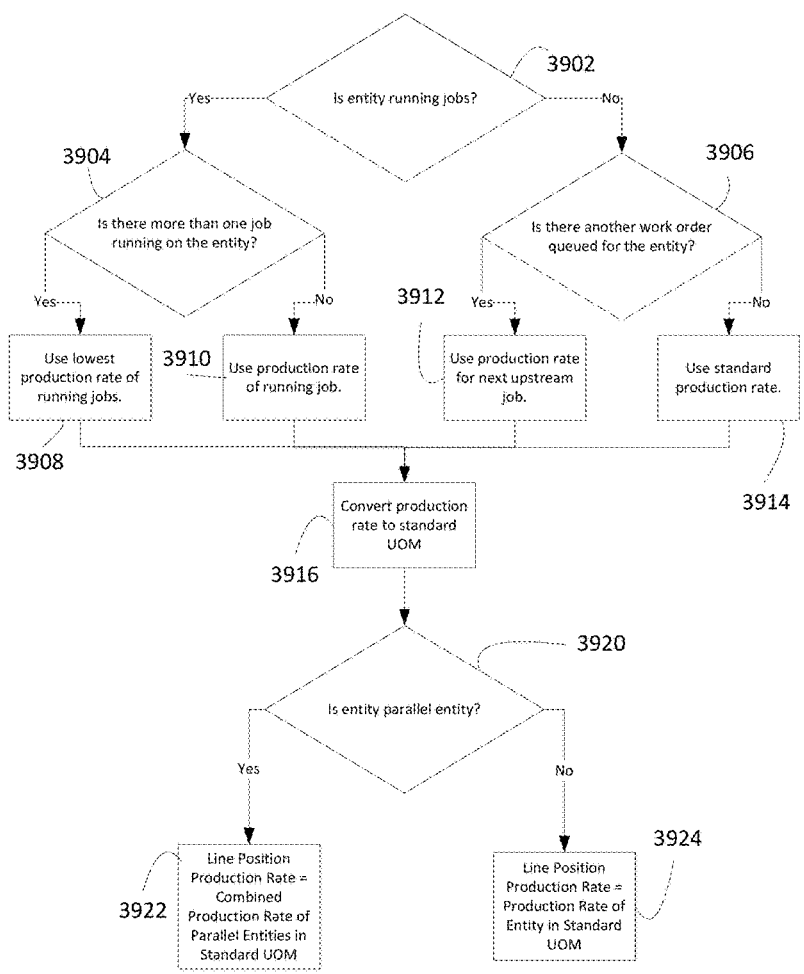
FIG. 39 is a flowchart illustrating the steps and decision points of a method of the MES for determining the production rate for a line position.

FIG. 39 provides a more detailed explanation of the illustrated MES's method of determining the production rates of entities. At decision block 3902, the MES 20 initially determines whether an entity is currently running jobs. For entities that are running jobs, at decision block 3904 it is determined whether more than one job is being run on the entity. If more than one job is being run on an entity, the MES 20 uses the lowest expected production rate of the running jobs (3908). If there is only one job running on the entity, the MES 20 uses the expected production rate of that job (3910). For entities that are not running jobs, it is determined whether there is another work order queued for the entity (e.g., whether any scheduled work orders will eventually assign a job to the entity) (decision block 3906). If there is another work order queued for the entity, the MES 20 uses the expected production rate for the job queued to the entity for the next upstream work order (step 3912). If jobs from different work orders are running at the same next upstream line position, the downstream entity's expected production rate may be determine based on the job for the work order whose upstream job began first. If there is not another work order queued for the entity, the MES 20 uses the standard production rate for the entity (see FIG. 16) (step 3914). Using the production rate determined in one of steps 3908-3914, the MES 20 converts the production rate to a standard unit of measure in step 3916.

To compare the production rates among the entities in a line, the rates may be converted into comparable units. The expected production rate for an entity can be expressed in terms of hours, minutes, or seconds per batch or batches per hour, minute, or second. This standard unit of measure may be chosen on the OEE configuration screen 1600 (FIG. 16) and modeled in the OEE model 124E of the entity data model 124. Different entities and jobs may have expected production rates defined in different units of measure. Moreover, different entities and jobs may have different batch sizes based on different standard items. Thus, for example, a job running on the palletizer 112 (FIG. 3) may have a production rate defined in batches per hour, a batch size of one, and a standard item of a pallet (it should be understood that these parameters may also be defined by the entity data model 124 in some circumstances). A job running on the bagger 108, on the other hand, may have a production rate defined in batches per minute, with a batch size of ten and a default standard item of one bag of nuts. In this example, assume that the job running on the bagger 108 has an expected production rate of 20 bags per minute, and the job running on the palletizer 112 has an expected production rate of one batch per hour. To compare these production rates the MES 20 may convert them into a standard unit of measure. In some embodiments, the MES will assume the standard unit of measure is the Prod_UOM for the line (see FIG. 19). As discussed above, for the illustrated embodiment, the Batch_Size is set to 1 of a Std_Item_ID set to pallet. Thus, the illustrated standard unit of measure may be the chosen unit of measure for the line: pallets of mixed nuts per hour.

Because the palletizer 112 has an expected production rate defined in terms of the standard units of measure for the line, no conversion is needed. For the bagger, however, assume there are 1000 bags in a pallet of mixed nuts. The bagger has an expected production rate of 20 bags per minute, which means it is expected to produce 1200 bags every hour. Thus, the bagger is expected to produce at a rate of 1.2 pallets of mixed nuts per hour (because there are 1000 bags to a pallet). As between the palletizer and the bagger, the palletizer is the slower entity. These conversion calculations are performed for any entity whose production rate is being updated (e.g., in response to a trigger condition 3802A-3802I) in step 3916. For parallel entities at the same line position, the combined production rates are used for comparison purposes. Thus, at decision block 3920, the MES determines whether an entity is a parallel entity. If it is a parallel entity, the MES 20 sums the production rates for each of the entities at its line position (step 3922). If it is not a parallel entity, the production rate for the line position is set equal to the production rate for the entity (step 3922). Though the above example set the standard unit of measure equal to the production unit of measure for the line, it should be understood that other embodiments may use a different standard unit of measure for purposes of comparing the production rates of entities in a line without departing from the scope of the invention.

As discussed above, the MES 20 may be configured to monitor a line's performance amount and production amount. The line's performance amount is based on the bottleneck entity. For example, a line's performance amount may be calculated based on the reported production for the bottleneck entity (which may, e.g., include the number of good and rejected items produced by the entity) in terms of the standard unit of measure for the line. Thus, if in the example above the bagger 108 was the bottleneck and produced 1000 good items and 100 bad items, the performance amount for the line would be 1.1 pallets. The production amount, on the other hand, is based on the amount of production at the entity defined as the line's production source. Thus, if the palletizer 112 is the source of production counts and it produced one pallet, the production amount for the line 100 will be reported as one pallet. The actual production rate for an entity may be calculated based on the total production amount for the entity (good plus rejected items), divided by an amount of time the entity is in a running utilization state. The production rate for the bottleneck entity may be converted to the standard item and standard unit of measure for the line and reported as the performance rate for the line. Likewise, the production rate for the entity that is the source of production counts for the line may be converted (if needed) and reported as the production rate for the line.

Figure 40:
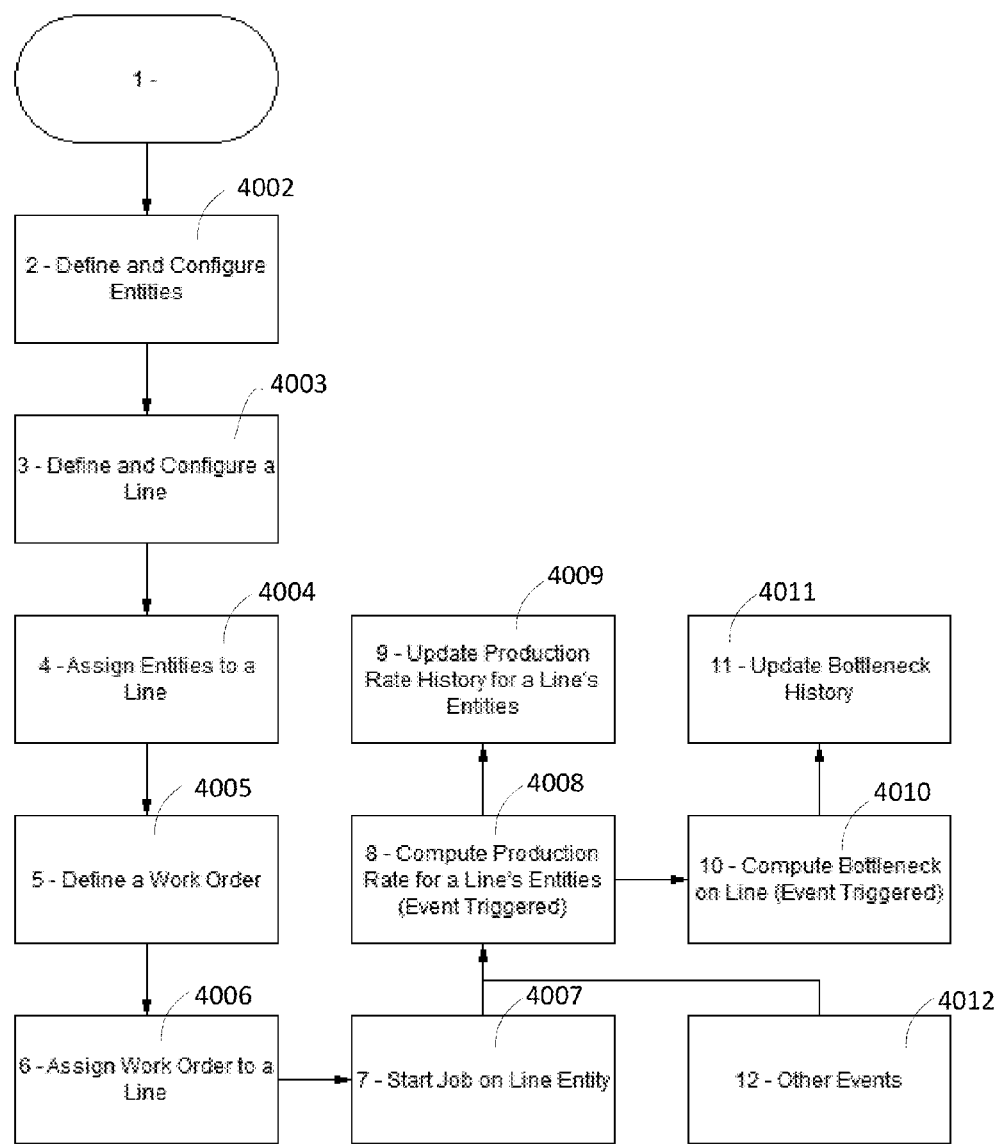
FIG. 40 is a flowchart illustrating the steps of a method of the MES for maintaining historical data about the production of a line.

In addition to dynamically calculating production information for a production line, the MES may be further configured track production history and bottleneck history for the line. FIG. 40 depicts a flow chart of one method of using the MES to monitor historical performance data for a line. From steps 4002-4004, entity and line models are configured in accordance with the techniques set forth above. At step 4005, one or more work orders are defined using work order configuration tools that may, for example, be stored on the MES server 24 and accessed via the workstation 22. The work orders are assigned to a line at step 4006. Jobs may be automatically instantiated and started on their respective entities at step 4007. Using the techniques discussed above, the MES 20 computes expected production rates for the entities on the line (step 4008). Each time a trigger event 3802A-3802I occurs (step 4012) the MES 20 again computes the expected production rate for the entity. A production rate history may be maintained for each entity and updated each time a trigger event instigates the computation of a new expected production rate for the entity (step 4009). The MES database 30 may include data entries that timestamp each new computation of a production rate for each entity. At step 4010, the MES 20 identifies the bottleneck. Each time a trigger event 3802A-3802I occurs, the MES 20 may, after computing the updated production rate for the entity/entities that triggered the event, repeat step 4010. Every time the MES 20 computes a new bottleneck 4010, a bottleneck history may be updated in the MES database 30 (step 4011). For example, the MES may include data entries that time stamp each transition from one source of bottleneck to another source of bottleneck.

In addition to tracking the production rate history and the bottleneck history for a line, the MES 20 may be configured to track the performance amount for each entity on the line. As discussed above, the MES 20 may be configured such that production data is sent from the physical plant 32 to the MES server 24. In some embodiments, using the configuration tools 126, a user may choose whether the server 24 receives updated production data in regular temporal increments (e.g., every hour) or each instant new data is available. An historical accounting of the production for each entity on a line may be maintained at the frequency chosen by the user. Using this historical production data and the historical record of bottleneck entities, the historical performance amounts for a line may also be retrieved.

In some embodiments, the MES 20 may be configured to determine the utilization status of the line. For example, the MES 20 may associate the status of the line with that of its entity with the highest priority contemporaneous utilization reason. Thus, the MES 20 may display an indication of the status of the line based on the utilization state of the entity that currently has the highest priority utilization reason.

Figure 41:
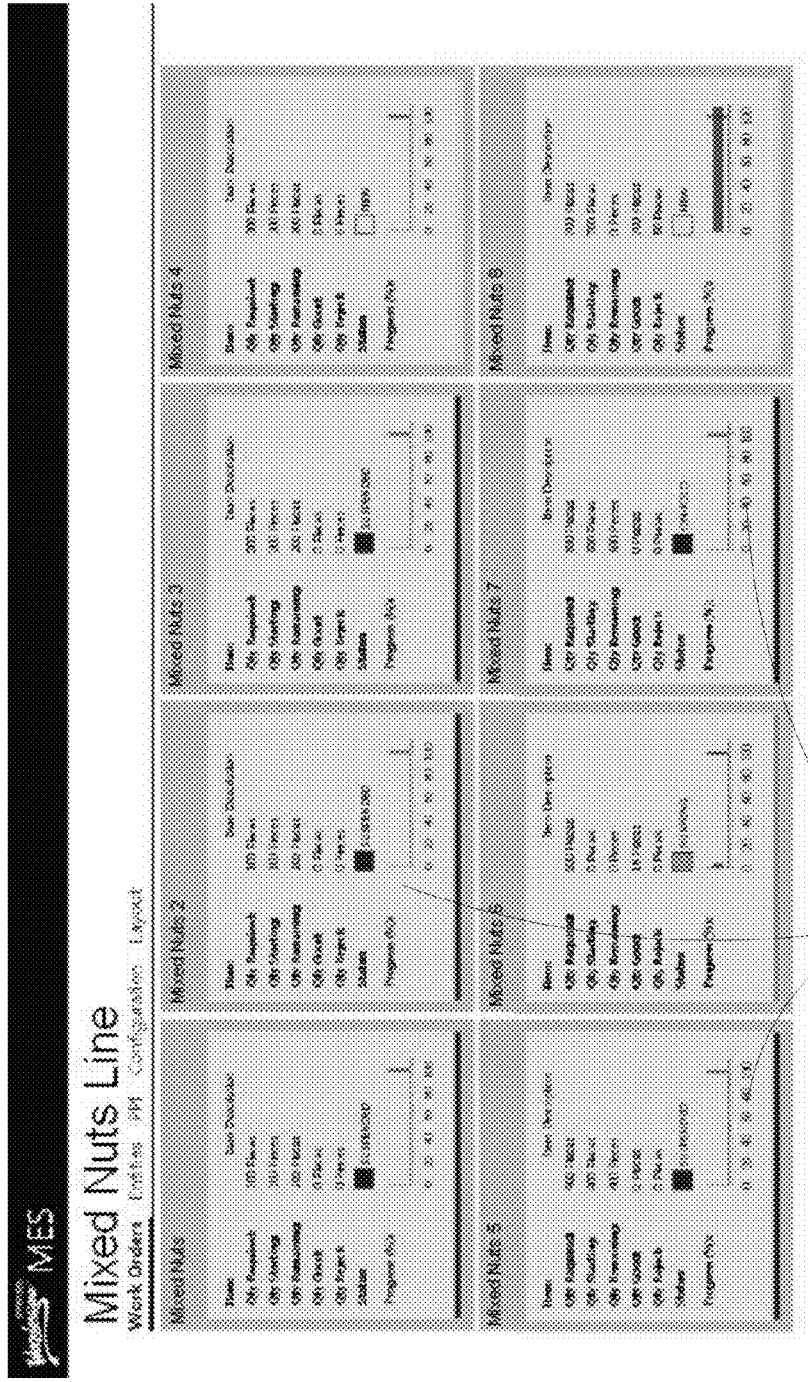
FIG. 41 is a partial screenshot of a work orders view of the MES.
Figure 42:
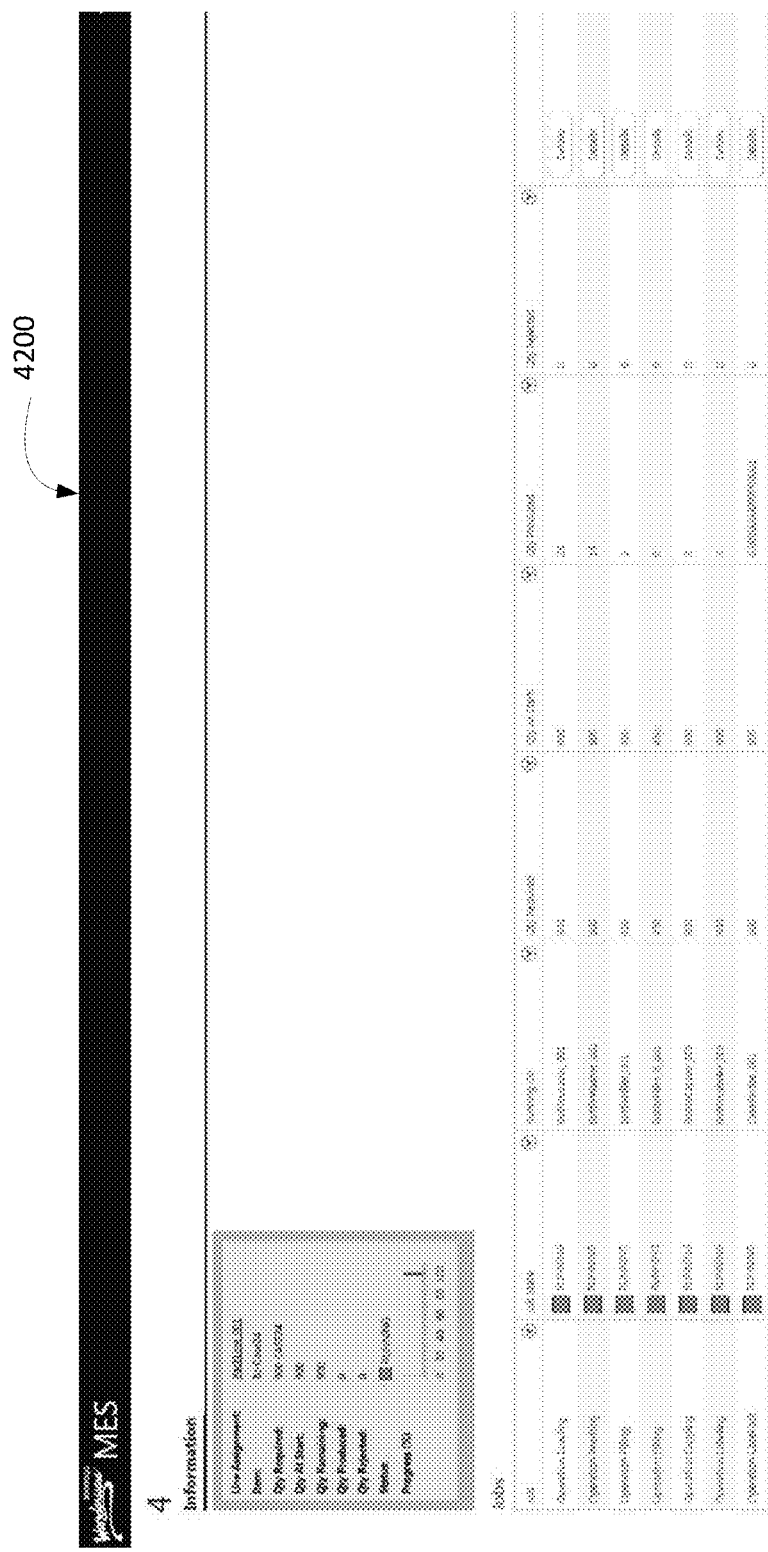
FIG. 42 is a partial screenshot of a jobs listing view of the MES.
Figure 43:
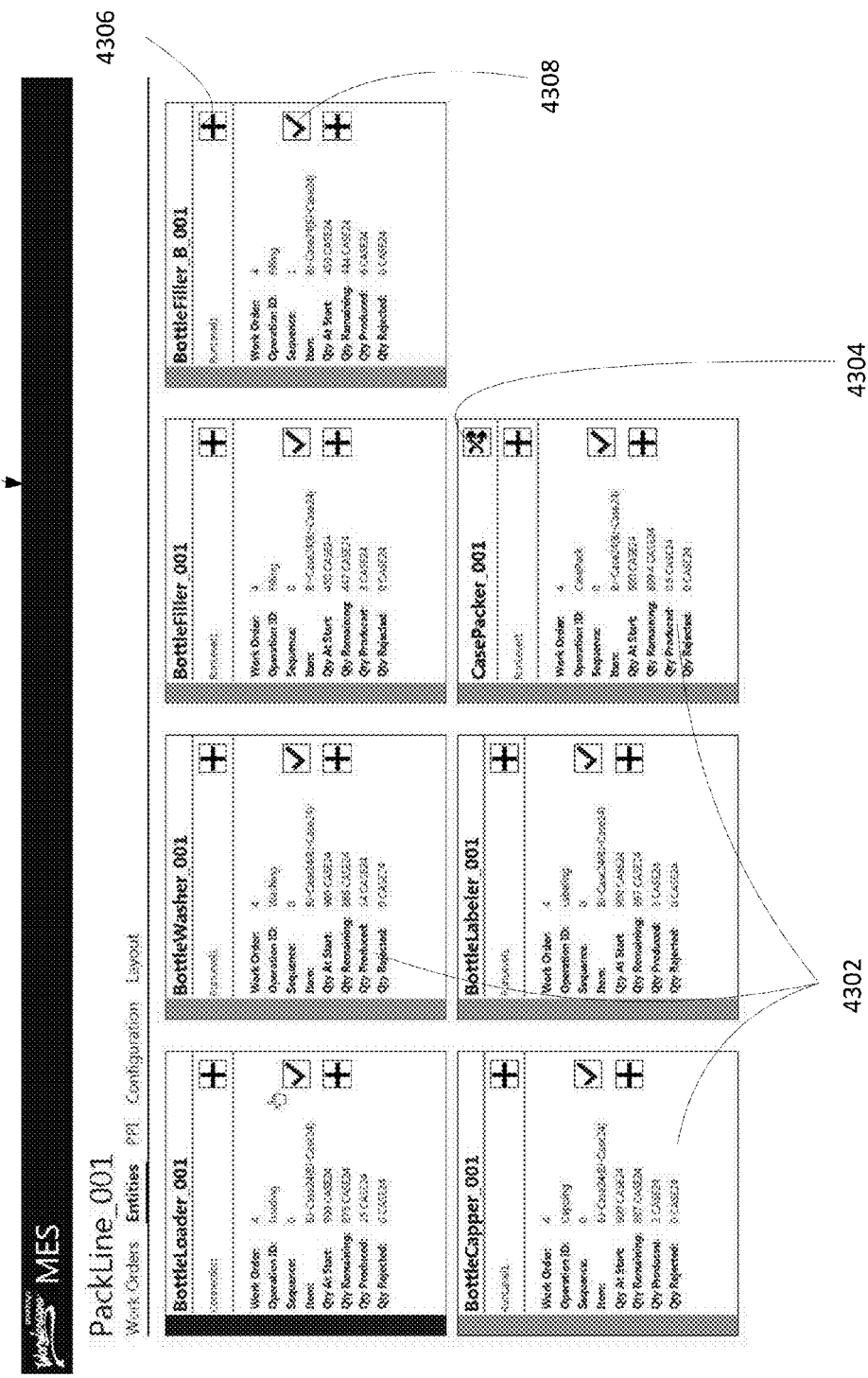
FIG. 43 is a partial screenshot of an entities view of the MES.

During runtime, a user may access information about the status of a production line from the workstation 22 using, for example, the views 4100-4300 of FIGS. 41-43. From the lines collection view 1700 of FIG. 17, a user may select a line and navigate to a line hub page. The line hub page 1700 includes a tabbed browsing structure through which a user may access display formats that present information about a line's assigned work orders, entities, PPI, configuration, and layout. At FIG. 41, the work orders view 4100 is selected. In the illustrated example, the selected line has been assigned eight work orders. The work orders tab displays information about each of the assigned work orders in work order display objects 4102. Each work order display object 4102 includes information about the status of the work order. In the illustrated embodiment, status information is presented through color coding where blue corresponds with new, green corresponds with running, and red corresponds with either suspended or on hold (i.e., utilization states for the work orders assigned to the line, based on production data reported from the plant 32). A work order is completed status (not shown) may also be presented. Additional information presented on each work order object includes the quantity of an item to be produced in the work order, the quantity of items that have begun to be produced, the quantity of items still to be produced, the quantity of completed items that passed inspection, the quantity of completed items that failed inspection, and the percentage of overall progress. Other work order information may also be presented on a work order display object without departing from the scope of the invention.

As shown in FIG. 42, by selecting a work order from the work orders view 4100, a user can drill down for more detailed information about the work order. For example, in the illustrated embodiment, a jobs listing view 4200 is presented (in this case, for a bottle packing work order of a PackLine_001). The jobs listing may include status information. Such status information may be comparable to the status information of a work order taken as a whole. The jobs listing may present a table of all the jobs that make up the selected work order, arranged in the sequence in which the jobs are performed. Additional information, such as the entity on which such job is performed and item quantity data may also be displayed. Though not shown, more detailed information about a particular job may be accessed by, for example, selecting the details icon associated with the job.

Turning to FIG. 43, an entities view 4300 in a line hub page has been selected. The entities view presents display objects 4302 for each of the entities that are assigned to the selected line. The display objects 4302 may present status information and include gadgets for performing tasks. In one embodiment, a vertical color coded bar on the left edge of each entity display object is provided to present utilization information. In some embodiments, the utilization information color coding system may be the same as the status color coding system used to present information about the status of a work order. The entity display objects 4302 may also present information about the entity such as, for example, the work order currently being processed, operation currently being performed, sequence number, item being processed by the work order, and quantity information. A bottleneck identifier 4304 may also be shown with an entity display object 4302 to indicate that the entity is the current source of bottleneck and performance rate for the line. Gadgets such as the plus and checkmark boxes 4306-4308 on each of the illustrated entity objects may be used to assign new jobs or operations to an entity, terminate presently running jobs or operations, alter quantity information as desired, etc.

The Abstract and summary are provided to help the reader quickly ascertain the nature of the technical disclosure. They are submitted with the understanding that they will not be used to interpret or limit the scope or meaning of the claims. The summary is provided to introduce a selection of concepts in simplified form that are further described in the Detailed Description. The summary is not intended to identify key features or essential features of the claimed subject matter, nor is it intended to be used as an aid in determining the claimed subject matter.

For purposes of illustration, programs and other executable program components, such as the operating system, are illustrated herein as discrete blocks. It is recognized, however, that such programs and components reside at various times in different storage components of a computing device, and are executed by a data processor(s) of the device.

Although described in connection with an exemplary computing system environment, embodiments of the aspects of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well-known computing systems, environments, and/or configurations that may be suitable for use with aspects of the invention include, but are not limited to, personal computers, server computers, handheld or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the aspects of the invention may be described in the general context of data and/or processor-executable instructions, such as program modules, stored on one or more tangible, non-transitory storage media and executed by one or more processors or other devices. Generally, program modules include, but are not limited to, routines, programs, objects, components, and data structures that perform particular tasks or implement particular abstract data types. Aspects of the invention may also be practiced in distributed computing environments where tasks are performed by remote processing devices that are linked through a communications network. In a distributed computing environment, program modules may be located in both local and remote storage media including memory storage devices.

In operation, processors, computers and/or servers may execute the processor-executable instructions (e.g., software, firmware, and/or hardware) such as those illustrated herein to implement aspects of the invention.

Embodiments of the aspects of the invention may be implemented with processor-executable instructions. The processor-executable instructions may be organized into one or more processor-executable components or modules on a tangible processor readable storage medium. Aspects of the invention may be implemented with any number and organization of such components or modules. For example, aspects of the invention are not limited to the specific processor-executable instructions or the specific components or modules illustrated in the figures and described herein. Other embodiments of the aspects of the invention may include different processor-executable instructions or components having more or less functionality than illustrated and described herein.

The order of execution or performance of the operations in embodiments of the aspects of the invention illustrated and described herein is not essential, unless otherwise specified. That is, the operations may be performed in any order, unless otherwise specified, and embodiments of the aspects of the invention may include additional or fewer operations than those disclosed herein. For example, it is contemplated that executing or performing a particular operation before, contemporaneously with, or after another operation is within the scope of aspects of the invention.

Throughout the specification and claims, terms such as "item," "element," "object," etc. may be used interchangeably to generically describe or identify software or display features unless otherwise indicated.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that several advantages of the aspects of the invention are achieved and other advantageous results attained.

Not all of the depicted components illustrated or described may be required. In addition, some implementations and embodiments may include additional components. Variations in the arrangement and type of the components may be made without departing from the spirit or scope of the claims as set forth herein. Additional, different or fewer components may be provided and components may be combined. Alternatively or in addition, a component may be implemented by several components.

The above description illustrates the aspects of the invention by way of example and not by way of limitation. This description enables one skilled in the art to make and use the aspects of the invention, and describes several embodiments, adaptations, variations, alternatives and uses of the aspects of the invention, including what is presently believed to be the best mode of carrying out the aspects of the invention. Additionally, it is to be understood that the aspects of the invention is not limited in its application to the details of construction and the arrangement of components set forth in the following description or illustrated in the drawings. The aspects of the invention are capable of other embodiments and of being practiced or carried out in various ways. Also, it will be understood that the phraseology and terminology used herein is for the purpose of description and should not be regarded as limiting.

Having described aspects of the invention in detail, it will be apparent that modifications and variations are possible without departing from the scope of aspects of the invention as defined in the appended claims. It is contemplated that various changes could be made in the above constructions, products, and methods without departing from the scope of aspects of the invention. In the preceding specification, various preferred embodiments have been described with reference to the accompanying drawings. It will, however, be evident that various modifications and changes may be made thereto, and additional embodiments may be implemented, without departing from the broader scope of the aspects of the invention as set forth in the claims that follow. The specification and drawings are accordingly to be regarded in an illustrative rather than restrictive sense.

What is claimed is:

1. Software comprising processor-executable instructions stored in one or more tangible, non-transitory computer-readable media that when executed perform a method of providing a production metric about a physical production line comprising an arrangement of physical entities at a plurality of line positions in the physical production line, said method comprising:
    (a) presenting one or more interactive entity configuration views on a display of a workstation;
    (b) receiving user inputs to said one or more interactive entity configuration views, said user inputs including entity data representing one of said physical entities;
    (c) generating an entity data model from said entity data;
    (d) repeating steps (a) through (c) to generate an entity data model for each of the physical entities in the physical production line;
    (e) presenting one or more interactive line configuration views on said display of the workstation, at least one of said one or more interactive line configuration views having a work area and a palette of entity configuration objects, at least a plurality of said entity configuration objects representing said entity data models generated in steps (c) and (d);

(f) receiving user inputs selecting said plurality of said entity configuration objects and placing them on the work area at displayed locations on the work area representative of the line positions of the respective physical entities in the physical production line to create a graphical object model representing the physical production line;

(g) generating a line data model based on said user inputs, said step of generating the line data model comprising including in the line data model a line definition model for the physical production line and an entity link model for each of the physical entities, the entity link model comprising a record including a line identification field identifying the line definition model, an entity identification field identifying a respective one of the entity data models, and a line position field describing the line positon of the respective one of the physical entities;

(h) receiving production data about the physical entities;

(i) determining a production metric of the physical production line using the production data and the line data model; and (j) displaying the production metric on said display.

2. The software of claim 1 wherein each of the entity data models generated in steps (c) and (d) has a data structure corresponding to an entity model template.

3. The software of claim 1 wherein said method further comprises (k) repeating steps (a)-(f) for a second physical production line comprising a second arrangement of physical entities, each of the line data models generated in steps (g) and (k) having a data structure corresponding to a line model template.

4. The software of claim 1 wherein said method further comprises including data in said line data model indicating at least one of the physical entities has at least one characteristic selected from the following group of characteristics: can be a source of bottleneck, cannot be a source of bottleneck, is the source of bottleneck, and is the source of production counts.

5. The software of claim 4 wherein said method further comprises including data in said line data model indicating one of the physical entities has the characteristic of being the source of production counts.

6. The software of claim 5 wherein step (h) further comprises receiving production data about said one of the physical entities and step (i) further comprises determining a production amount for the physical production line based on the production data about said one of the physical entities.

7. The software of claim 4 wherein said method further comprises including data in said line data model indicating one of the physical entities has the characteristic of being the bottleneck.

8. The software of claim 7 wherein step (h) further comprises receiving production data about said one of the physical entities and step (i) further comprises determining a performance amount for the physical production line based on the production data about said one of the physical entities.

9. The software of claim 4 wherein said method further comprises including data in said line data model indicating each of a plurality of the physical entities has the characteristic of being a source of bottleneck.

10. The software of claim 9 wherein step (i) further comprises determining a production rate for a line position associated with each of said plurality of physical entities based on, for each of said plurality of physical entities, data from one of its entity data model and a data element associated with a job scheduled to be run thereupon, and calculating a performance amount for the physical production line based on a lowest one of the production rates.

11. The software of claim 1 wherein step (i) comprises associating a utilization status for the physical production line with a utilization status for one of the physical entities that has a highest priority utilization reason associated therewith (j) further comprises displaying the utilization status for the line.

12. A line data model for representing a physical production line comprising an arrangement of physical entities, said line data model stored in one or more tangible, non-transitory computer-readable media, said media further storing an entity model for each of the physical entities and processor-executable instructions for using the line data model and production data received from the physical entities to calculate a production metric for the physical production line, said line data model comprising:

a line definition model providing a unique identifier for the line data model; and an entity link model for each of the entity models, each entity link comprising a record including a line identification field identifying the line definition model and an entity identification field identifying a respective one of the entity models, each entity link model describing a line position of a respective one of the physical entities, each entity link model having a data structure that conforms to an entity link template.

13. The line data model of claim 12 wherein each of the entity models has a data structure that conforms to an entity model template.

14. The line data model of claim 12 wherein the line definition model has a data structure that conforms to a line definition sub-template.

15. The line data model of claim 12 wherein each entity link model includes data representing whether its respective one of the physical entities is a parent entity for the physical production line.

16. The line data model of claim 12 wherein each of at least a plurality of the entity link models includes data representing that its respective one of the physical entities can be a source of bottleneck for the physical production line.

17. The line data model of claim 12 wherein the line definition model includes data representing which of the physical entities is a source of production counts for the physical production line.

18. A processor-executable method of dynamically determining a source of bottleneck for a physical production line comprising an arrangement of physical entities in at least a plurality of line positions, the method comprising:

(a) storing data representing an expected production rate for each of the physical entities;

(b) storing a line data model representing the arrangement of the physical entities, said line data model comprising a line definition model for the physical production line, an entity model for each of the physical entities, and an entity link model for each of the physical entities, the entity link model comprising a record including a line identification field identifying the line definition model, an entity identification field identifying a respective one of the entity models, and a line position field describing the line position of the respective one of the physical entities;
(c) determining a production rate for each of the physical entities using its respective expected production rate;
(d) grouping the production rates for the physical entities by line position using the data representing the line position stored in the line data model to determine a production rate for each of the plurality of line positions;
(e) comparing the production rates of each of the plurality of line positions; and
(f) determining that the source of bottleneck is the line position with a lowest production rate.

19. The processor-executable method of claim 18 wherein the line data model further includes data representing whether each of the physical entities is capable of being the bottleneck.

20. The processor-executable method of claim 19 wherein the line data model includes data representing each of a plurality of physical entities is capable of being the bottleneck.

21. The processor-executable method of claim 20 further comprising converting the production rate for each of the plurality of physical entities to a standard unit of measure.

22. The processor-executable method of claim 18 further comprising storing a data element for each of a plurality of jobs to be run on the physical entities, each data element including data representing a job production rate for its respective job.

23. The processor-executable method of claim 22 further comprising storing an entity data model for each of the physical entities, each entity data model including data representing a default production rate for its respective entity.

24. The processor-executable method of claim 23 wherein step (c) comprises identifying whether any jobs are assigned to one of the physical entities.

25. The processor-executable method of claim 24 wherein when one job is assigned to said one of the physical entities step (c) comprises using the job production rate associated with said one job as said expected production rate for said one of the physical entities.

26. The processor-executable method of claim 24 wherein when a plurality of jobs are assigned to said one of the physical entities step (c) comprises using the data in the data elements associated with said plurality of jobs to determine a lowest job production rate of said plurality of jobs and using said lowest job production rate as said expected production rate for said one of the physical entities.

27. The processor-executable method of claim 24 wherein when no jobs are assigned to one of said physical entities step (c) further comprises determining whether any jobs are assigned to an upstream one of the physical entities.

28. The processor-executable method of claim 27 wherein when no jobs are assigned to said physical entity and when an upstream job is assigned to said upstream one of the physical entities step (c) comprises identifying a next job scheduled to be run on said one of said physical entities and using the job production rate associated with said next job as said expected production rate for said one of the physical entities.

29. The processor-executable method of claim 27 wherein when no jobs are assigned to said one of the physical entities and when no jobs are assigned to said upstream one of the physical entities step (c) comprises using the default production rate for said one of the physical entities as said expected production rate for said one of the physical entities.

30. The processor-executable method of claim 18 further comprises repeating step (c) for one of the physical entities in response to an occurrence of a trigger condition.

31. The processor-executable method of claim 30 further comprises repeating steps (d) through (f) after said repeating step (c) for said one of the physical entities.

32. The processor-executable method of claim 30 further comprising receiving information about the occurrence of the trigger condition from the physical production line.

* * * * *